(12) United States Patent
Parkes et al.

(10) Patent No.: US 11,735,844 B2
(45) Date of Patent: *Aug. 22, 2023

(54) ANTI-BACKOUT LATCH FOR INTERCONNECT SYSTEM

(71) Applicant: SAMTEC INC., New Albany, IN (US)

(72) Inventors: Liam Parkes, New Albany, IN (US); Eric Zbinden, Santa Clara, CA (US); Keith Guetig, Louisville, KY (US); Jignesh H. Shah, New Albany, IN (US); Jean Karlo Williams Barnett, New Albany, IN (US); Chadrick Paul Faith, Corydon, IN (US); R. Brad Bettman, Mountain View, CA (US)

(73) Assignee: SAMTEC, INC., New Albany, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/496,558

(22) Filed: Oct. 7, 2021

(65) Prior Publication Data

US 2022/0029323 A1 Jan. 27, 2022

Related U.S. Application Data

(63) Continuation of application No. 16/325,456, filed as application No. PCT/US2017/046918 on Aug. 15, 2017, now Pat. No. 11,171,432.

(Continued)

(51) Int. Cl.
*H01R 12/70* (2011.01)
*G02B 6/42* (2006.01)
(Continued)

(52) U.S. Cl.
CPC ....... *H01R 12/7029* (2013.01); *G02B 6/4246* (2013.01); *G02B 6/4269* (2013.01);
(Continued)

(58) Field of Classification Search
CPC ............ H01R 12/7029; H01R 12/7058; H01R 12/774; H01R 12/89; H01R 13/639;
(Continued)

(56) References Cited

U.S. PATENT DOCUMENTS

| | | |
|---|---|---|
| 2,760,174 A | 8/1956 | Burtt et al. |
| 4,477,142 A | 10/1984 | Cooper et al. |

(Continued)

FOREIGN PATENT DOCUMENTS

| | | |
|---|---|---|
| CN | 201464681 U | 5/2010 |
| CN | 201886172 U | 6/2011 |

(Continued)

OTHER PUBLICATIONS

Samtec, 0.8MM Q-Rate Terminal Assembly by Clay W, Dwg. No. QRM8-XXX-XX.X-X-D-XX-A-XX, Aug. 27, 2008, 4 sheets.

*Primary Examiner* — Travis S Chambers
(74) *Attorney, Agent, or Firm* — BakerHostetler

(57) ABSTRACT

An interconnect system includes various anti-backout latches that are movable between an engaged position and a disengaged position. When in the engaged position, the anti-backout latches can be configured to prevent an interconnect module, such as an optical transceiver, from becoming unmated from a host module. When in the disengaged position, the anti-backout latches permit the interconnect module to become unmated from a host module. Securement members are also disclosed that secure a heat sink to a module housing of the interconnect module.

20 Claims, 45 Drawing Sheets

Related U.S. Application Data

(60) Provisional application No. 62/483,932, filed on Apr. 10, 2017, provisional application No. 62/451,566, filed on Jan. 27, 2017, provisional application No. 62/375,050, filed on Aug. 15, 2016.

(51) Int. Cl.
  *H01R 12/77* (2011.01)
  *H01R 12/83* (2011.01)
  *H01R 13/639* (2006.01)
  *H01R 13/629* (2006.01)

(52) U.S. Cl.
  CPC ....... *G02B 6/4277* (2013.01); *H01R 12/7058* (2013.01); *H01R 12/774* (2013.01); *H01R 12/83* (2013.01); *H01R 13/629* (2013.01); *H01R 13/639* (2013.01)

(58) Field of Classification Search
  CPC .. H01R 12/7005; H01R 13/629; H01R 24/20; H01R 13/62927; H01R 13/62933; H01R 13/62955; G02B 6/4246; G02B 6/4269; G02B 6/4277; G02B 6/4284; G02B 6/4214; G02B 6/428
  See application file for complete search history.

(56) References Cited

U.S. PATENT DOCUMENTS

| | | |
|---|---|---|
| 4,544,225 A | 10/1985 | Raus et al. |
| 4,639,063 A | 1/1987 | Mueller |
| 4,678,252 A | 7/1987 | Moore |
| 5,167,523 A | 12/1992 | Crimmins et al. |
| 5,224,873 A | 7/1993 | Duffet et al. |
| 5,396,402 A | 3/1995 | Perugini et al. |
| 5,462,441 A | 10/1995 | Renn et al. |
| 5,507,657 A | 4/1996 | Seto et al. |
| 5,722,849 A | 3/1998 | Alwine |
| 5,775,957 A | 7/1998 | Fink et al. |
| 6,048,221 A | 4/2000 | McCleerey et al. |
| 6,176,725 B1 | 1/2001 | Kobayashi et al. |
| 6,638,105 B1 | 10/2003 | Wu |
| 7,001,200 B2 | 2/2006 | Yoshie |
| D528,985 S | 9/2006 | Peng |
| D529,443 S | 10/2006 | Chien |
| 7,134,895 B1 | 11/2006 | Choy et al. |
| 7,329,054 B1 | 2/2008 | Epitaux et al. |
| 7,479,017 B1 | 1/2009 | Koopman et al. |
| D589,891 S | 4/2009 | Peng |
| D589,901 S | 4/2009 | Peng et al. |
| 7,648,287 B2 | 1/2010 | Epitaux et al. |
| 7,682,179 B1 | 3/2010 | Tsai |
| 7,766,559 B2 | 8/2010 | Epitaux et al. |
| 7,824,112 B2 | 11/2010 | Epitaux et al. |
| 7,924,567 B2 | 4/2011 | Zha |
| 8,057,248 B1 | 11/2011 | Sherman |
| D697,031 S | 1/2014 | Yoshisuji |
| D708,145 S | 7/2014 | McCartin et al. |
| D708,580 S | 7/2014 | McCartin et al. |
| D721,332 S | 1/2015 | Yokoo |
| D722,968 S | 2/2015 | Takemoto |
| D729,173 S | 5/2015 | Fukumoto |
| D736,714 S | 8/2015 | Mongold et al. |
| 9,246,280 B2 | 1/2016 | Neer et al. |
| 9,374,165 B2 | 6/2016 | Zbinden et al. |
| D800,070 S | 10/2017 | Manba |
| D820,216 S | 6/2018 | Wu et al. |
| D822,611 S | 7/2018 | Bettman et al. |
| D835,048 S | 12/2018 | Arai et al. |
| 10,290,962 B2 | 5/2019 | Harmon, III |
| 10,297,963 B2 | 5/2019 | Herring et al. |
| 10,367,282 B2 | 7/2019 | Harmon et al. |
| D860,140 S | 9/2019 | Wu |
| D886,066 S | 6/2020 | Williams et al. |
| D924,170 S | 7/2021 | Williams et al. |
| 11,171,432 B2 * | 11/2021 | Parkes ................. G02B 6/4277 |
| 11,196,195 B2 * | 12/2021 | Bettman .............. H01R 12/721 |
| 2002/0052131 A1 | 5/2002 | Hashimoto |
| 2007/0218759 A1 | 9/2007 | Liang et al. |
| 2008/0222351 A1 | 9/2008 | Verdiell et al. |
| 2009/0305528 A1 | 12/2009 | Hirata et al. |
| 2010/0044104 A1 | 2/2010 | Zediker et al. |
| 2010/0120268 A1 | 5/2010 | Cheng-Chi |
| 2010/0130044 A1 | 5/2010 | Taketomi |
| 2010/0195304 A1 | 8/2010 | Takao |
| 2011/0123150 A1 | 5/2011 | Zbinden et al. |
| 2011/0123151 A1 | 5/2011 | Zbinden et al. |
| 2012/0257360 A1 | 10/2012 | Sun |
| 2012/0289066 A1 | 11/2012 | Wang et al. |
| 2013/0004120 A1 * | 1/2013 | Zbinden ............... G02B 6/4293 385/14 |
| 2013/0040482 A1 | 2/2013 | Ngo et al. |
| 2013/0129346 A1 | 5/2013 | Zbinden et al. |
| 2013/0148973 A1 | 6/2013 | Zbinden et al. |
| 2013/0344710 A1 | 12/2013 | Sasaki et al. |
| 2014/0017914 A1 | 1/2014 | Endo et al. |
| 2014/0082977 A1 | 3/2014 | Pilon |
| 2014/0161407 A1 | 6/2014 | Lee et al. |
| 2015/0357734 A1 | 12/2015 | Copper et al. |
| 2015/0364865 A1 | 12/2015 | Sutter et al. |
| 2015/0378116 A1 * | 12/2015 | Zbinden ............... G02B 6/3879 385/89 |
| 2016/0079692 A1 | 3/2016 | Sasame et al. |
| 2017/0062963 A1 | 3/2017 | Tagami et al. |
| 2017/0174167 A1 | 6/2017 | Collazo Gomez |
| 2020/0185849 A1 | 6/2020 | Chi |
| 2020/0220286 A1 | 7/2020 | Bettman et al. |
| 2020/0403334 A1 | 12/2020 | Parkes et al. |
| 2021/0194162 A1 | 6/2021 | Sugaya et al. |

FOREIGN PATENT DOCUMENTS

| | | |
|---|---|---|
| CN | 102780103 A | 11/2012 |
| CN | 204243357 U | 4/2015 |
| CN | 104810683 A | 7/2015 |
| CN | 204668509 U | 9/2015 |
| CN | 105514708 A | 4/2016 |
| CN | 105655784 A | 6/2016 |
| CN | 207765710 U | 8/2018 |
| JP | 2001-126790 A | 5/2001 |
| JP | 2002-093495 A | 3/2002 |
| JP | 2004-063392 A | 2/2004 |
| JP | 2011-222273 A | 11/2011 |
| JP | 2013-544447 A | 12/2013 |
| KR | 10-2015-0044212 A | 4/2015 |
| KR | 10-2016-0071753 A | 6/2016 |
| TW | I223479 B | 11/2004 |
| TW | D164746 | 12/2014 |
| TW | D183201 | 8/2016 |
| TW | D180510 | 1/2017 |
| TW | D184085 | 7/2017 |
| WO | 2009/050779 A1 | 4/2009 |
| WO | 2018/035108 | 2/2018 |

* cited by examiner

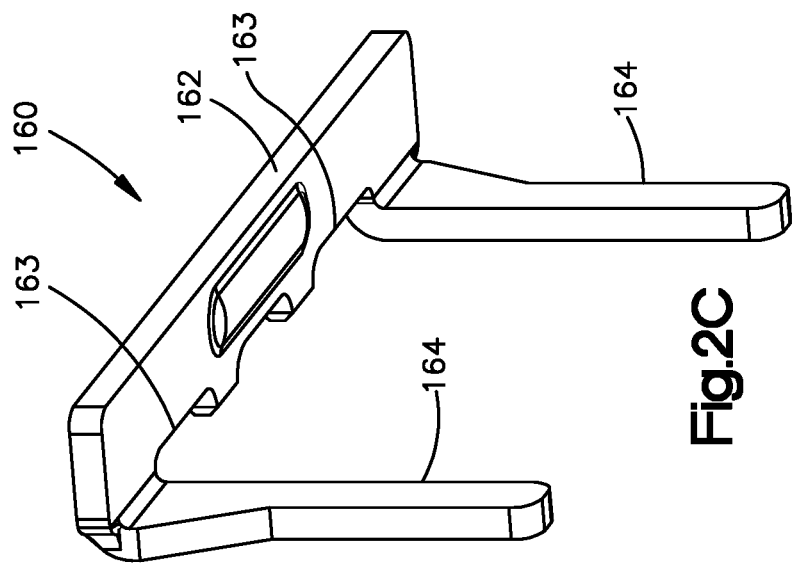
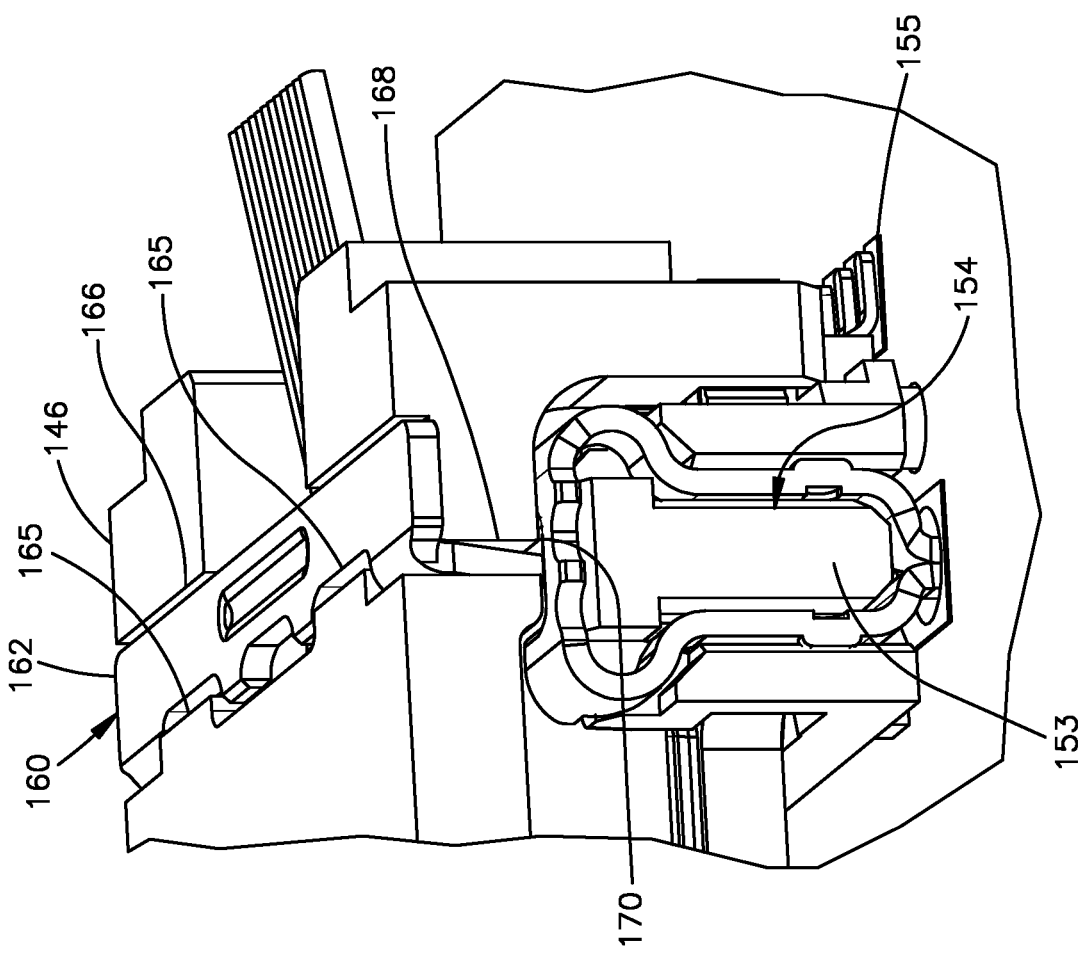

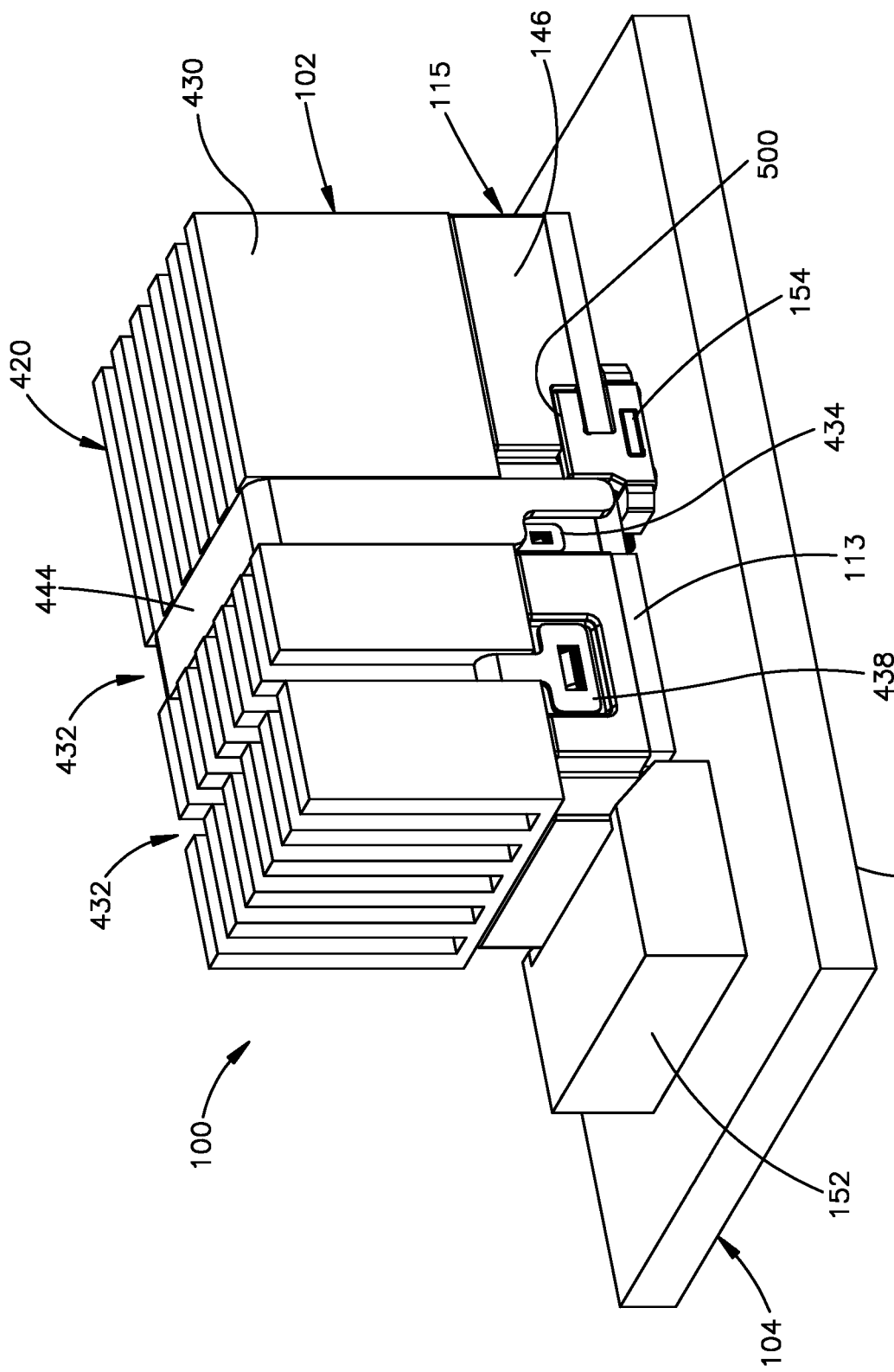

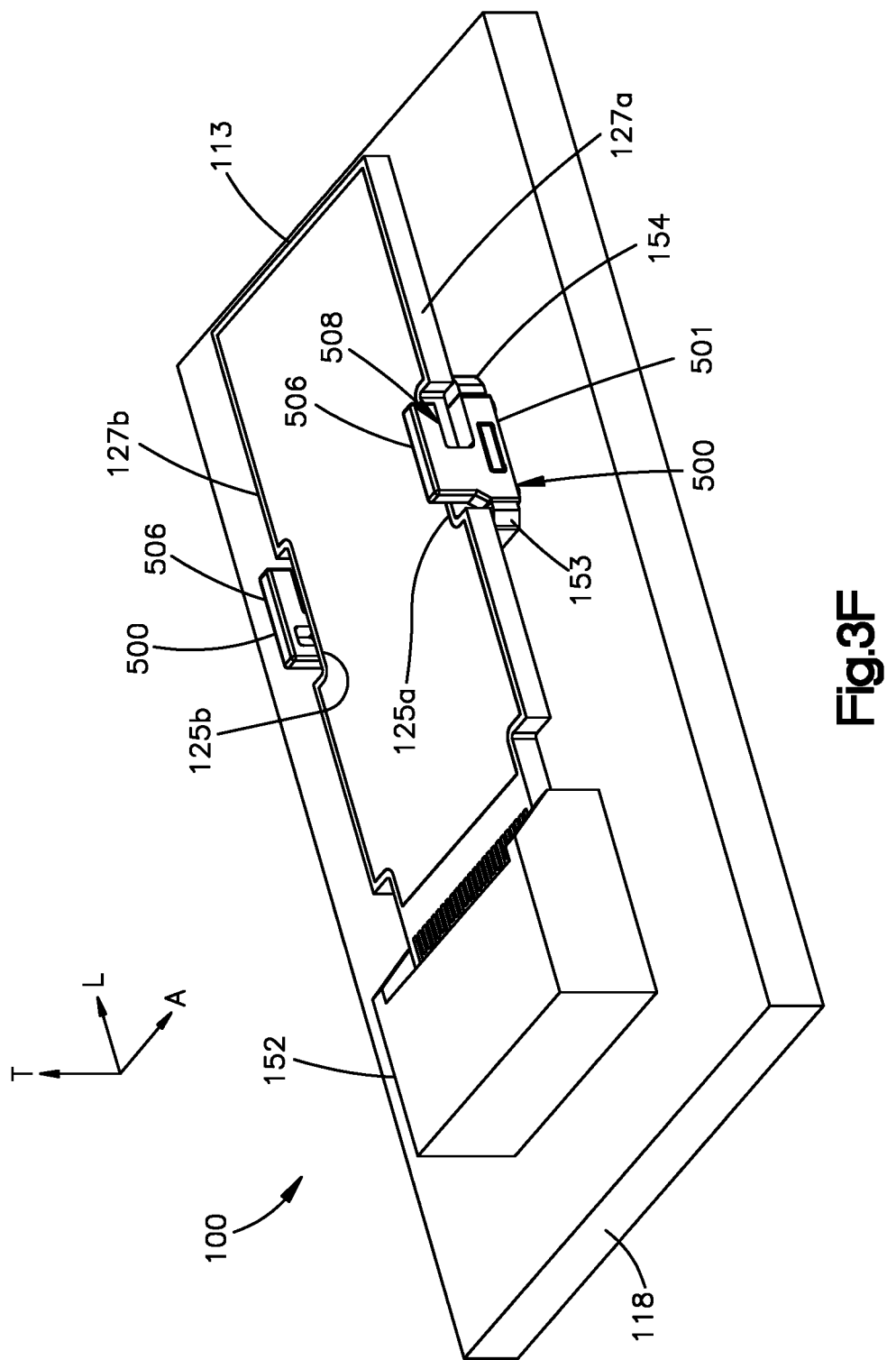

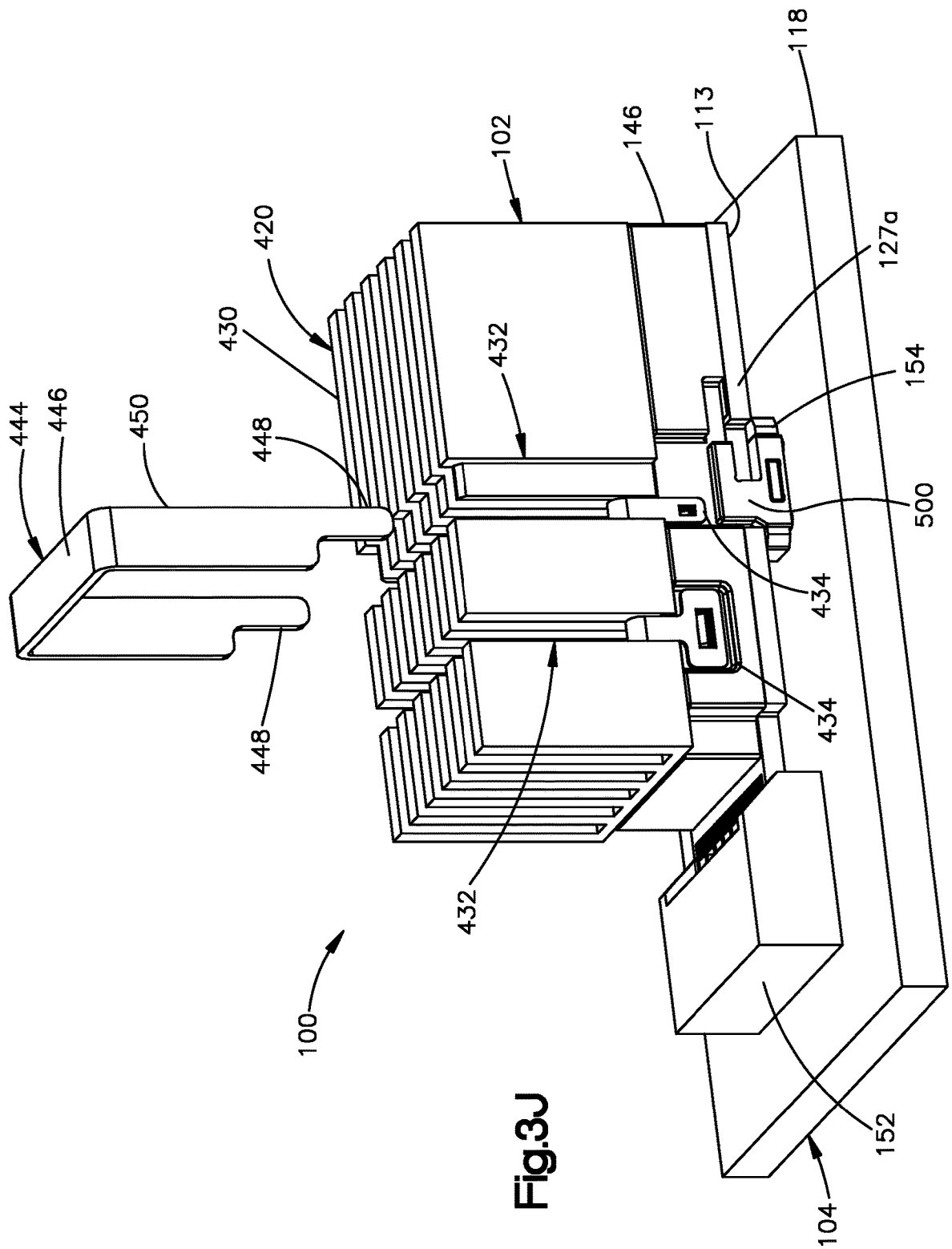

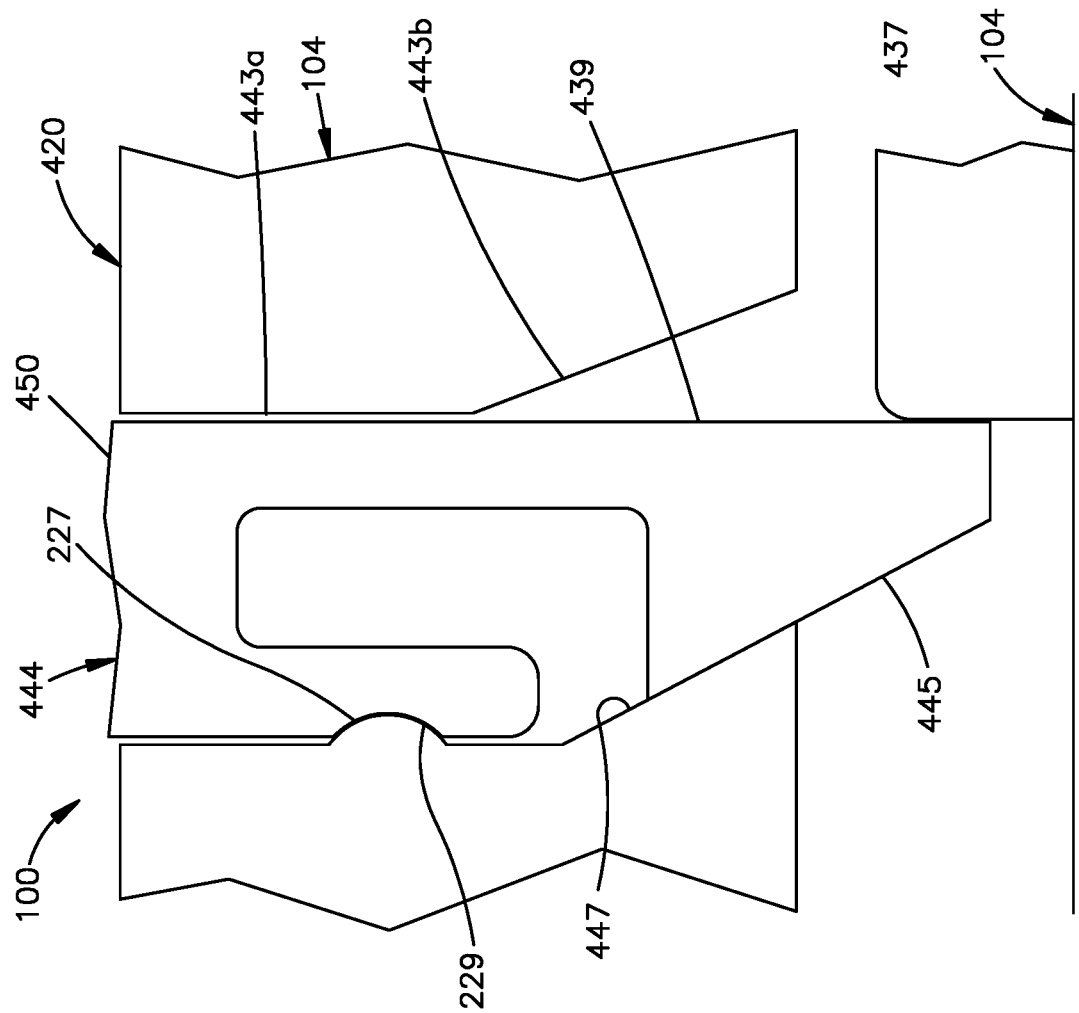
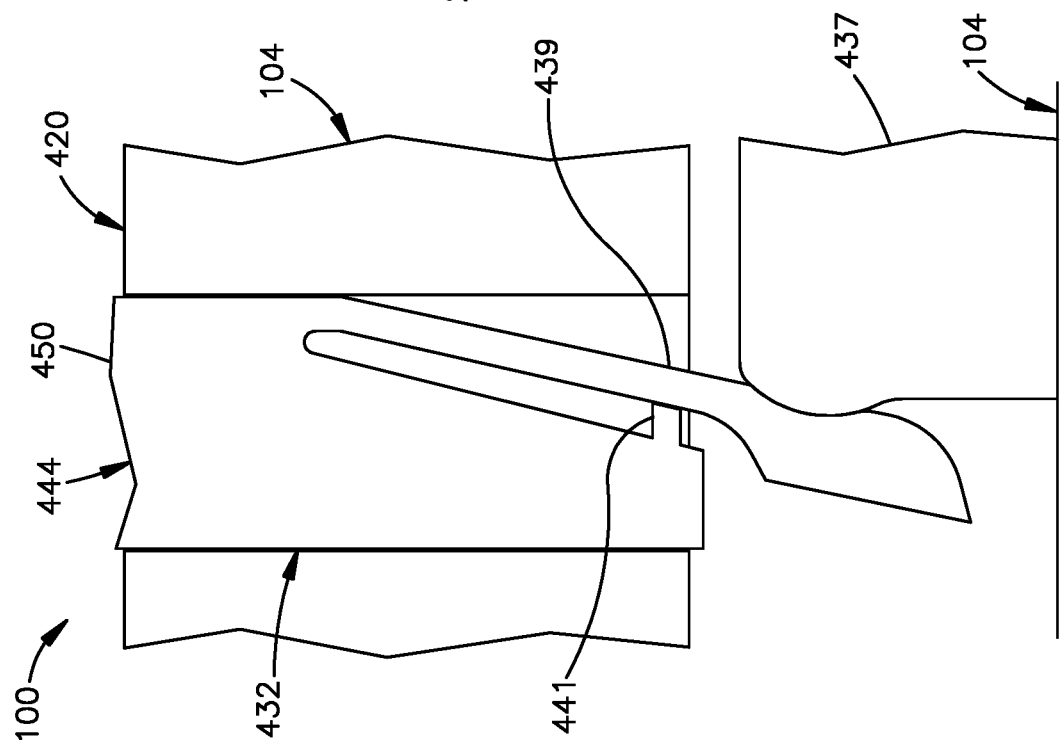

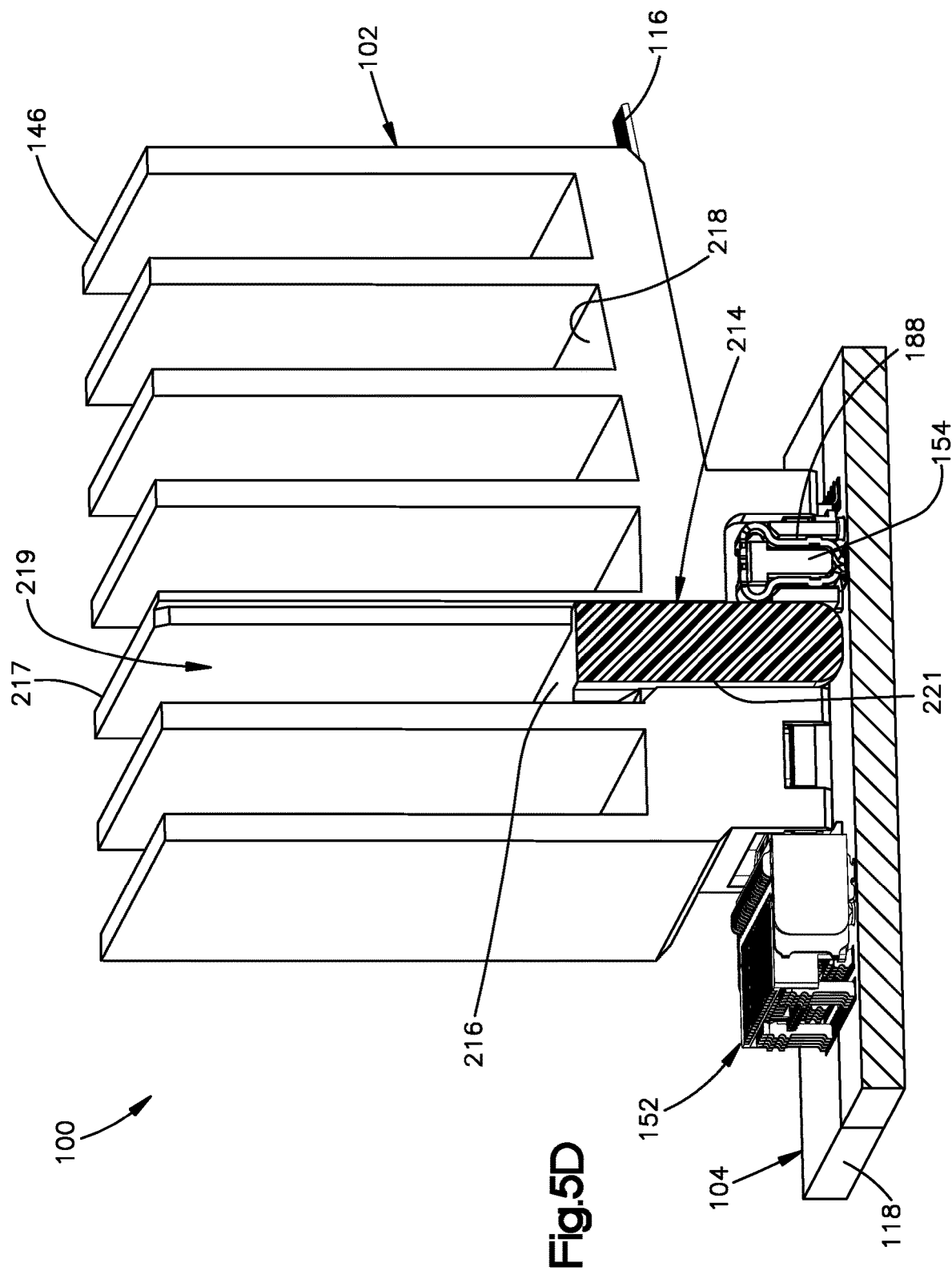

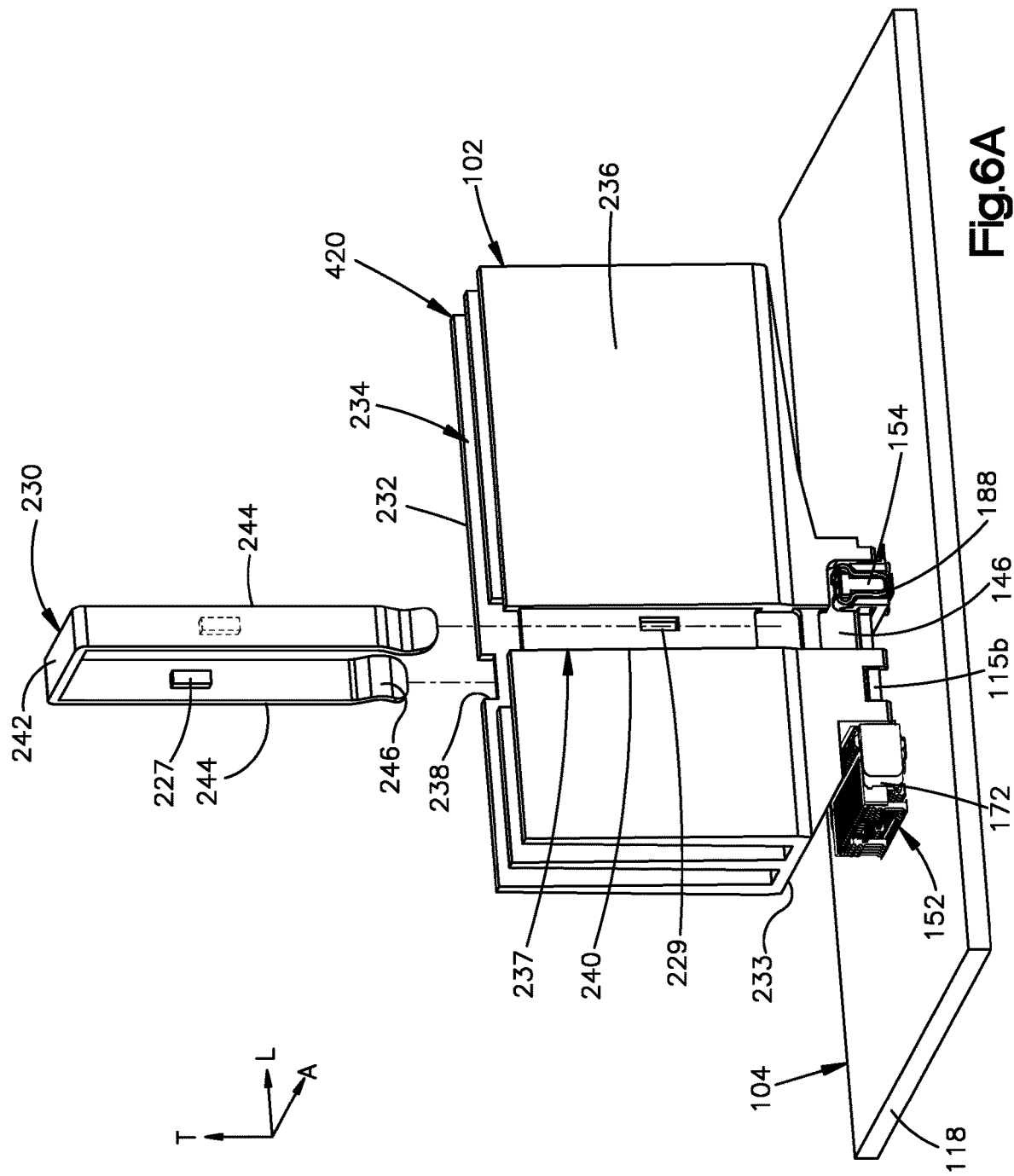

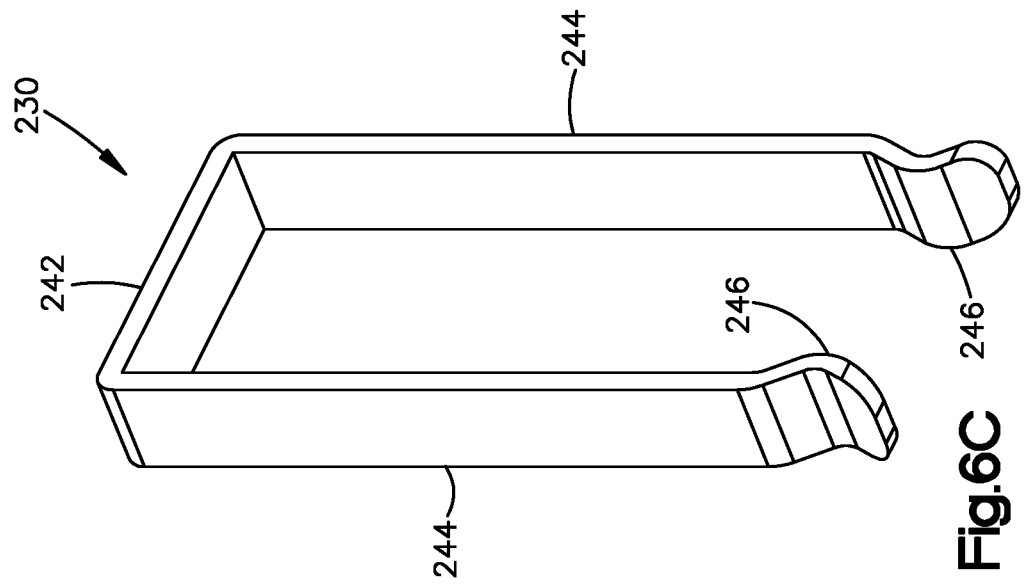
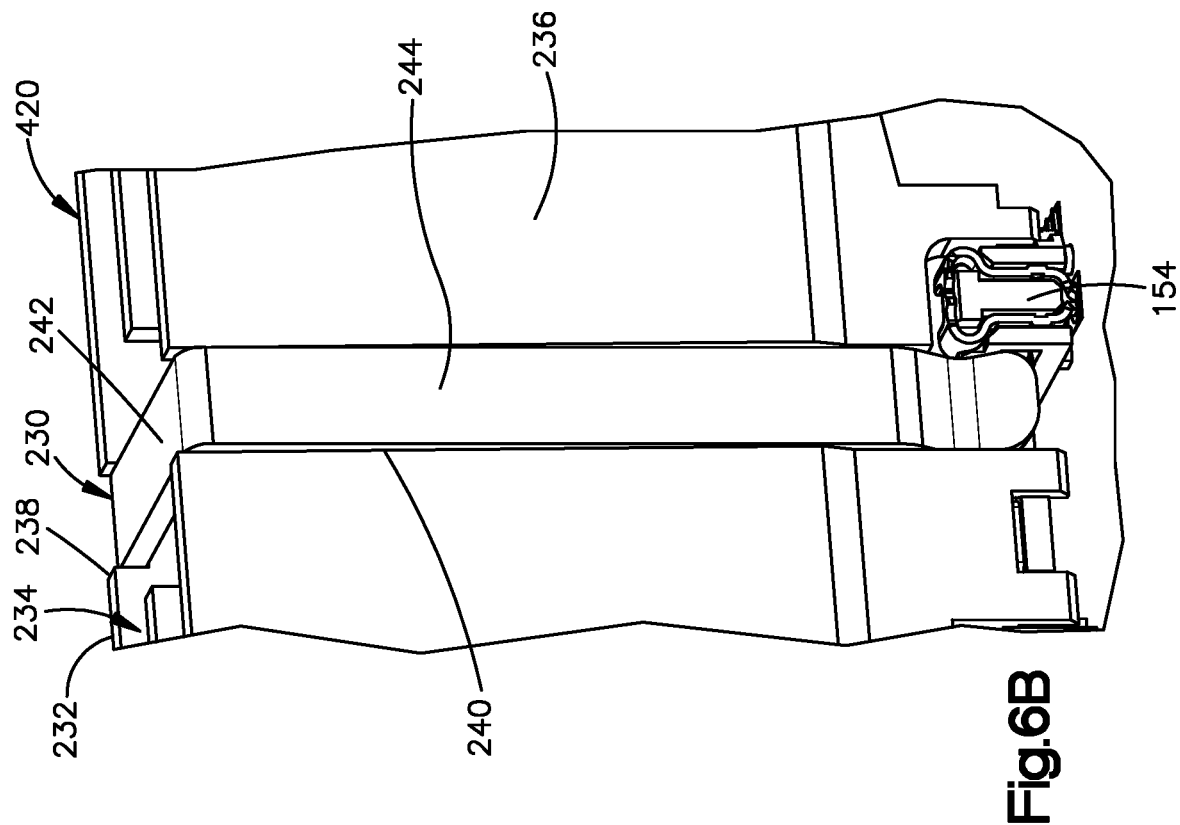

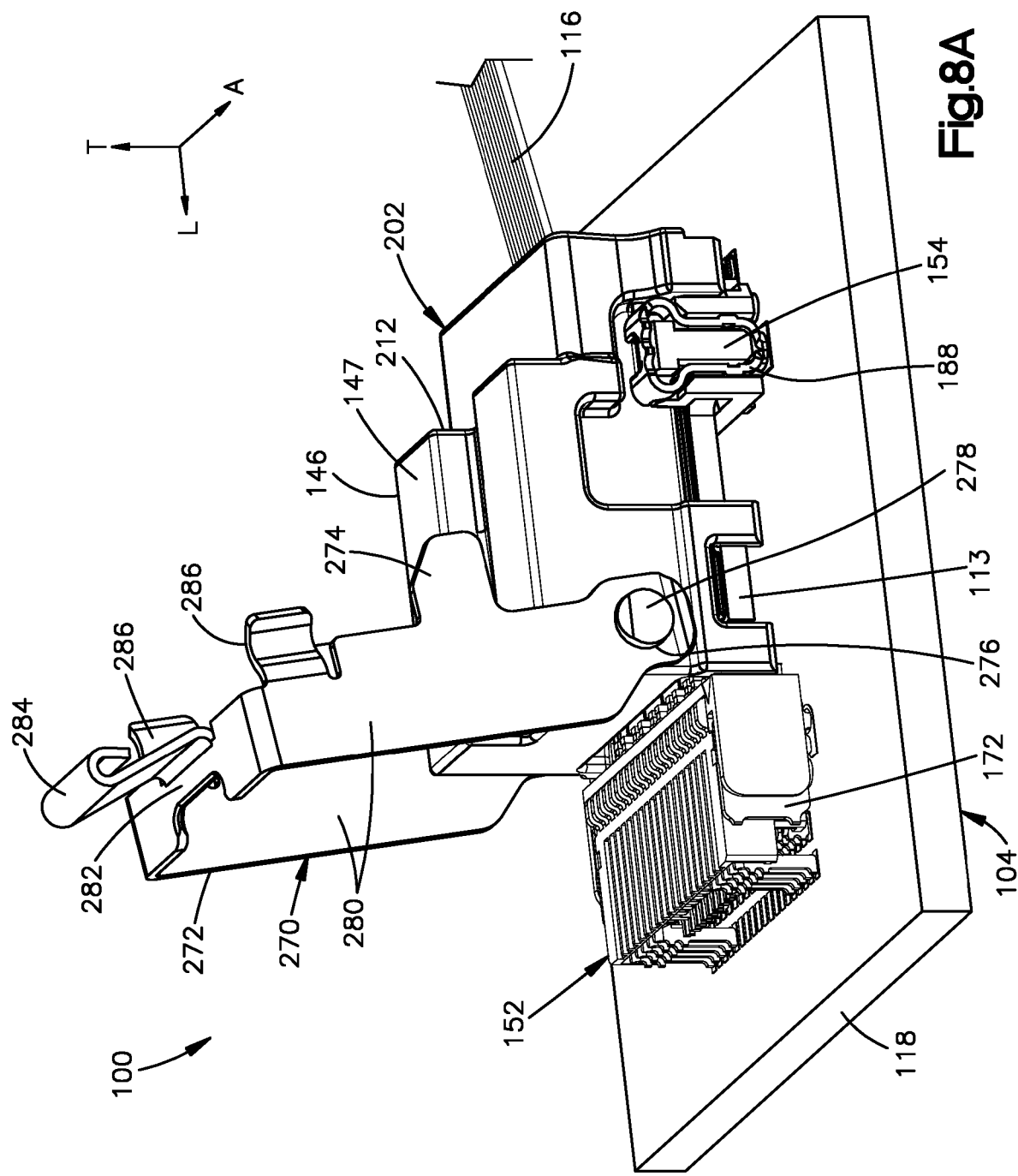

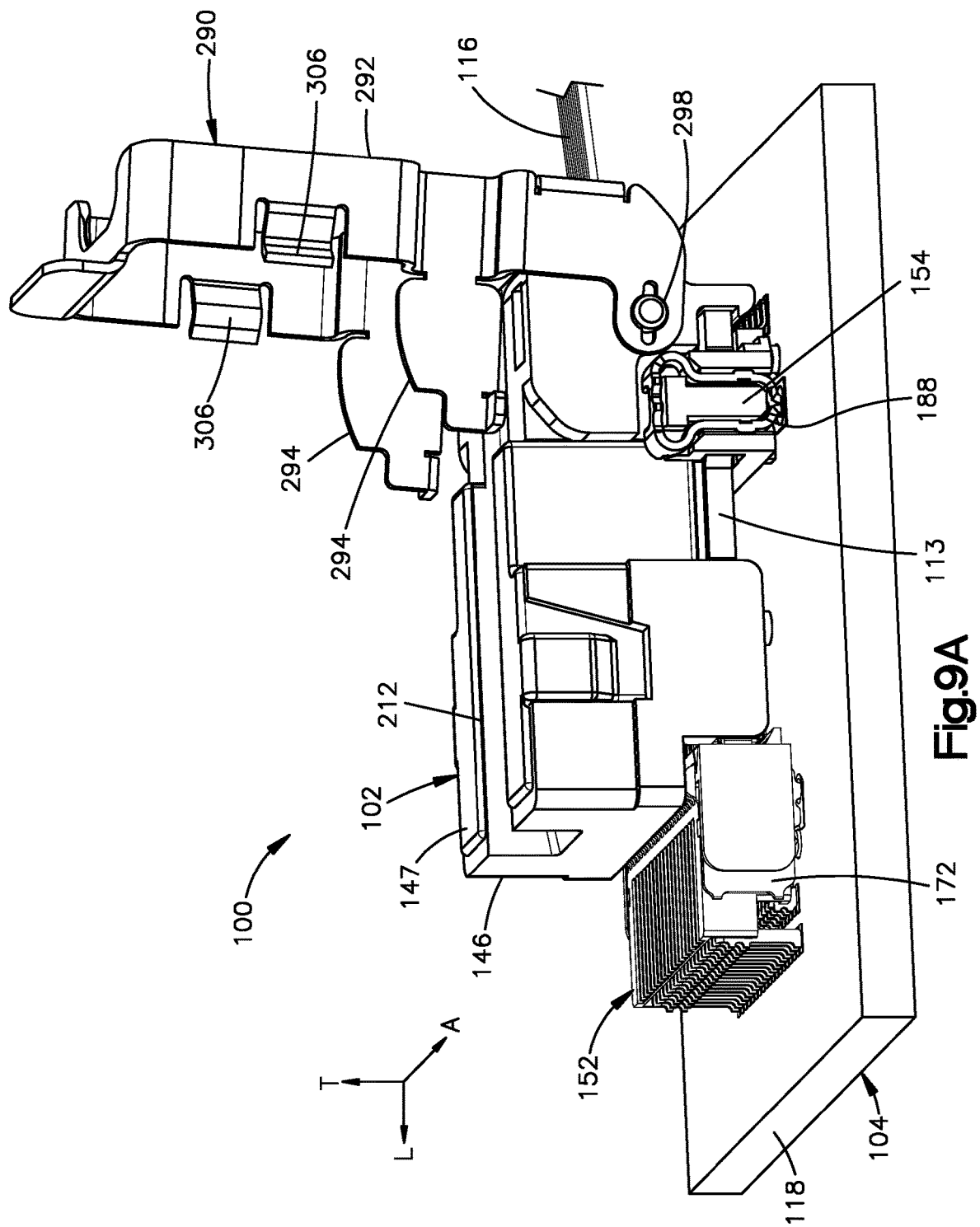

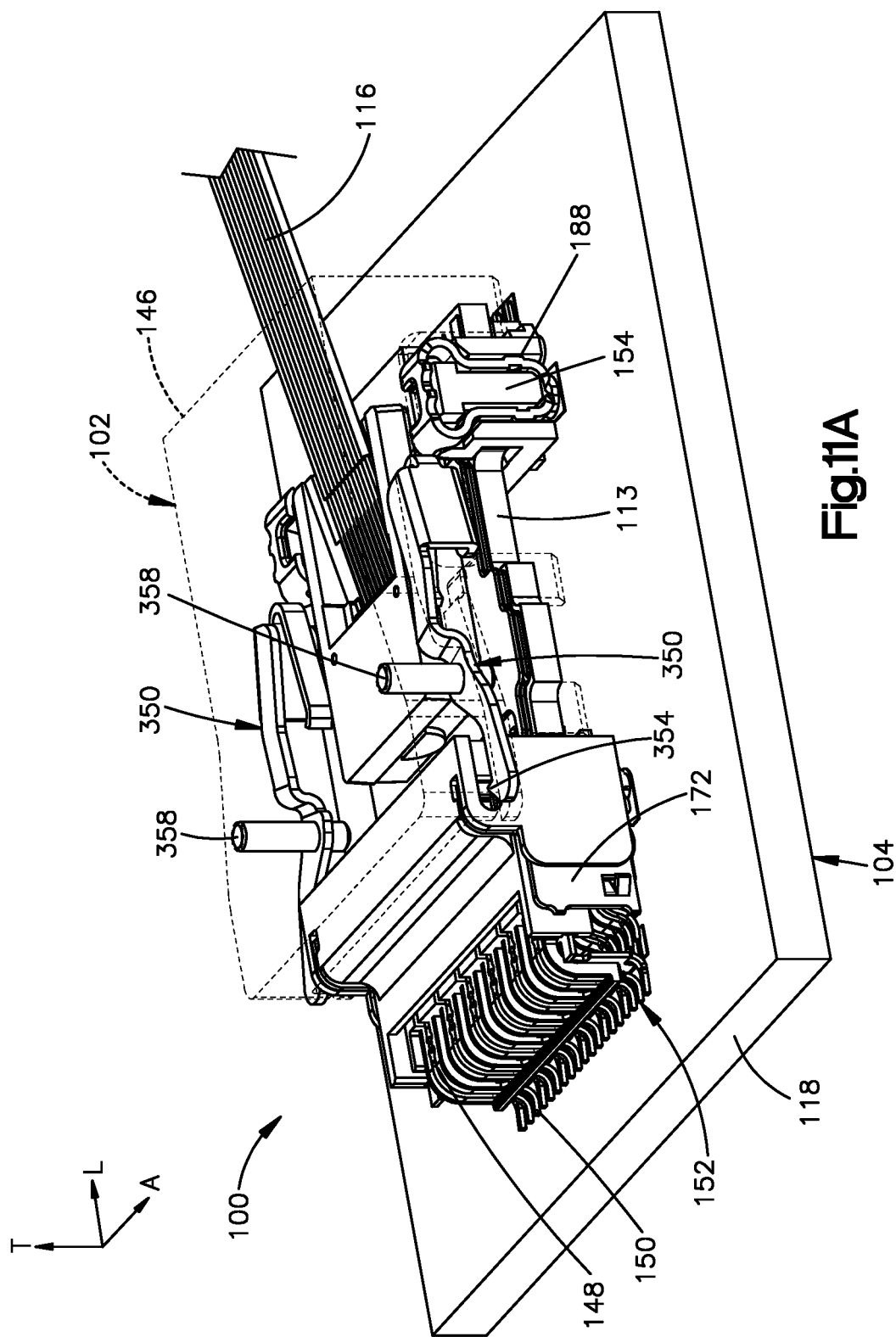

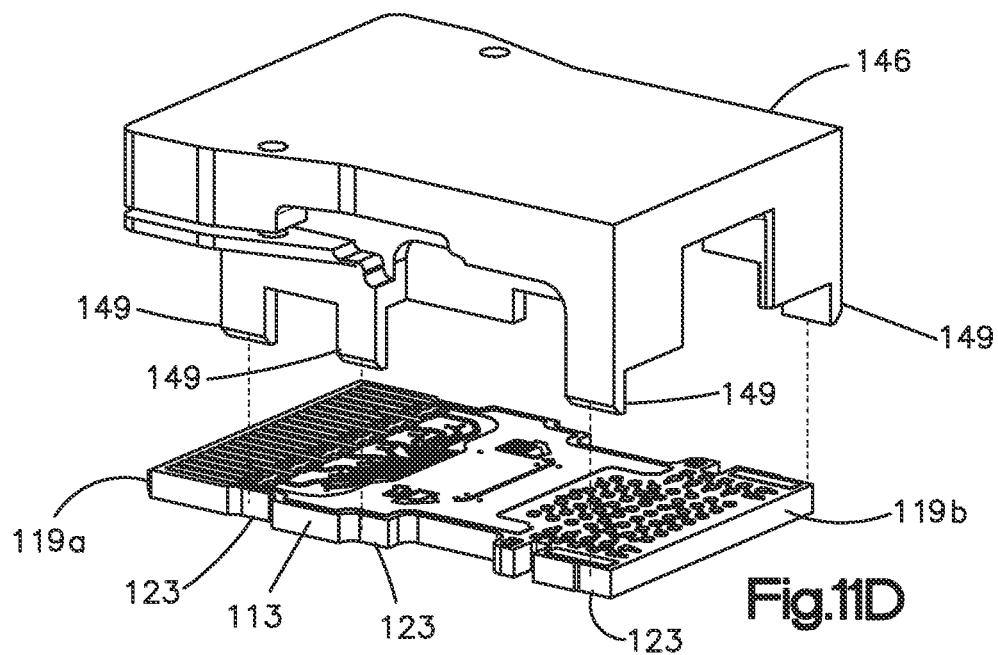
Fig.11D
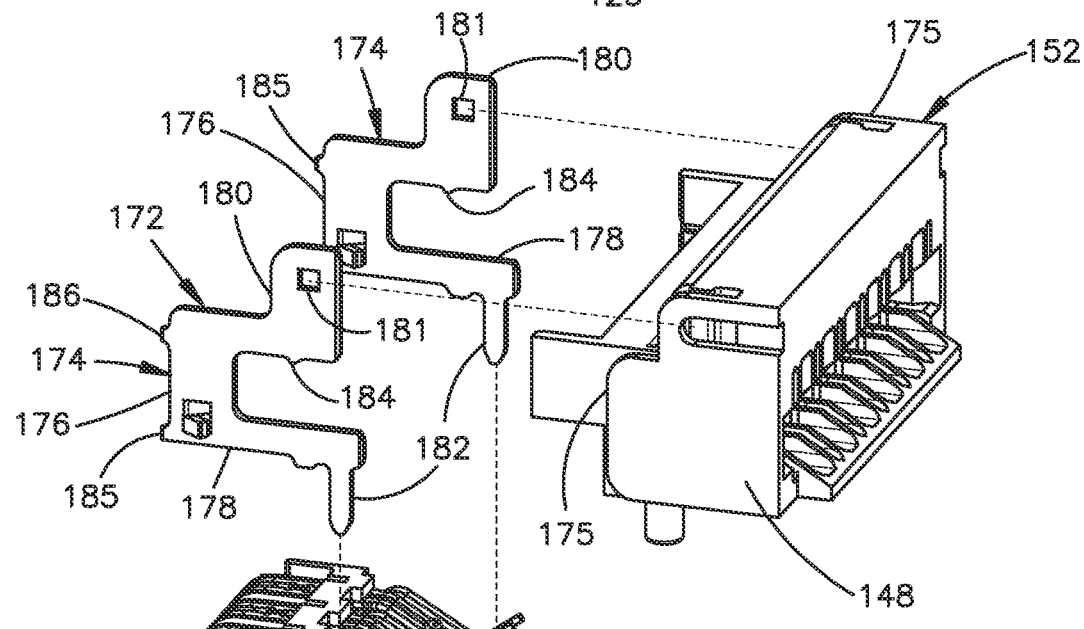
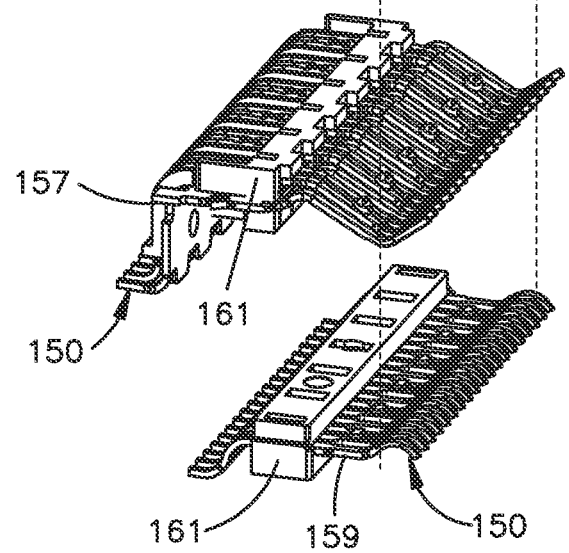
Fig.11E

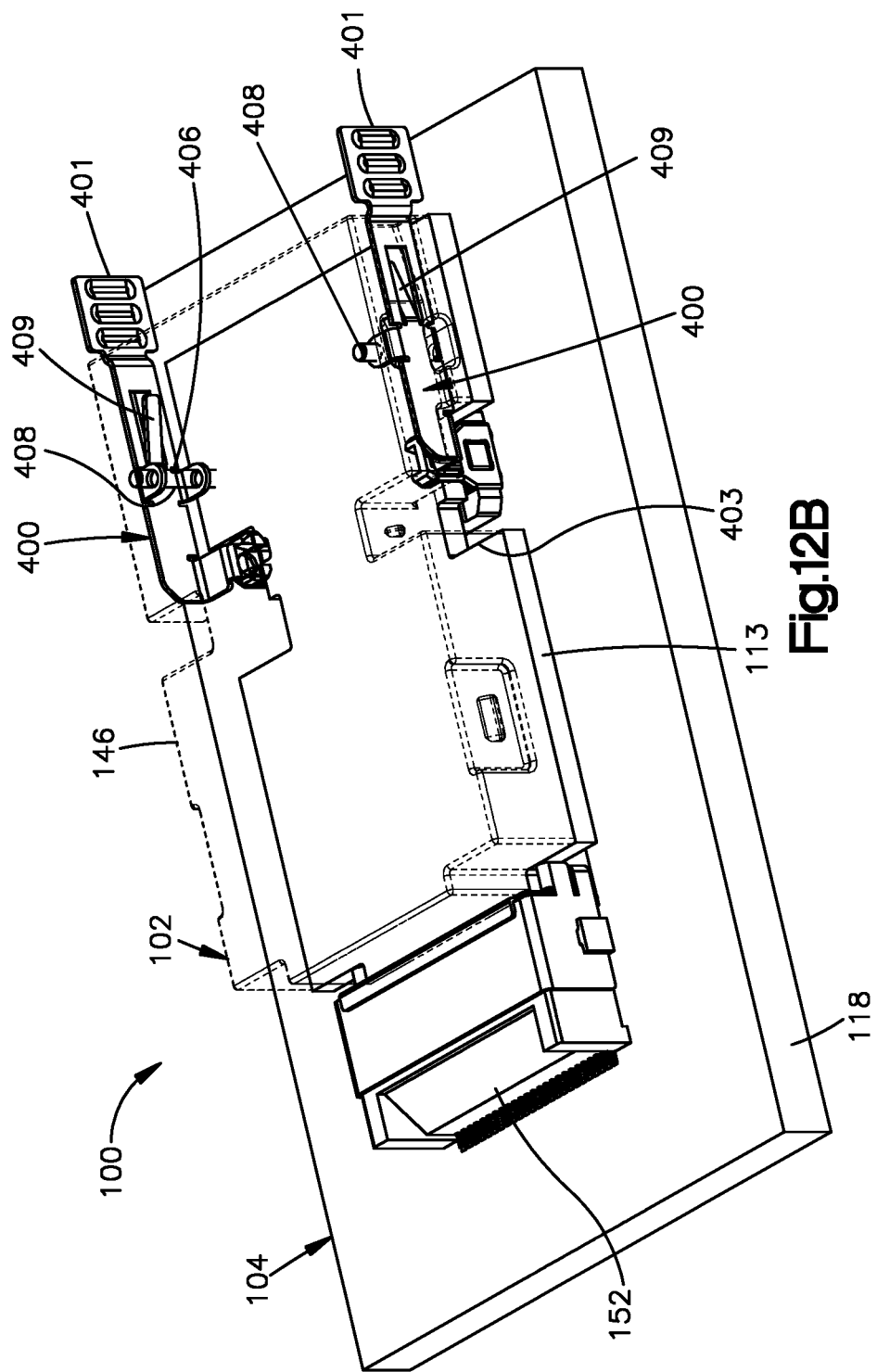

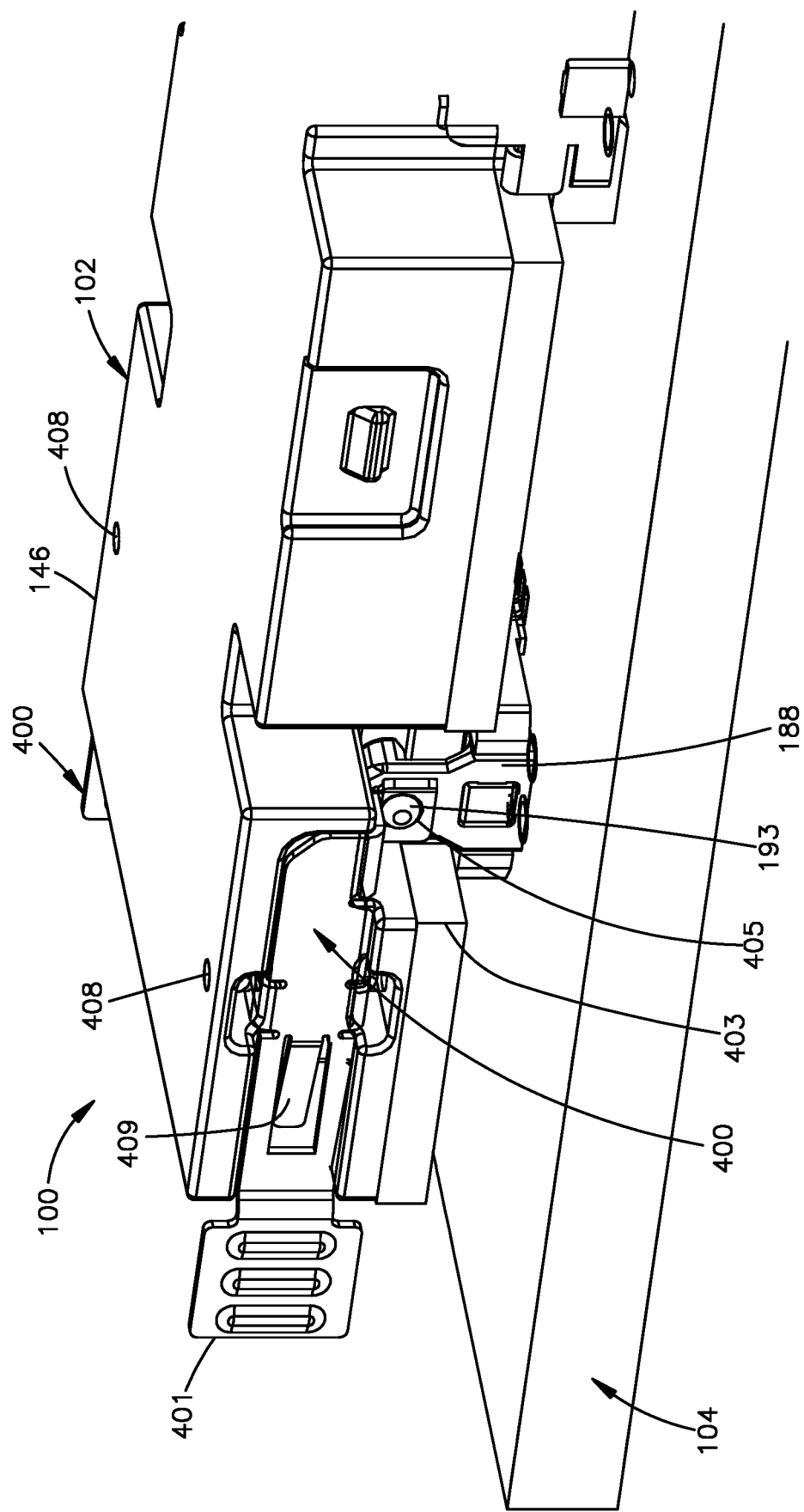

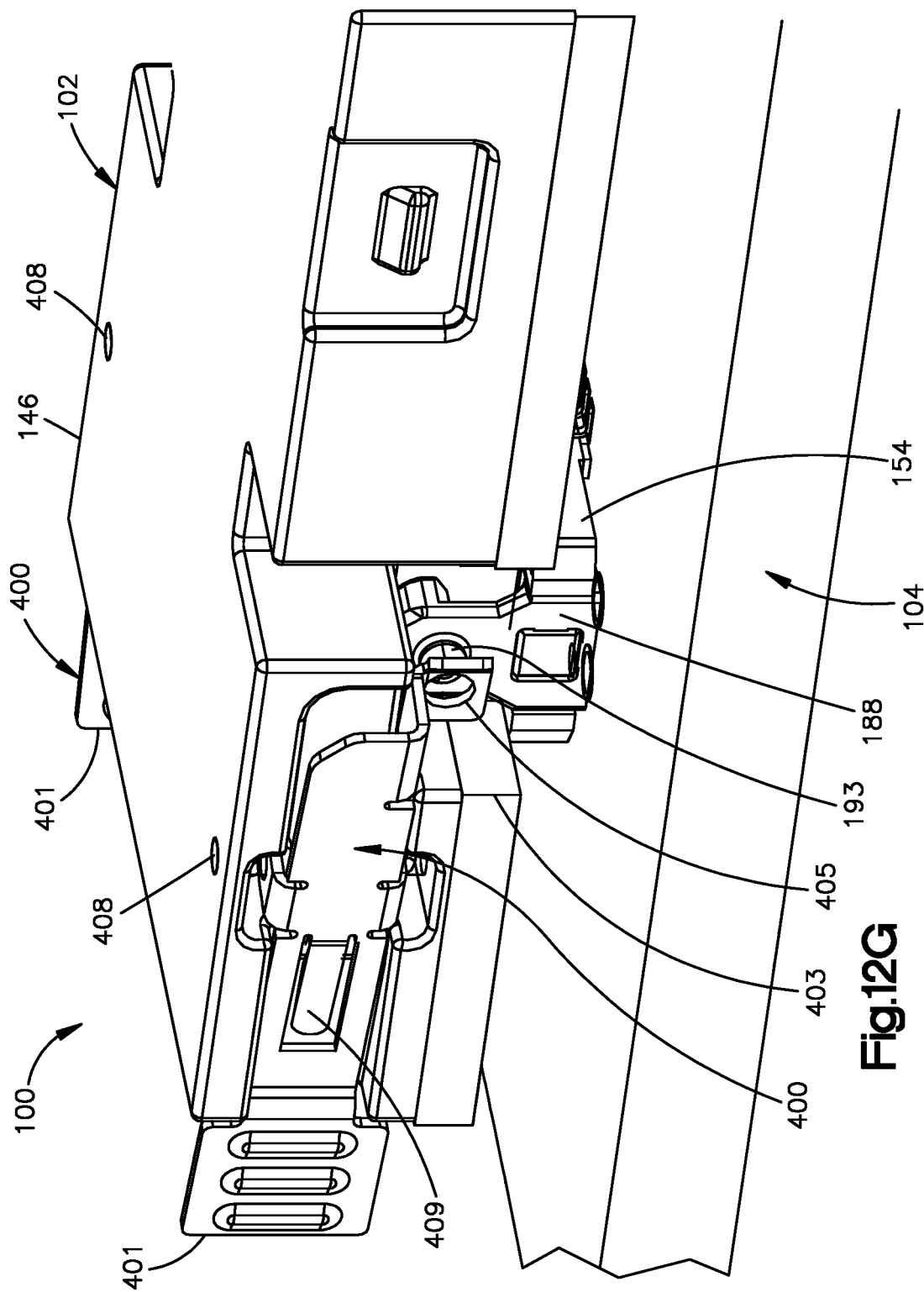

ANTI-BACKOUT LATCH FOR INTERCONNECT SYSTEM

CROSS-REFERENCE TO RELATED APPLICATIONS

This is a continuation of U.S. patent application Ser. No. 16/325,456, now U.S. Pat. No. 11,171,432, which is the National Stage Application of International Patent Application No. PCT/US2017/046918, which claims priority to U.S. Patent Application Ser. No. 62/375,050 filed Aug. 15, 2016, U.S. Patent Application Ser. No. 62/451,566 filed Jan. 27, 2017, and U.S. Application Ser. No. 62/483,932 filed Apr. 10, 2017, the disclosure of each of which is hereby incorporated by reference as if set forth in its entirety herein.

BACKGROUND

U.S. Pat. No. 9,374,165 describes a plurality of interconnect systems, and describes with respect to FIGS. 5A-7B of U.S. Pat. No. 9,374,165 an example of one of several embodiments of a transceiver 115 that can include an optical engine, and a cable 116 connected to the optical engine. U.S. Pat. No. 9,374,165 is hereby incorporated by reference as if set forth in its entirety herein. Examples of optical engines are disclosed in U.S. Pat. Nos. 7,329,054, 7,648,287, 7,766,559, 7,824,112, U.S. Patent Application Publication No. 2008/0222351, U.S. Patent Application Publication No. 2011/0123150, and U.S. Patent Application Publication No. 2011/0123151, the entirety of each of which is hereby incorporated by reference as if set forth in its entirety herein.

Referring to FIG. 9C of the U.S. Pat. No. 9,374,165, the cable 116 can include only one or more fiber optic cables alone or in combination with one or more copper cables. The transceiver 115 can include a first substrate 113 and an optical engine that can be mounted onto the first substrate 113. The first substrate 113 can be configured as a first printed circuit board. The optical engine is configured to receive optical signals from the cable 116, and convert the optical signals to electrical signals. Further, the optical engine is configured to receive electrical signals, convert the electrical signals to optical signals, and transmit the optical signals along the cables. The circuit board 113 can include an IC chip 115f (FIG. 6D) that is configured to route and/or modify the electrical signals transmitted to and from the transceiver, including conditioning the electrical signals for protocol specific data transfers.

As shown in FIG. 10A, the interconnect system further includes a first electrical connector 152 and a second electrical connector 154 that are mounted onto at least one second substrate 118, such as a second printed circuit board. The transceiver of FIG. 9C is configured to mate with both the first electrical connector and the second electrical connector, as shown in FIG. 10C. During operation, optical signals received by the FIG. 9C transceiver from the cable 116 are converted to electrical signals. Ones of the electrical signals are routed to the first electrical connector, while others of the electrical signals are routed to the second electrical connector. For instance, high speed electrical signals can be routed to the first electrical connector, and low speed electrical signals can be routed to the second electrical connector. For instance, the first electrical connector can be configured to transmit electrical signals at data transfer speeds of at least 10 Gigabits per second. Electrical power can also be routed to the second electrical connector. Conversely, electrical signals received by the transceiver of FIG. 9C from the first and second electrical connectors are converted into optical signals and output along the optical cables of the cable 116. Of course, in embodiments whereby the cable includes electrically conductive cables, transceiver is configured to receive electrical signals from the electrically conductive cables, and transmit electrical signals to the cable 116. Various ones of the electrical signals are routed to the first electrical connector, and various others of the electrical signals are routed to the second electrical connector. Of course, if the cable 116 includes only electrical cables, the transceiver could be provided without the optical engine.

The first electrical connector 152 can be mounted to the second printed circuit board 118 at a location spaced in a forward direction from a location where the second electrical connector 154 is mounted to the second printed circuit board 118. Similarly, the second electrical connector 154 is spaced from the first electrical connector 152 in a rearward direction opposite the forward direction. Thus, the first electrical connector 152 can be referred to as a front electrical connector, and the second electrical connector 154 can be referred to as a rear electrical connector. In one example illustrated at FIG. 10C of U.S. Pat. No. 9,374,165, the transceiver circuit board 113 is mated to the first electrical connector 152 in the forward direction, thereby establishing an electrical connection between electrical contacts of the first electrical connector and electrically conductive lands of the first circuit board 113. The first electrical connector 152 can be configured as a right-angle electrical connector. Next, the circuit board 113 can be mated with the second electrical connector 154 by bringing electrically conductive lands on the bottom side of the first circuit board 113 onto vertical compression electrical contacts of the second electrical connector 154, which can be configured as a vertical connector.

SUMMARY

In accordance with one aspect of the present disclosure, an interconnect system can include an interconnect module that is configured to mate with first and second electrical connectors of a host module, the second electrical connector spaced from the first electrical connector in a rearward direction, and the first electrical connector configured to operate at higher data transfer speeds than the second electrical connector. The interconnect module can include a module substrate and an optical engine supported by the module substrate, and a module housing mounted to the module substrate and at least partially surrounding the optical engine. The interconnect system can further include an anti-backout latch that defines at least one pivot member configured to be pivotally attached to the module housing such that the anti-backout latch is pivotable relative to the module housing about a pivot axis between the disengaged position and the engaged position. When the anti-backout latch is in the engaged position, 1) a first mechanical interference between the anti-backout latch and the module housing can limit movement of the interconnect module in the rearward direction with respect to the anti-backout latch in a rearward direction, 2) a second mechanical interference between the latch and the host module can limit movement of the latch in the rearward direction with respect to the first and second electrical connectors, and 3) the limited movements in the rearward direction can prevent the interconnect module from moving in the rearward direction with respect to the first and second electrical connectors a distance that would be sufficient to unmate the interconnect module from the first and second electrical connectors. When the anti-backout latch is in the disengaged position, the second mechanical interference can be removed, such that the interconnect module is movable in the rearward direction with respect to the first and second electrical connectors a sufficient distance so as to unmate the interconnect module from at least one of the first and second electrical connectors. The anti-backout latch can include a finger that defines the second mechanical interference with the host module when the latch is in the engaged position. The finger can be disposed above the first electrical connector when the latch is in the engaged position.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings:

FIG. 2B is an enlarged perspective view of a portion of the interconnect system illustrated in FIG. 2A, showing the anti-backout latch in an engaged position;

FIG. 2C is a perspective view of the anti-backout latch illustrated in FIG. 2A;

FIG. 3A is a perspective view of an interconnect system including an interconnect module, a host module, and a translatable anti-backout latch shown in an engaged position;

FIG. 3F is a perspective view of a portion of the interconnect module illustrated in FIG. 3A, with the interconnect module aligned to be mated with the host module;

FIG. 3J is a perspective view of the interconnect module illustrated in FIG. 3F, showing the latch member in a disengaged position;

FIG. 3K is a schematic side elevation view of a biasing member constructed in accordance with one embodiment;

FIG. 3L is a schematic side elevation view of a biasing member constructed in accordance with an alternative embodiment;

FIG. 5D is a sectional side elevation view of a portion of the interconnect system illustrated in FIG. 5B;

FIG. 6A is an exploded perspective view of an interconnect system including an interconnect module, a host module, and an anti-backout latch constructed in accordance with another embodiment shown in a disengaged position;

FIG. 6B is an enlarged perspective view of a portion of the interconnect system illustrated in FIG. 6A, showing the anti-backout latch in an engaged position;

FIG. 6C is a perspective view of the anti-backout latch illustrated in FIG. 6A;

FIG. 8A is a perspective view of an interconnect system including an interconnect module, a host module, and an anti-backout latch constructed in accordance with another embodiment shown in a disengaged position;

FIG. 9A is a perspective view of an interconnect system including an interconnect module, a host module, and an anti-backout latch constructed in accordance with another embodiment shown in a disengaged position;

FIG. 11A is a perspective view of an interconnect system including an interconnect module, a host module, with portions hidden to show an anti-backout latch constructed in accordance with another embodiment shown in a disengaged position;

FIG. 11D is an exploded perspective view of the interconnect module;

FIG. 11E is an exploded perspective view of a first electrical connector of the host module, showing securement tabs configured to be secured to an underlying substrate;

FIG. 12B is an enlarged perspective view of a portion of the interconnect system illustrated in FIG. 12A, showing the anti-backout latch in an engaged position;

FIG. 12F is an enlarged perspective view of a portion of the interconnect system illustrated in FIG. 12B, showing the latch in the disengaged position;

FIG. 12G is an enlarged perspective view of a portion of the interconnect system illustrated in FIG. 12A, showing the latch moved to the disengaged position from the engaged position;

DETAILED DESCRIPTION

The present disclosure recognizes that it is desirable to prevent a third electrical connector, such as an interconnect module such as a transceiver, from traveling in the rearward direction relative to the first and second connectors, which would cause the interconnect module to unmate from one or both of the first and second electrical connectors. Accordingly, various latches are disclosed that are configured to be moved to an engaged position whereby the latch prevents movement of the interconnect module in the rearward direction a sufficient distance to cause the transceiver 115 to unmate from one or both of the first and second electrical connectors.

Figure 1A:
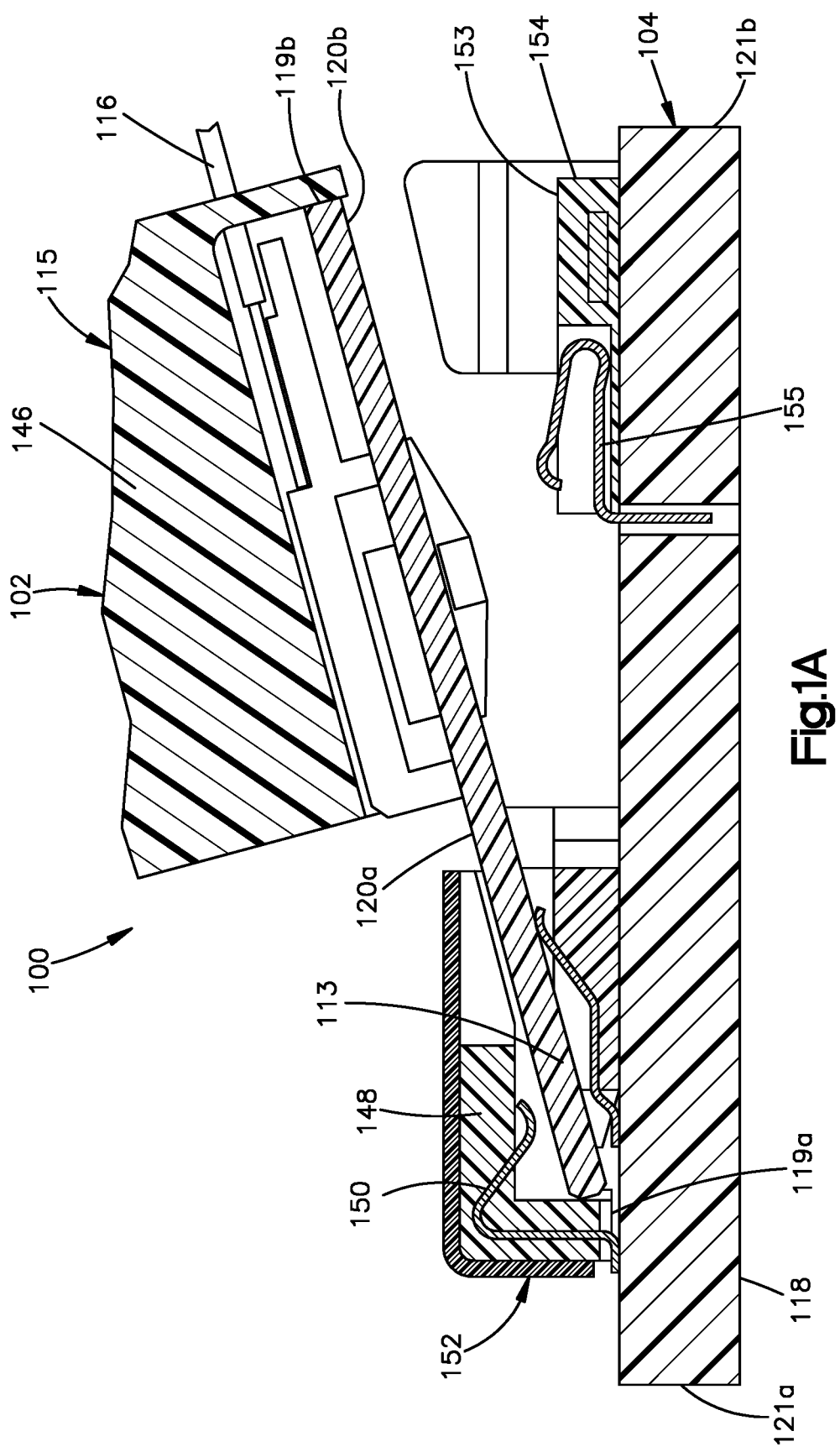
FIG. 1A is a side elevation view of an interconnect system including an interconnect module shown mated to a host module.

Referring initially to FIG. 1A, the first or interconnect substrate 113, which can be configured as a first printed circuit board, defines a first end 119a and a second end 119b opposite the first end 119a. In particular, the first end 119a can be spaced from the second end 119b in the forward direction. Similarly, the second end 119b can be said to be spaced from the first end 119a in the rearward direction. Thus, the first end 119a can be referred to as a front end, and the second end 119b can be referred to as a rear end.

The forward and rearward directions can be said to extend along a longitudinal direction L. The first printed circuit board 113 further defines a first side 120a and a second side 120b opposite the first side 120a. The first and second sides 120a and 120b are spaced from each other along a transverse direction T. The transverse direction T is oriented substantially perpendicular to the longitudinal direction L. The first side 120a can be said to be spaced from the second side 120b in an upward direction. Similarly, the second side 120b can be said to be spaced from the first side 120a in a downward direction opposite the upward direction. Both the upward and downward direction can be said to extend along the transverse direction T. The terms "upward," "upper," "up," "above," and derivatives thereof are used herein with reference to the upward direction. The terms "downward," "lower," "down," "below," and derivatives thereof are used herein with reference to the downward direction. Of course, it should be appreciated that the actual orientation of the transceiver 115 can vary during use, and that the terms upward and downward and their respective derivatives can be consistently used as described herein regardless of the orientation of the transceiver 115 during use.

The first printed circuit board 113 further defines a first row of electrically conductive lands on the first side 120a, and a second row of electrically conductive lands on the second side 120b. The lands of the first row are spaced from each other along a lateral direction A that is oriented substantially perpendicular to each of the transverse direction T and the longitudinal direction L. Similarly, the lands of the second row are spaced from each other along the lateral direction A.

The second or host substrate 118, which can be configured as a second printed circuit board, defines a first end 121a and a second end 121b opposite the first end. In particular, the first end 121a can be spaced from the second end 121b in the forward direction. Similarly, the second end 121b can be said to be spaced from the first end 121a in the rearward direction. Thus, the first end 121a can be referred to as a front end, and the second end 121b can be referred to as a rear end.

As described above, the transceiver 115 is configured to mate with the first electrical connector 152 and the second electrical connector 154. For instance, the transceiver 115 is configured to be mated to the first electrical connector 152 by inserting the transceiver 115 in the forward direction until the first end 119a of the first printed circuit board 113 is mated with the first electrical connector 152. The first printed circuit board 113 can be oriented at an angle with respect to the second printed circuit board 118. For instance, the first end 119a can be spaced a first distance from the second printed circuit board 118 along the transverse direction T, and the second end 119b can be spaced a second distance from the second printed circuit board 118 that is greater than the first distance. Once the transceiver 115 is mated with the first electrical connector 152, the second end 119b of the first printed circuit board 113 can then be brought down onto the second electrical connector 154 such that electrical lands on the second side 120b of the printed circuit board 113 are placed in contact with electrical contacts of the second electrical connector 154. Alternatively, the first printed circuit board 113 can be oriented parallel to the second printed circuit board 118 while being mated to the first electrical connector 152, in which case the first printed circuit board 113 can be mated to the second electrical connector 154 substantially simultaneously with mating to the first electrical connector 152.

Figure 1B:
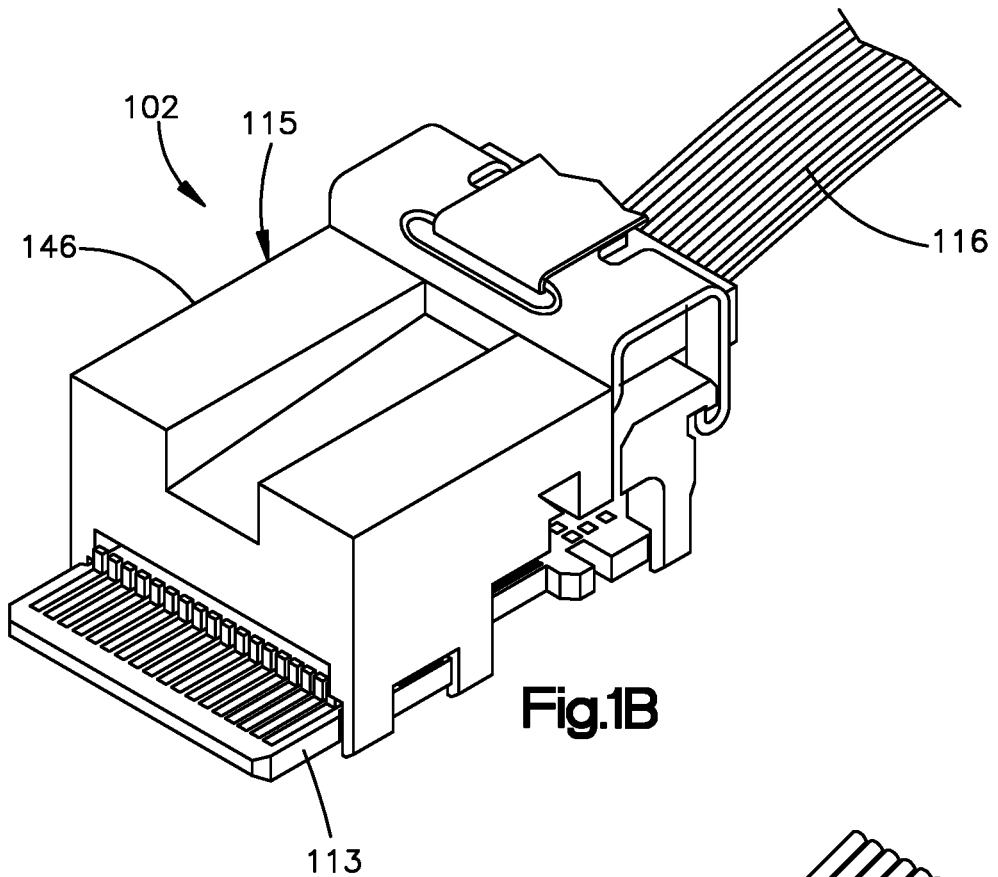
FIG. 1B is a perspective view of the interconnect module of FIG. 1A in accordance with one embodiment.
Figure 1C:
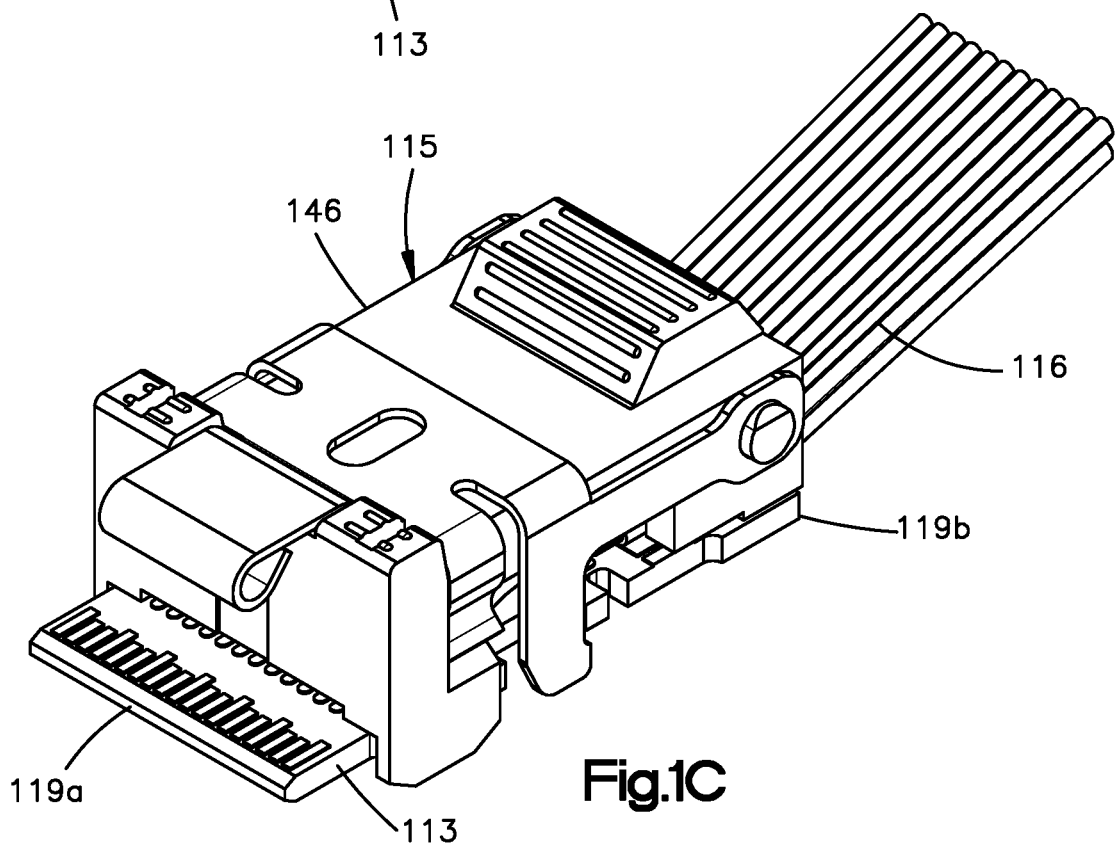
FIG. 1C is a perspective view of the interconnect module of FIG. 1A in accordance with another embodiment.

While the first electrical connector 152 may be configured to receive high speed electrical signals, and the second electrical connector 154 may be configured to receive low speed electrical signals, power signals, or both it should be appreciated that the first and second electrical connectors 152 and 154 can be alternatively configured as desired. Further, while the interconnect module 102 is configured as the transceiver 115 in accordance with one embodiment, the interconnect module 102 can be alternatively configured as desired as an electrical component that is configured to be placed in electrical communication with each of the first and second electrical connectors 152 and 154. The interconnect module 102 can further include a module housing 146 that can at least partially surround one or more components of the interconnect module 102. For instance, as illustrated in FIG. 1B, where the interconnect module 102 is configured as a transceiver that includes the optical engine and optical cables 116A, the module housing can be a metallic housing. The module housing 146 can provide electrical shielding for the optical engine. Alternatively or additionally, the module housing 146 can transfer heat away from the optical engine. As illustrated in FIG. 1C, where the cable 116 includes only electrically conductive cables, the module housing 146 can be a plastic housing that at least partially surrounds one or more components of the transceiver, such as the optical engine. The module housing 146 can be mounted to, or otherwise supported by, the first printed circuit board 113. In one example, for instance when the interconnect module 102 includes an optical transceiver, the module housing 146 can be configured as a heat sink. Thus, as shown in FIG. 1B, the module housing 146 can be a metal, thermally conductive plastic, or any alternative suitable thermally conductive material. In other embodiments, such as FIG. 1C, for instance, when the cable 116 includes only electrically conductive cables, the module housing 146 can be configured as an electrically insulative material, such as a plastic. The module housing 146 can be electrically conductive or electrically non-conductive, regardless of the type of cable 116, 116A used.

Referring generally now to FIGS. 1A, 2A, 3A, 4A, 4D, 5A, 6A, 7A, 8A, 8B, 9A, 10A, 11A, and 12A it is recognized that it is desirable to prevent the interconnect module 102 from inadvertently unmating from one or both of the first and second electrical connectors 152 and 154, respectively. Accordingly, an interconnect system 100 can include the interconnect module 102, such as the transceiver 115 described above, and an anti-backout latch that is configured to prevent backout of the interconnect system 100 in the rearward direction. Thus, the module housing 146 can also be referred to as a transceiver housing in some examples. It should be further appreciated that the interconnect system 100 can further include one or both of the first and second electrical connectors 152 and 154. The interconnect system 100 can further include the second printed circuit board 118, either alone or in combination with one or both of the first and second electrical connectors 152 and 154. Further, one or both of the first and second electrical connectors 152 and 154 can be mounted onto the second printed circuit board 118 in the manner described above. The second printed circuit board 118 with at least one or both of the first and second electrical connectors 152 and 154 mounted thereto can be referred to as a host module 104. The latch can be configured in accordance with any suitable embodiment as desired, including those described in more detail below with reference to FIGS. 2A-10C. The latch can be made of any suitable material, such as a metal or a plastic.

As will further be described below, it is also desired to ensure that the first and second electrical connectors 152 and 154 are robustly secured to the underlying host substrate 118. Thus, the interconnect system can 100 can include securement members that are configured to further secure the first and second electrical connectors 152 and 154 to the underlying host substrate 118.

Figure 2A:
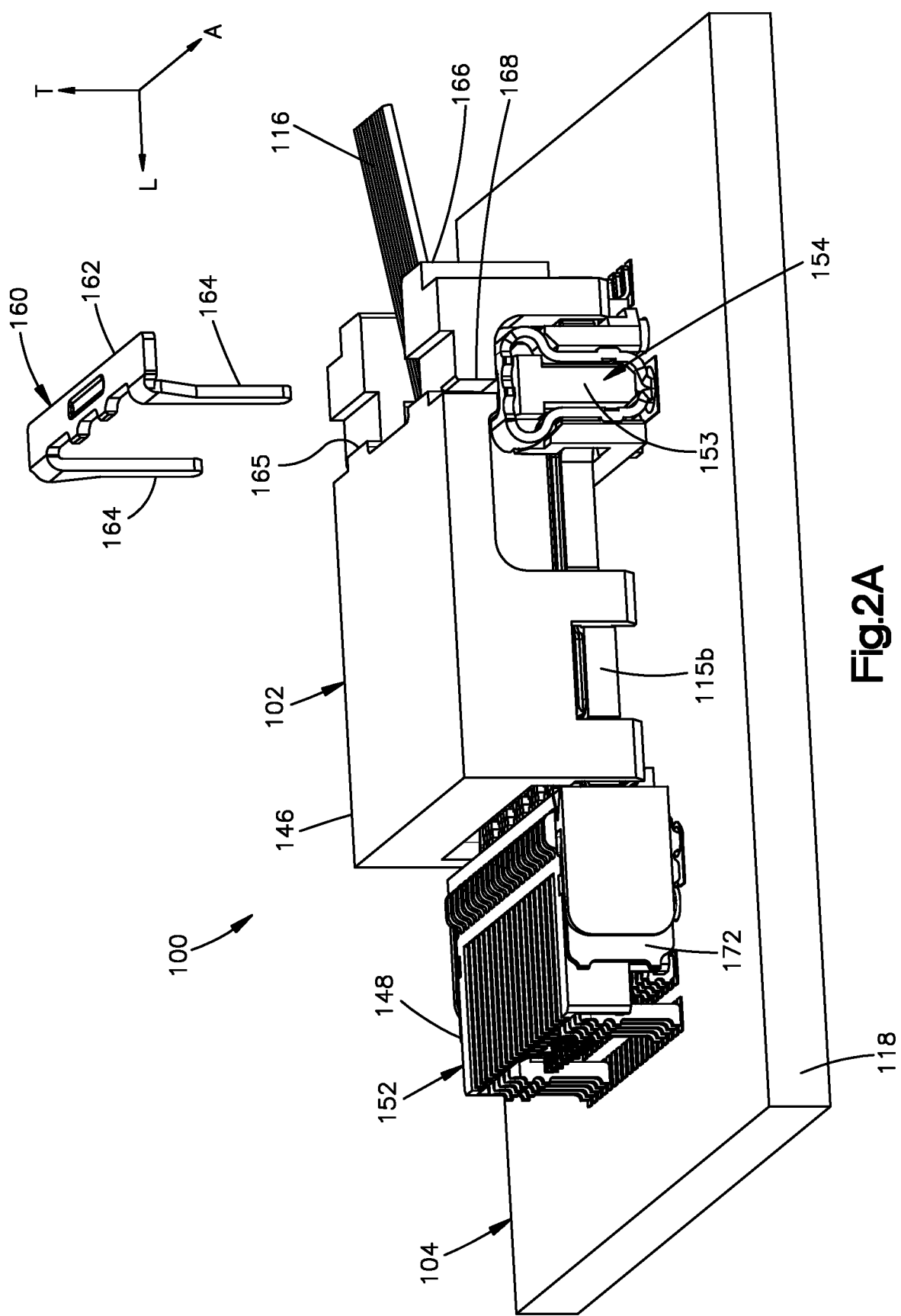
FIG. 2A is an exploded perspective view of an interconnect system including an interconnect module, a host module, and an anti-backout latch shown in a disengaged position.

Referring to FIG. 2A, the interconnect system 100 can include the interconnect module 102 and the host module 104 as described above. The host module 104 can include the host substrate 118. Alternatively or additionally, the host module 104 can include at least one host electrical connector. The at least one host electrical connector can include the first electrical connector 152 and the second electrical connector 154. The first and second electrical connectors 152 and 154 can be configured to be mounted to the host substrate 118. Alternatively, the first and second electrical connectors 152 and 154 can be mounted to the host substrate 118.

The first electrical connector 152 includes a first electrically insulative connector housing 148 and a first plurality of electrical contacts 150 that are supported by the connector housing. For instance, the first plurality of electrical contacts 150 can be arranged in rows that are oriented along the lateral direction A. The first connector housing 148 defines a receptacle that is configured to receive the first end of the module substrate 113 so as to mate the interconnect module 102 with the first electrical connector 152. In particular, the first end of the module substrate 113 is configured to be inserted into the receptacle of the first connector housing 148 in the forward direction so as to cause electrically conductive lands of the module substrate 113 to mate with respective ones of the first plurality of electrical contacts 150 of the first electrical connector 152.

The second electrical connector 154 includes a second electrically insulative connector housing 153 and a second plurality of electrical contacts 155 that are supported by the connector housing. For instance, the second plurality of electrical contacts 155 can be arranged in at least one row that is oriented along the lateral direction A. The second plurality of electrical contacts 155 can extend out of the second connector housing 153 along the transverse direction away from the host substrate 118. Thus, electrically conductive lands on a lower surface of the second end of the module substrate 113 can be brought down onto the respective ones of the second plurality of electrical contacts 155, so as to mate the interconnect module 102 with the second electrical connector 154.

The interconnect system 100 can include an anti-backout latch 160 designed to prevent the interconnect module 102 from being inadvertently unmated from the host module 104. The latch 160 can include a support member 162 that is configured to be placed in mechanical communication with the interconnect module 102, and at least one finger 164 that extends out or perpendicularly from the support member 162 and is configured to be placed in mechanical communication with the host module 104. For instance, the at least one finger 164 can extend down from the support member 162 along the transverse direction T. When the interconnect module 102 is mated with the at least one electrical connector of the host module 104, the latch 160 can be movable between a disengaged position and an engaged position. In particular, the latch 160 can be translatable along the transverse direction T between the disengaged position and the engaged position. For instance, the latch 160 can be translatable in the downward direction to move the latch 160 from the disengaged position to the engaged position, and in the upward direction to move the latch 160 from the engaged position to the disengaged position. When the latch 160 is in the engaged position, a first mechanical interference is defined between the latch 160 and the interconnect module 102 that limits rearward movement of the interconnect module 102 with respect to the latch 160 in the rearward direction. The first mechanical interference can include an abutment between the anti-backout latch 160 and the interconnect module 102.

Further, when the latch 160 is in the engaged position, a second mechanical interference is defined between the finger 164 and the host module 104 limits rearward movement of the latch 160 respect to the at least one electrical connector of the host module 104. The second mechanical interference can include an abutment between the anti-backout latch 160 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 160, and of the latch 160 with respect to the at least one electrical connector of the host module 104, respectively. When the latch 160 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104.

The latch 160 can include a pair of first and second fingers 164 that may be spaced apart from each other, oriented parallel to one another, and extend from the support member 162. Thus, the support member 162 can be connected between the fingers 164. For instance, the support member 162 can be connected between the fingers 164 along the lateral direction A. The support member 162 and the fingers 164 can be monolithic with each other. Alternatively, the support member 162 and fingers 164 can be attached to each other in any suitable manner as desired. The support member 162 can be configured as an upper cross-bar that is elongate along the lateral direction A. The fingers 164 can extend down from laterally opposed ends of the support member 162. For instance, the fingers 164 can be elongate along the transverse direction T. The interconnect module 102 can include a recess 166 that extends into the upper end of the module housing 146. The recess 166 can extend down into the upper end of the module housing 146 along the transverse direction T. The recess can extend through the upper end of the module housing 146 along the lateral direction A. The recess 166 can be sized to receive the support member 162. The interconnect module 102 can further include at least one channel 168, such as a pair of channels 168, that extends from the recess 166 through the module housing 146 along the transverse direction T. The host module 104 can similarly define channels 170 (FIGS. 2B and 2E) that each extend at least into or through respective laterally outer ends of the second connector housing 153. The channels 170 can be aligned with the at least one channel 168 (FIGS. 2A and 2B) along the transverse direction T.

During operation, the latch 160 can be translatable between the engaged position (FIG. 2B) and the disengaged position (FIG. 2A). For instance, the latch 160 can be translatable between the engaged position and the disengaged position along a direction angularly offset with respect to the rearward direction. The angularly offset direction can be the transverse direction T. In particular, as shown in FIGS. 2A and 2B, the latch 160 can be inserted into the interconnect system 100 (FIG. 2A) along the transverse direction T such that 1) the support member 162 seats in the recess 166, and the fingers 164 extend through the at least one channel 168 and the channels 170, respectively. Abutment between the support member 162 and the module housing 146 can define the first mechanical interference. Abutment between the fingers 164 and the second connector housing 153 can define the second mechanical interference. In particular, abutment between the fingers and laterally opposed ends of the second connector housing 153 can define the second mechanical interference. As will be described in more detail below, the laterally opposed ends of the connector housing are configured to attach to a securement member that, in turn, is configured to attach to the host substrate 118. In particular, the laterally opposed ends of the connector housing are configured to be received by respective securement members.

As shown in FIGS. 2A-2C, the support member 162 can further define at least one recess 163 that is configured to receive a complementary projection 165 (FIGS. 2A and 2B) of the module housing 146 when the support member 162 is seated in the recess 166. The at least one recess 163 can extend into the front end of the support member 162 in the rearward direction. For instance, the support member 162 can include a pair of recesses 163 that are spaced from each other along the lateral direction A. The recesses 163 can extend through the support member 162 along the transverse direction. The recesses 163 and the complementary projections 165 can have substantially the same size and shape, such that when the projections 165 interlock in the recesses 163, interference between the support member 162 and the module housing 146 prevent relative movement between the latch 160 and the interconnect module 102 (FIG. 2A) along the lateral direction A.

As shown in FIGS. 2A and 2B, the latch 160 can be removed from the host module 104 in the upward direction along the transverse direction T, thereby removing the second interference. In particular, the latch fingers 164 can be removed from the channels 170 so as to remove the second interference. Thus, the latch 160 does not prevent the interconnect module 102 from translating relative to the host module 104 in the rearward direction a sufficient distance so as to unmate the interconnect module 102 from at least one or both of the first electrical connector 152 and the second electrical connector 154. The latch 160 can further translated in the upward direction so as to remove the latch 160 from the interconnect module 102, thereby removing the first mechanical interference.

Figure 2D:
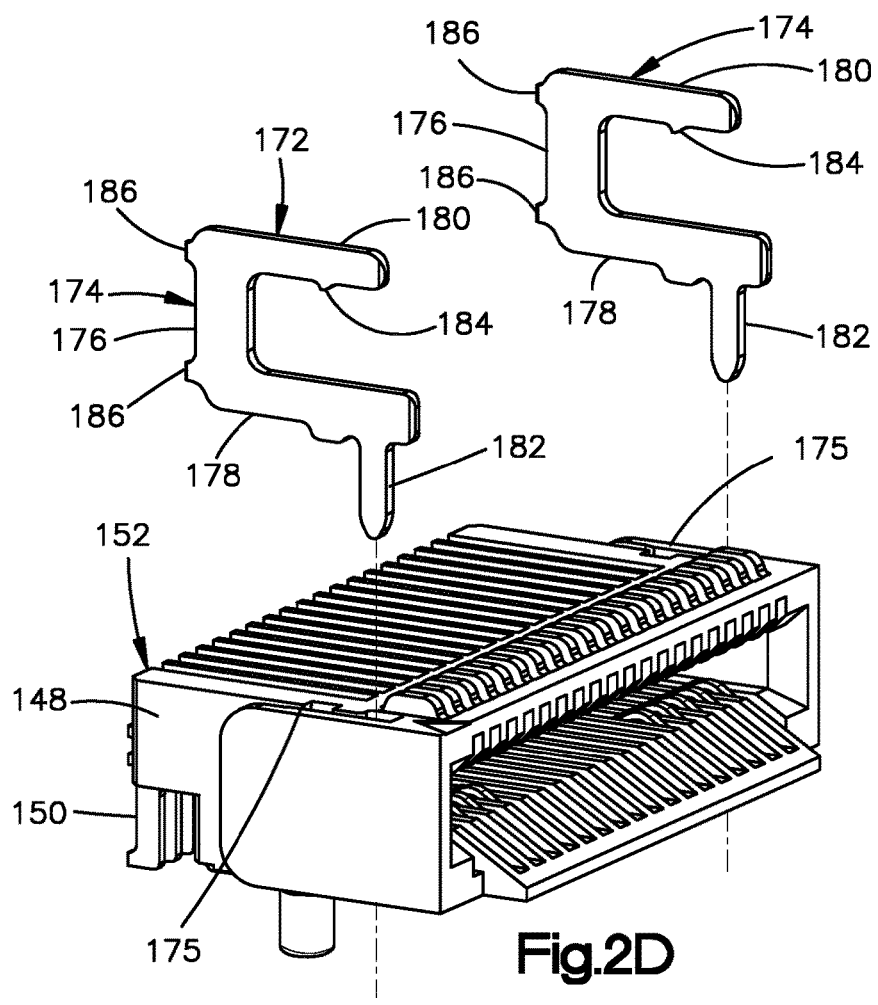
FIG. 2D is an exploded perspective view of a first electrical connector of the host module showing securement tabs configured to be secured to an underlying substrate.
Figure 2E:
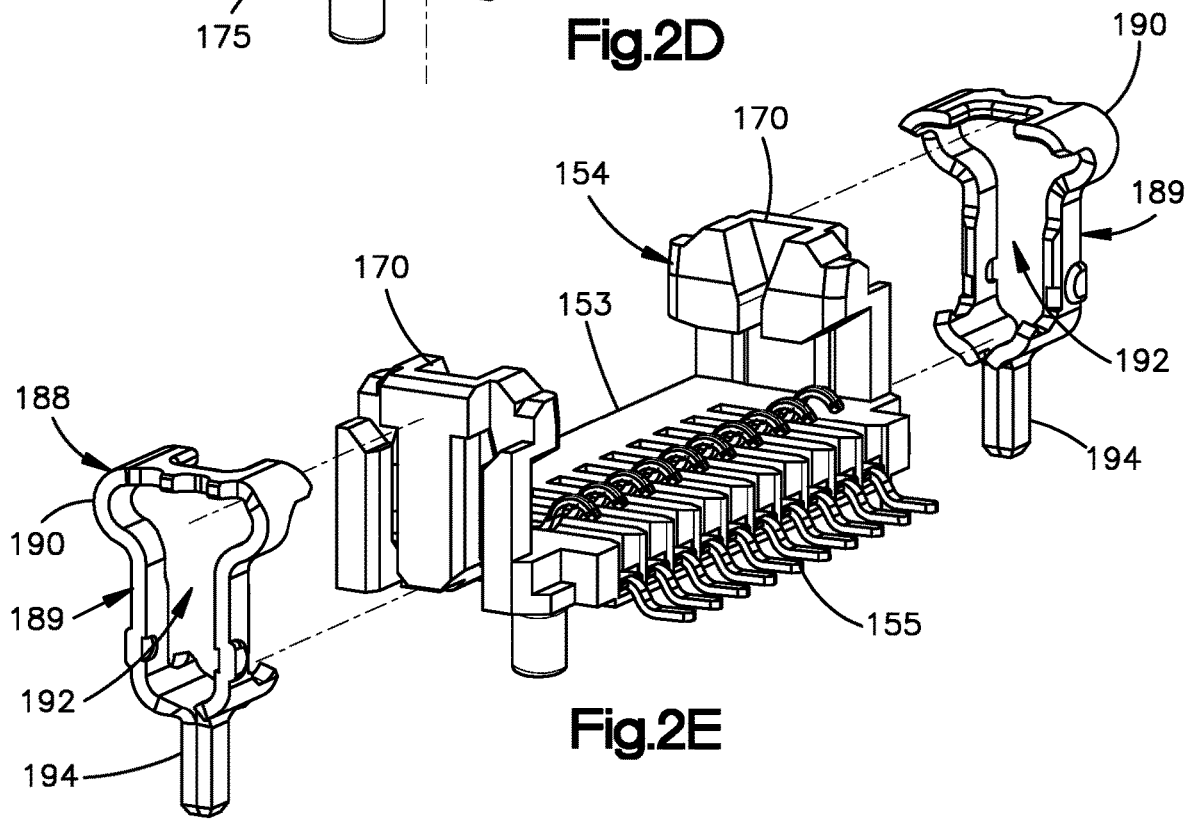
FIG. 2E is an exploded perspective view of a second electrical connector of the host module showing securement tabs configured to be secured to an underlying substrate.

Referring now also to FIGS. 2D-2E, and as described above, the interconnect system 100 (FIG. 2A) can further include at least one securement member configured to be coupled to one of the first and second electrical connectors 152 and 154, and further configured to be secured to the host substrate 118 (FIG. 2A). Thus, the at least one securement member 172, 188 is configured to attach a corresponding at least one of the first and second electrical connectors 152 and 154 to the host substrate 118. The securement member can include a securement tab that is configured to be secured in an aperture of the underlying host substrate 118. For instance, the securement tab can be welded in the aperture of the host substrate 118, which can be configured as a through hole plated with a metallic material. Alternatively, the securement tabs of all securement members described herein can be press-fit, latched, fastened using one or more fasteners, or secured in the aperture of the host substrate 118 or otherwise secured to the host substrate 118 in any suitable manner as desired. The securement member is further configured to attach to the corresponding connector housing, thereby further securing the connector housing to the underlying host substrate 118. It will be appreciated that the securement members are not electrical contacts, and are sized and shaped differently than the electrical contacts of the corresponding electrical connector. For instance, the securement tab can be thicker along a plane oriented in the lateral and longitudinal directions than the mounting ends of the electrical contacts that are mounted to the host substrate 118.

As illustrated in FIG. 2D, the host module 104 (FIG. 2A), and thus the interconnect system 100 (FIG. 2A), can include a securement member 172 that is configured to further secure the first electrical connector 152 to the host substrate 118 (FIG. 2A). For instance, the securement member 172 can include a securement body 174 having an upstanding wall 176, and a lower wall 178 that extends from a lower end of the upstanding wall 176 in the rearward direction. The securement body 174 can further include an upper wall 180 that extends from an upper end of the upstanding wall 176 in the rearward direction. The upper wall 180 can be opposite the lower wall 178, and can be spaced from the lower wall 178 along the transverse direction T so as to define an opening therebetween. The lower wall 178 can extend to a location offset with respect to the upper wall 180 in the rearward direction. The upstanding wall 176, the upper wall 180, and the lower wall 178 can all be coplanar with each other along a plane defined by the transverse direction T and the longitudinal direction L. Further, the upstanding wall 176, the upper wall 180, and the lower wall 178 can all dimensioned greater in the plane than in the lateral direction A that is perpendicular to the plane.

The securement member 172 can further include a securement tab 182 that extends down from the securement body 174. For instance, the securement tab 182 can extend from the lower wall 178. The securement tab 182 is configured to be secured in an aperture of the underlying host substrate 118. For instance, the securement tab 182 can be welded in the aperture of the host substrate 118. The securement member 172 can be configured to be received in a slot 175 of the first connector housing 148 so as to attach the securement member 172 to the first electrical connector 152. For instance, the upstanding wall 176 is configured to be inserted into the slot 175.

The securement body 174 can include a retention bump 184 that is configured to engage the first connector housing 148 so as to secure the securement member 172 to the first electrical connector 152. For instance, the retention bump 184 can extend from the upper wall 180. In one example, the retention bump 184 can extend from the upper wall 180 toward the lower wall 178. Thus, the retention bump 184 can extend from the securement body 174 into the opening. The securement body 174 can further include at least one projection 186 that extends from the upstanding wall 176 in the forward direction. Thus, the projection 186 can extend away from the upstanding wall 176 in a direction away from the opening of the securement member 172. The projection 186 can lie in the same plane defined by the transverse direction T and the longitudinal direction L. In one example, the securement body 174 can include first and second ones of the projection 186 spaced from each other along the transverse direction.

It should be appreciated that the securement member 172 can include any number of the securement bodies 174 as desired. For instance, the securement member 172 can include a single securement body 174 configured to be coupled between the host substrate 118 and the first electrical connector 152 in the manner described above. Alternatively, the securement member 172 can include first and second securement bodies 174 that are each configured to be coupled between the host substrate 118 and the first electrical connector 152 in the manner described above. For instance, the first and second securement bodies 174 can attach to laterally outer ends of the first connector housing 148. In one example, the first plurality of electrical contacts 150 can be disposed between the first and second securement bodies 174.

Referring now to FIG. 2E, the host module 104 (FIG. 2A), and thus the interconnect system 100 (FIG. 2A), can include includes a second securement member 188 that is configured to further secure the second electrical connector 154 to the host substrate 118. In this regard, the securement member 172 configured to secure the first electrical connector 152 to the host substrate 118 can be referred to as a first securement member. The second securement member 188 configured to secure the second electrical connector 154 to the host substrate 118 can be referred to as a second securement member.

The second securement member 188 can include a second securement body 189 having an upper portion 190 that is configured to surround a portion of the second connector housing 153, so as to attach the second securement member 188 to the second electrical connector 154. In this regard, the upper portion 190 can be referred to as a saddle. For instance, the second securement member 188 can define an opening 192 that extends at least into or through the upper portion 190 and is sized to receive a portion of the second connector housing 153. The opening 192 can, for instance, extend into or through the upper portion 190 along the lateral direction A. For instance, the opening 192 can have a shape that is complementary to the portion of the second connector housing 153.

The second securement body 189 can further include a securement tab 194 that extends out from the upper portion 190. The securement tab 194 can, for instance, extend down from the upper portion 190 along the transverse direction T. The second securement member 188 is sized and shaped different than the second plurality of electrical contacts 155. For instance, when the second securement member 188 is attached to the second connector housing 153, the upper portion 190 is upwardly offset from the respective mating ends of the electrical contacts 155.

It should be appreciated that the second securement member 188 can include any number of the second securement bodies 189 as desired. For instance, the second securement member 188 can include a single securement body 189 configured be coupled between the host substrate 118 and the second electrical connector 154 in the manner described above. Alternatively, the second securement member 188 can include first and second securement bodies 189 that are each configured to be coupled between the host substrate 118 and the second electrical connector 154 in the manner described above. For instance, the first and second securement bodies 189 can attach to laterally outer ends of the second connector housing 153. In one example, the second plurality of electrical contacts 155 can be disposed between the first and second securement bodies 189.

Referring to FIGS. 3A-12I generally, it is recognized that the interconnect system 100 can include any suitably constructed latch in accordance with any embodiment as desired that is movable to the engaged position as described above. Further, the interconnect system 100 as described below with reference to FIGS. 3A-12I can include the interconnect module 102, the host module 104, and the first and second securement members 172 and 188 as described above, unless otherwise indicated.

Figure 3B:
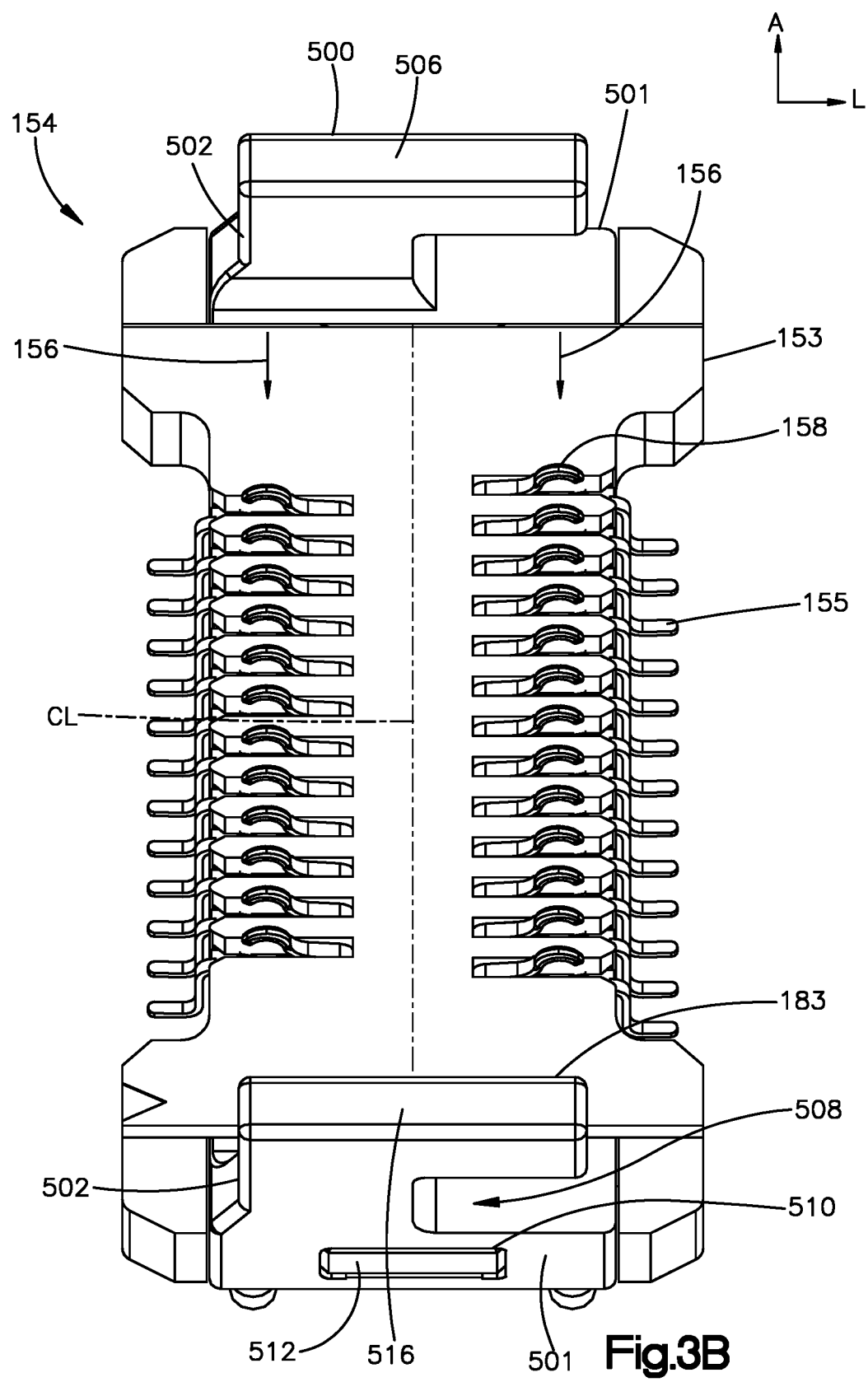
FIG. 3B is a top plan view of an electrical connector of the host module.
Figure 3C:
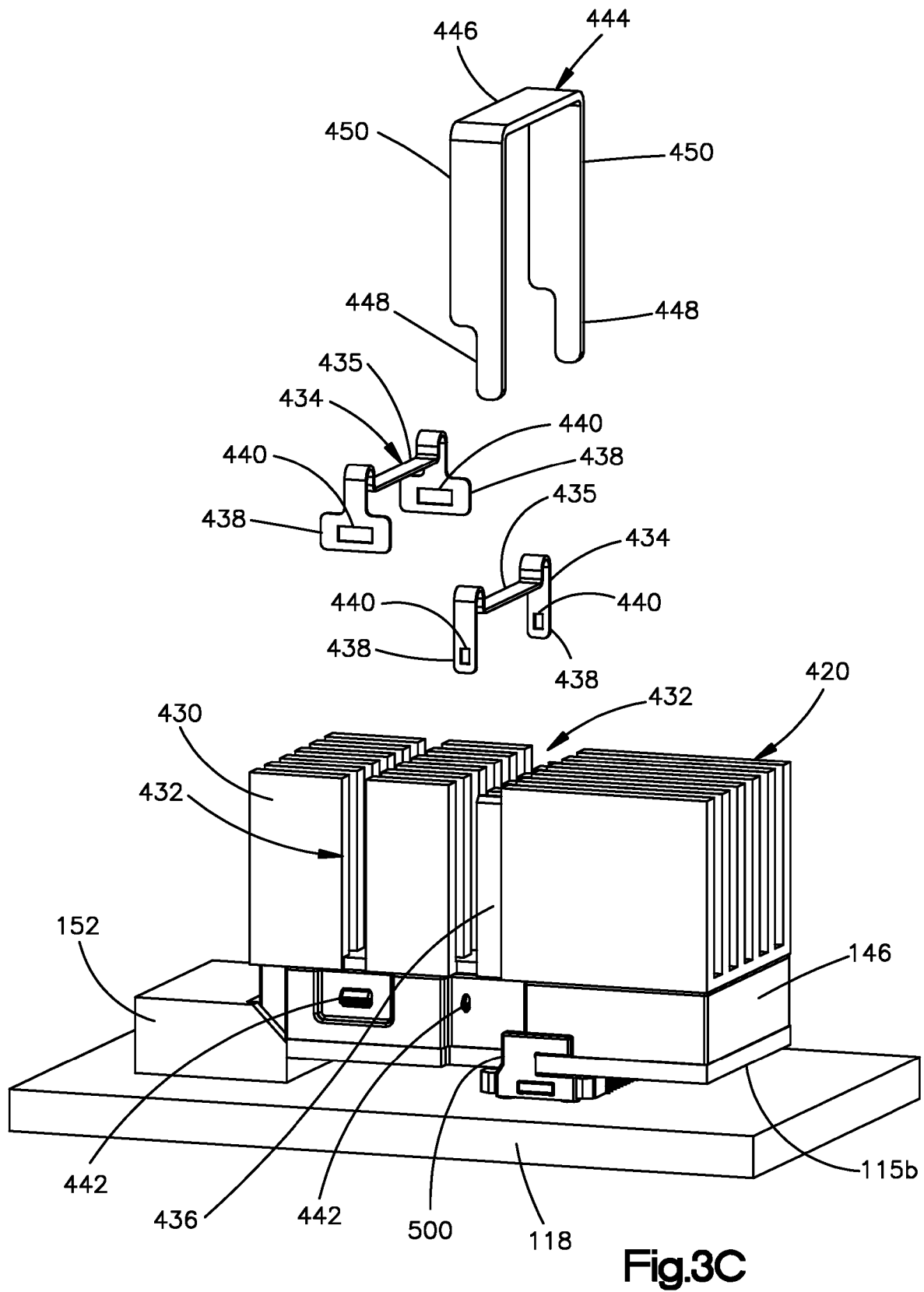
FIG. 3C is an exploded perspective view of the interconnect system illustrated in FIG. 3A, including a heat sink.
Figure 3D:
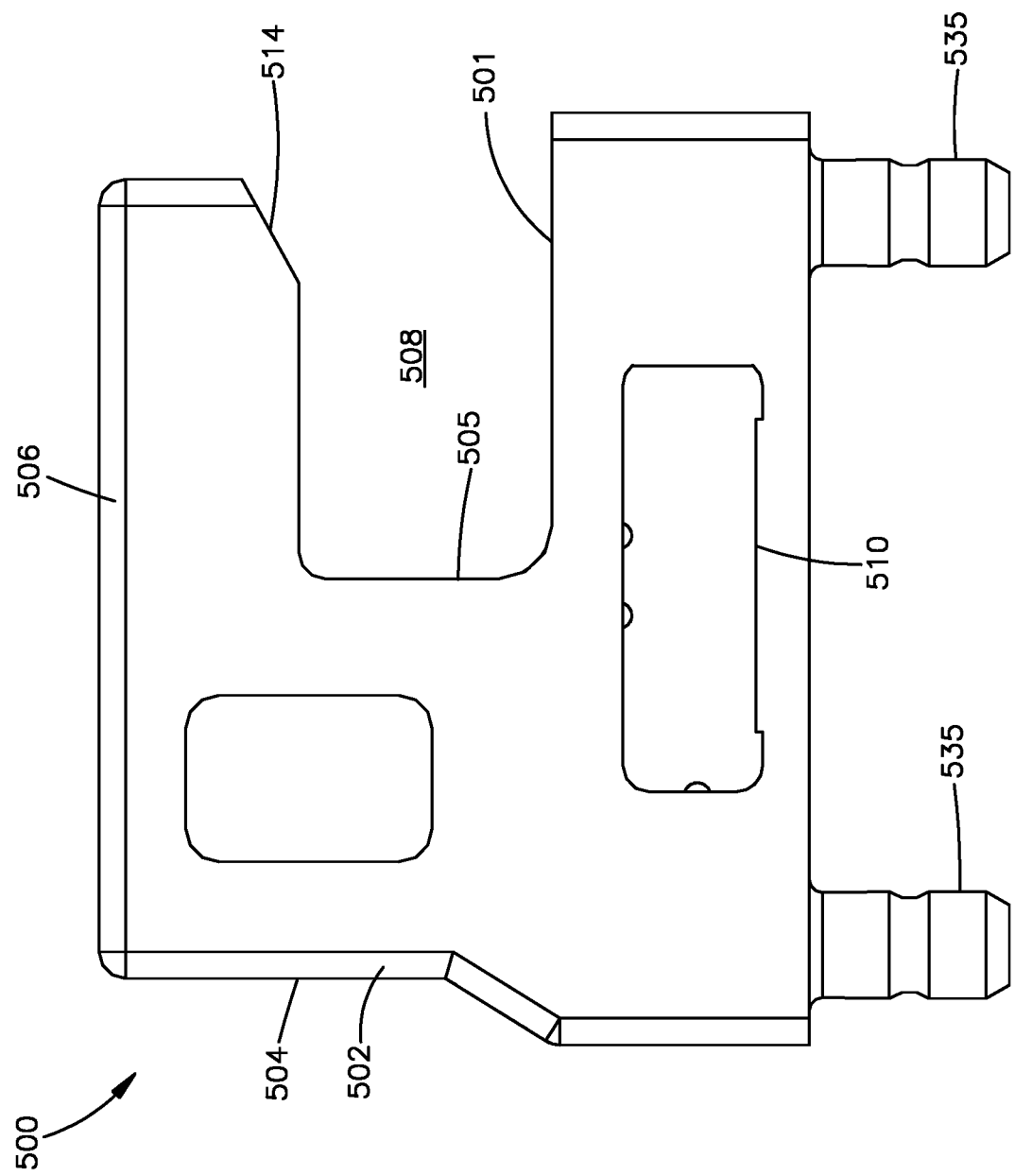
FIG. 3D is a side elevation view of a securement member of the electrical connector illustrated in FIG. 3B.

Referring now to FIGS. 3A-3C, the interconnect system 100 can include the interconnect module 102 and the host module 104. The host module 104 can include the host substrate 118. Alternatively or additionally, the host module 104 can include at least one host electrical connector. The at least one host electrical connector can include one or both of the first electrical connector 152 and the second electrical connector 154. The first and second electrical connectors 152 and 154 can be configured to be mounted to the host substrate 118. Alternatively, the first and second electrical connectors 152 and 154 can be mounted to the host substrate 118.

The first electrical connector 152 includes a first electrically insulative connector housing and a first plurality of electrical contacts that are supported by the connector housing. The first connector housing can be made of plastic. For instance, the first plurality of electrical contacts can be arranged in rows that are oriented along the lateral direction A. The first connector housing defines a receptacle that is configured to receive the first end of the module substrate 113 so as to mate the interconnect module 102 with the first electrical connector 152. In particular, the first end of the module substrate 113 is configured to be inserted into the receptacle of the first connector housing in the forward direction so as to cause electrically conductive lands of the module substrate 113 to mate with respective ones of the first plurality of electrical contacts of the first electrical connector 152. The forward direction can be oriented along a longitudinal direction L. The longitudinal direction L further defines a rearward direction that is opposite the forward direction.

The second electrical connector 154 includes a second electrically insulative connector housing 153 and a second plurality of electrical contacts 155 that are supported by the connector housing. The second connector housing 153 can be made of a plastic. The second plurality of electrical contacts 155 can extend out of the second connector housing 153 along the transverse direction T away from the host substrate 118. Thus, electrically conductive lands on a lower surface of the second end of the module substrate 113 can be brought into contact with the respective ones of the second plurality of electrical contacts 155, so as to mate the interconnect module 102 with the second electrical connector 154. It is recognized that the electrical contacts 155 can be configured as compression contacts that compress toward the underlying host substrate 118 in response to contact with the module substrate 113. In particular, the electrical contacts 155 define contact locations 158 that are configured to contact the module substrate 113 so as to place the electrical contacts 155 in electrical communication with the module substrate 113. For instance, the contact locations 158 can be the uppermost locations of the electrical contacts 155 along the transverse direction T. In one example, the electrical contacts 155 can define curved mating ends whose apices define the contact locations 158. The second plurality of electrical contacts 155 can be arranged in at least one row 156 that is oriented along the lateral direction A. For instance, the electrical contacts 155 can be arranged in first and second rows 156 that are spaced from each other along the longitudinal direction L. The contact locations 158 can be aligned with the rows 156.

The interconnect system 100 can include an anti-backout latch 444 designed to prevent the interconnect module 102 from being inadvertently unmated from the host module 104. The latch 444 can include a support member 446 that is configured to be placed in mechanical communication with the interconnect module 102, and at least one finger 448 that extends out or perpendicularly with respect to the support member 446 and is configured to be placed in mechanical communication with the host module 104. For instance, the at least one finger 448 can extend down from the support member 446 along the transverse direction T. Alternatively, the latch 444 can include at least one arm 450 that extends down from the support member 446, and the at least one finger 448 can extend down from the at least one arm 450. Each at least one finger 448 can define a length along the longitudinal direction L that is less than that of the arm 450.

When the interconnect module 102 is mated with the at least one electrical connector of the host module 104, the latch 444 can be movable between a disengaged position and an engaged position. In particular, the latch 444 can be translatable along the transverse direction T with respect to the interconnect module 102 between the disengaged position and the engaged position. For instance, the latch 444 can be translatable in the downward direction to move the latch 444 from the disengaged position to the engaged position, and in the upward direction to move the latch 444 from the engaged position to the disengaged position. When the latch 444 is in the engaged position, a first mechanical interference is defined between the latch 444 and the interconnect module 102 that limits rearward movement of the interconnect module 102 with respect to the latch 444 in the rearward direction. The first mechanical interference can include an abutment between the anti-backout latch 444 and the interconnect module 102. Alternatively, the latch 444 can be monolithic with the interconnect module 102 so as to define the first mechanical interference.

Further, when the latch 444 is in the engaged position, a second mechanical interference is defined between the latch 444 and the host module 104 limits rearward movement of the latch 444 respect to the at least one electrical connector of the host module 104. In particular, the second mechanical interference can be defined between the latch finger 448 and the host module 104. The second mechanical interference can include an abutment between the anti-backout latch 444 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 444, and of the latch 444 with respect to the at least one electrical connector of the host module 104, respectively. When the latch 444 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104.

The latch 444 can include a pair of first and second fingers 448 that may be spaced apart from each other along the lateral direction A. The first and second fingers 448 can be oriented parallel to one another. The support member 446 can be connected between the fingers 448. For instance, the support member 446 can be connected between the fingers 448 along the lateral direction A. The support member 446 and the fingers 448 can be monolithic with each other. Alternatively, the support member 446 and fingers 448 can be attached to each other in any suitable manner as desired. The support member 446 can be configured as an upper cross-bar that is elongate along the lateral direction A. The fingers 448 can extend down with respect to laterally opposed ends of the support member 446. For instance, the fingers 448 can be elongate along the transverse direction T. The latch 444 can include first and second arms 450 that extend down from the opposed ends of the support member 446, and fingers 448 that extend down from lower ends of the arms 450, respectively. The fingers 448 can be jogged with respect to the respective arms 450.

The interconnect system 100, and in particular the host module 104, can include at least one securement member 500 that is configured to engage the latch 444 when the latch is in the engaged position. For instance, the second electrical connector 154 can include the at least one securement member 500. Alternatively or additionally, the securement member 500 can be configured to retain the module substrate 113 against the electrical contacts of the second electrical connector 154. The securement member 500 can be configured to secure the module substrate 113 to the second electrical connector 154 with respect to separation along the transverse direction T.

The securement member 500 can be supported by the second connector housing 153. For instance, the securement member 500 can be attached to the second connector housing 153. Alternatively the securement member 500 can be attached to the host substrate 118, and the second connector housing can be supported and attached to the securement member 500. Alternatively still, both the second electrical connector and the securement member 500 can be attached to each other and the host substrate 118. Alternatively still, the securement member 500 can be monolithic with the second connector housing 153. In this regard, it should be appreciated that the securement member 500 can be made from the same material as the second connector housing 153 or of a different material than the second connector housing 153. For instance, the securement member 500 can be made of a plastic. Alternatively or additionally, the securement member 500 can be made of a metal. In one example, the interconnect module 102 can include first and second securement members 500 supported by the connector housing 153 at locations spaced from each other along the lateral direction A. For instance, the first and second securement members 500 can be supported by laterally opposed ends of the connector housing 153. Thus, the first and second securement members 500 can be aligned with each other along the lateral direction A.

The securement member 500 includes a base 501 and a securement wall 502 that extends up from the base 501 along the transverse direction T. The securement member 500 can further include a plurality of mounting projections 535 that extend down from the base 501. The mounting projections 535 are configured to be received in respective mounting apertures of the host substrate 118 so as to mount the securement member 500 to the host substrate 118. The securement wall 502 defines a securement surface 504. The securement surface 504 can be an outer surface of the securement member 500. The securement surface 504 can face the forward direction. The securement wall 502 can further define an abutment surface 505. The abutment surface 505 can face the rearward direction. The securement member 500 can further include a substrate retention member that can be configured as a substrate retention arm 506. The substrate retention arm 506 is spaced from the base 501 along the transverse direction T a distance that is at least equal to the thickness of the module substrate 113 along the transverse direction T. Thus, the securement member 500 can define a substrate receiving gap 508 sized to receive a portion of the module substrate 113. Thus, the portion of the module substrate 113 can be configured and positioned to be inserted into the substrate receiving gap 508 of the securement member. The substrate receiving gap 508 can be defined between the retention arm 506 and the base 501 along the transverse direction T.

The substrate receiving gap 508 is open in the rearward direction, and closed in the forward direction by the abutment surface 505. Thus, the module substrate 113 can be inserted into the gap 508 in the forward direction until the module substrate 113 abuts the securement member 500, and in particular abuts the securement wall 502. Thus, the module substrate 113 can be inserted into the substrate receiving gap 508 until the module substrate 113 abuts the securement member 500, and in particular abuts the securement wall 502. For instance, the module substrate 113 can abut the abutment surface 505. Abutment between the module substrate 113 and the securement member 500 can prevent the interconnect module 102 from moving in the forward direction with respect to the host module 104. Thus, it can be said that abutment between the module substrate 113 and the host module 104 can prevent the interconnect module 102 from moving in the forward direction with respect to the host module 104. Further, it should be appreciated that the securement wall of each of the securement members 500 can be captured between the module substrate 113 and the respective fingers 448 along the longitudinal direction L. The retention arm 506 can define a beveled lead-in surface 514 (see FIG. 3D) that is configured to guide the module substrate 113 into the gap 508. The beveled lead-in surface 514 is sloped toward the base 501 as it extends in the forward direction toward the securement wall 502.

The securement member 500 can be configured to attach to the second connector housing 153. For instance, the securement member 500 can define a securement opening 510 that is sized to receive a projection 512 of the second connector housing 153 so as to secure the securement member 500 to the second connector housing 153. The securement opening 510 can be defined by the base 501, and can extend into or through the base 501 along the lateral direction A. The projection 512 can extend out in the lateral direction A. The projection 512 can be sized to be press fit in the securement opening 510. The projection 512 and the securement openings 510 can each define non-circular shapes to prevent the securement member 500 from rotating with respect to the second connector housing 153 about an axis that is oriented along the lateral direction A. Alternatively or additionally, the securement member 500 can include one or more projections that extend along the lateral direction A into receiving apertures of the connector housing 153. Thus, the projections can be circular or non-circular in shape as desired.

Referring now to FIG. 3B, a connector centerline CL can be oriented along the lateral direction A and can bisect the second electrical connector 154 into equal halves along the longitudinal direction L. In one example, the securement surface 504 and a first one of the rows 156 can be disposed on the same side of the connector centerline CL with respect to a second one of the rows 156. The first one of the rows 156 can be disposed between the connector centerline CL and the securement surface 504 with respect to the longitudinal direction L. The retention arm 506 can extend from the securement wall 502 to a free end that is disposed such that the second one of the rows 156 is disposed between the free end and the connector centerline CL, the second one of the rows 156 defined by the contact locations 158 when the contact locations 158 are not compressed. The base 501 defines a front end that is disposed such that the first one of the rows 156 is disposed between the front end of the base 501 and the centerline CL.

Figure 3E:
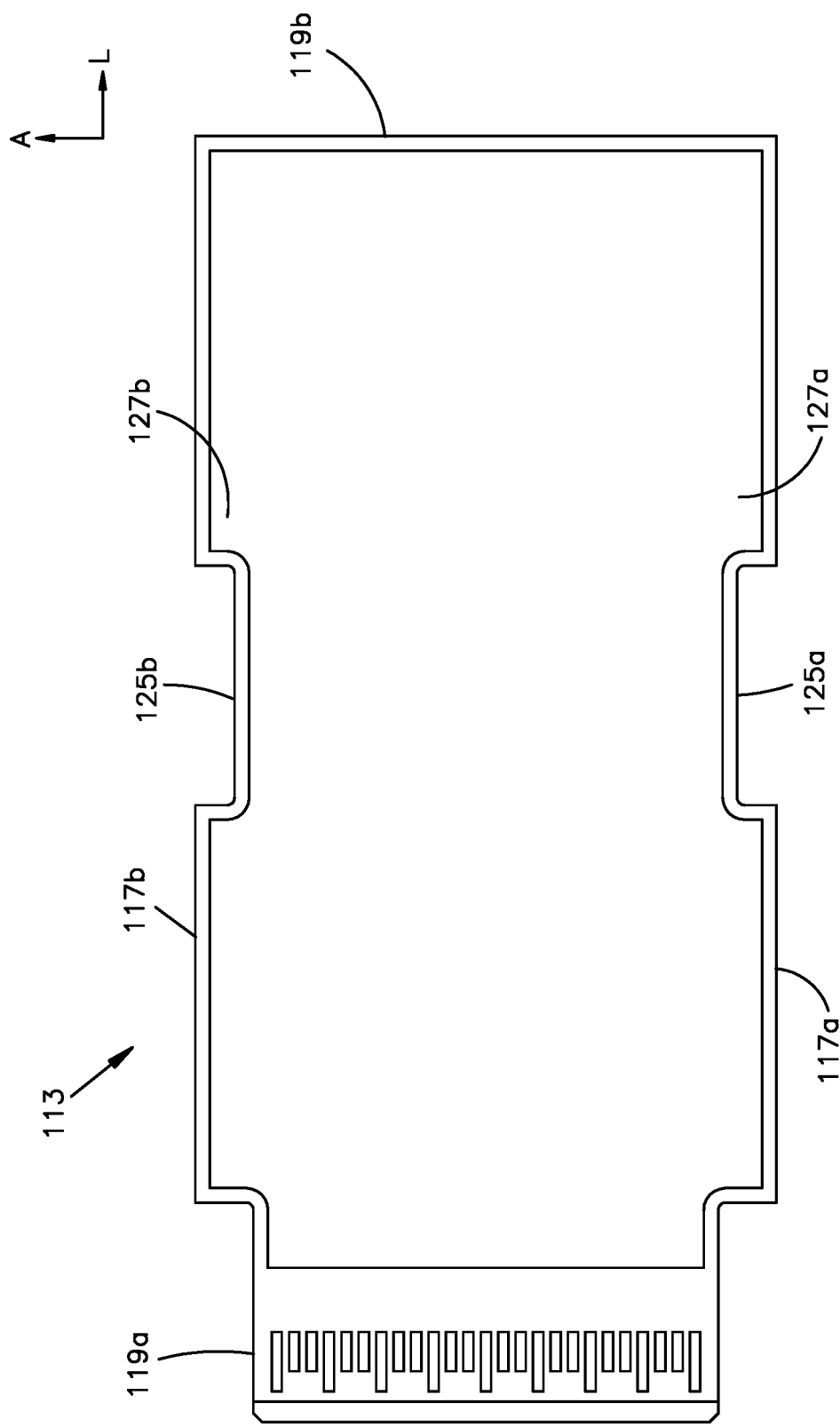
FIG. 3E is a top plan view of a module substrate of the interconnect module illustrated in FIG. 3A.

Referring now to FIG. 3E, the module substrate 113 defines opposed first and second lateral sides 117a and 117b that are spaced from each other along the lateral direction A. The module substrate 113 defines first and second notches 125a and 125b that extend into each of the first and second lateral sides 117a and 117b, respectively. The notches 125a and 125b are positioned and sized to allow the substrate retention arm 506 to pass therethrough along the transverse direction T when the module substrate 113 is aligned to be mated with the first and second electrical connectors 152 and 154, respectively. For instance, the notches 125a and 125b can have a length along the longitudinal direction L that is greater than that of the retention arms 506. The module substrate 113 can further define first and second retention regions 127a and 127b that are configured to be received in the substrate receiving gap 508 of the securement members 500. Further, the first and second retention regions 127a and 127b define respective abutment surfaces of the module substrate 113 that re configured to abut the abutment surface 505 of the securement member 500. The first and second retention regions 127a and 127b extend from the first and second notches 125a and 125b, respectively, in the rearward direction. Thus, the respective abutment surfaces of the first and second retention regions 127a and 127b can partially define the first and second notches 125a and 125b, respectively. Further, the first and second retention regions 127a and 127b can be aligned with the first and second notches 125a and 125b, respectively, along the longitudinal direction L. Thus, the notches 125a-b are disposed between the retention regions 127a-b and the electrical contact pads at the front end 119a with respect to the longitudinal direction. The electrical contact pads at the front end 119a are configured to mate with the electrical contacts of the first electrical connector 152 when the front end 119a is received in the first electrical connector 152.

Referring now to FIG. 3F, during operation, the interconnect module 102 is configured to be aligned to be mated with the first and second electrical connectors 152 and 154. In particular, the module substrate 113 is positioned such that the at least one notch is aligned along the transverse direction T with the retention arms 506 of a corresponding securement member 500. Thus, the retention region that is aligned with the at least one notch is offset with respect to the retention arm 506 in the rearward direction. In one example, the first and second notches 125a and 125b are aligned with the retention arms 506 of the first and second securement members 500, respectively, along the transverse direction T. Thus, the retention region that is aligned with the at least one notch is offset with respect to the retention arm 506 in the rearward direction. In FIG. 3F, the interconnect module 102 is shown with the transceiver removed to illustrated the module substrate 113 and the securement members 500. In practice, the transceiver, including the transceiver housing 146 can be mounted to the module substrate 113 during mating of the module substrate 113 to the first and second electrical connectors 152 and 154.

Figure 3G:
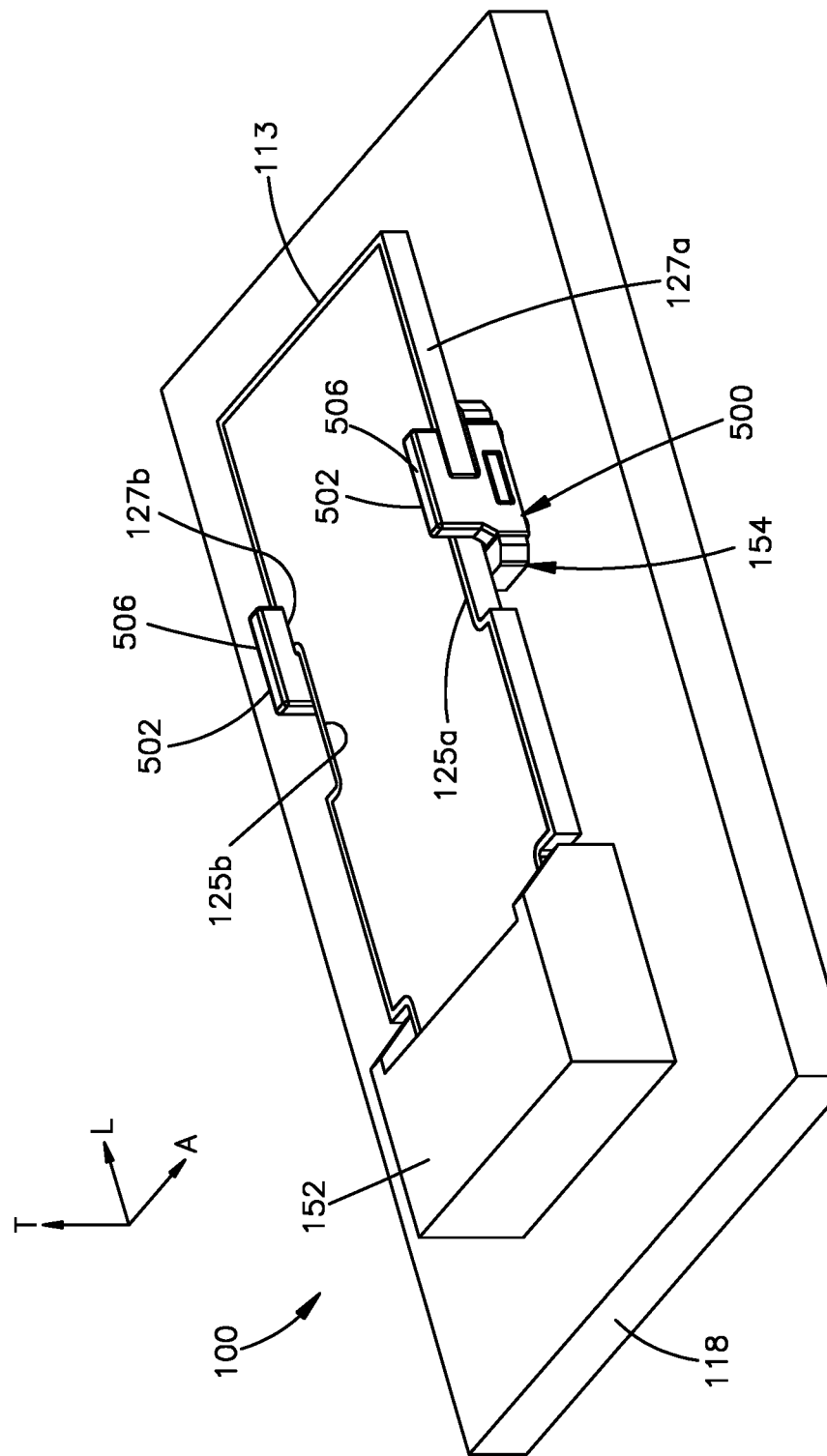
FIG. 3G is a perspective view of the portion of the interconnect module illustrated in FIG. 3F, showing the interconnect module mated with the host module.

The module substrate 113 is then translated down along the transverse direction T toward the second electrical connector 154, and thus toward the host substrate 118 until the module substrate 113 is aligned with the substrate receiving gaps 508 of the securement members 500 along the longitudinal direction L. In particular, the retention regions 127a and 127b are aligned with the substrate receiving gaps 508 of the securement members 500 along the longitudinal direction L. For example, the retention regions 127a and 127b can be aligned with the beveled lead-in surfaces 514 (see FIG. 3D) along the longitudinal direction L. In this position, the front end 119a of the module substrate 113 is aligned with the receptacle of the first electrical connector 152 along the longitudinal direction. As illustrated in FIGS. 3G and 2H, the module substrate 113 is then translated in the forward direction with respect to the host module 104 until the module substrate 113 is mated with the first and second electrical connectors 152 and 154. Further, as the module substrate 113 is mated with the first and second electrical connectors, the retention regions 127a and 127b of the module substrate 113 are received in the substrate receiving gaps 508 of the securement members 500. In FIG. 3G, the interconnect module 102 is shown with the transceiver removed to illustrated the module substrate 113 and the securement members 500. In practice, the transceiver, including the transceiver housing 146 can be mounted to the module substrate 113 during mating of the module substrate 113 to the first and second electrical connectors 152 and 154.

As described above, the electrical contacts 155 are configured to compress toward the underlying host substrate 118 when the module substrate 113 is brought into contact with the electrical contacts 155, in particular at the contact locations 158. Thus, the electrical contacts compress along the transverse direction from a first position to a compressed position. The substrate retention arm 506 can offset from the contact locations 158 a distance along the transverse direction T when the electrical contacts 155 are in the first position. The distance is less than the thickness of the module substrate 113. Thus, when the module substrate 113 is inserted into the substrate receiving gap 508, the securement member 500 can maintain the module substrate 113 in a position that maintains the electrical contacts 155 in the compressed position. Accordingly, the substrate retention arm 506 can be referred to as a compression member that is configured to apply a compressive force to the module substrate 113 against the electrical contacts 155 in the transverse direction T. In this regard, the securement member 500 can prevent the module substrate 113 from becoming unmated from the electrical contacts 155 along the transverse direction T.

Figure 3H:
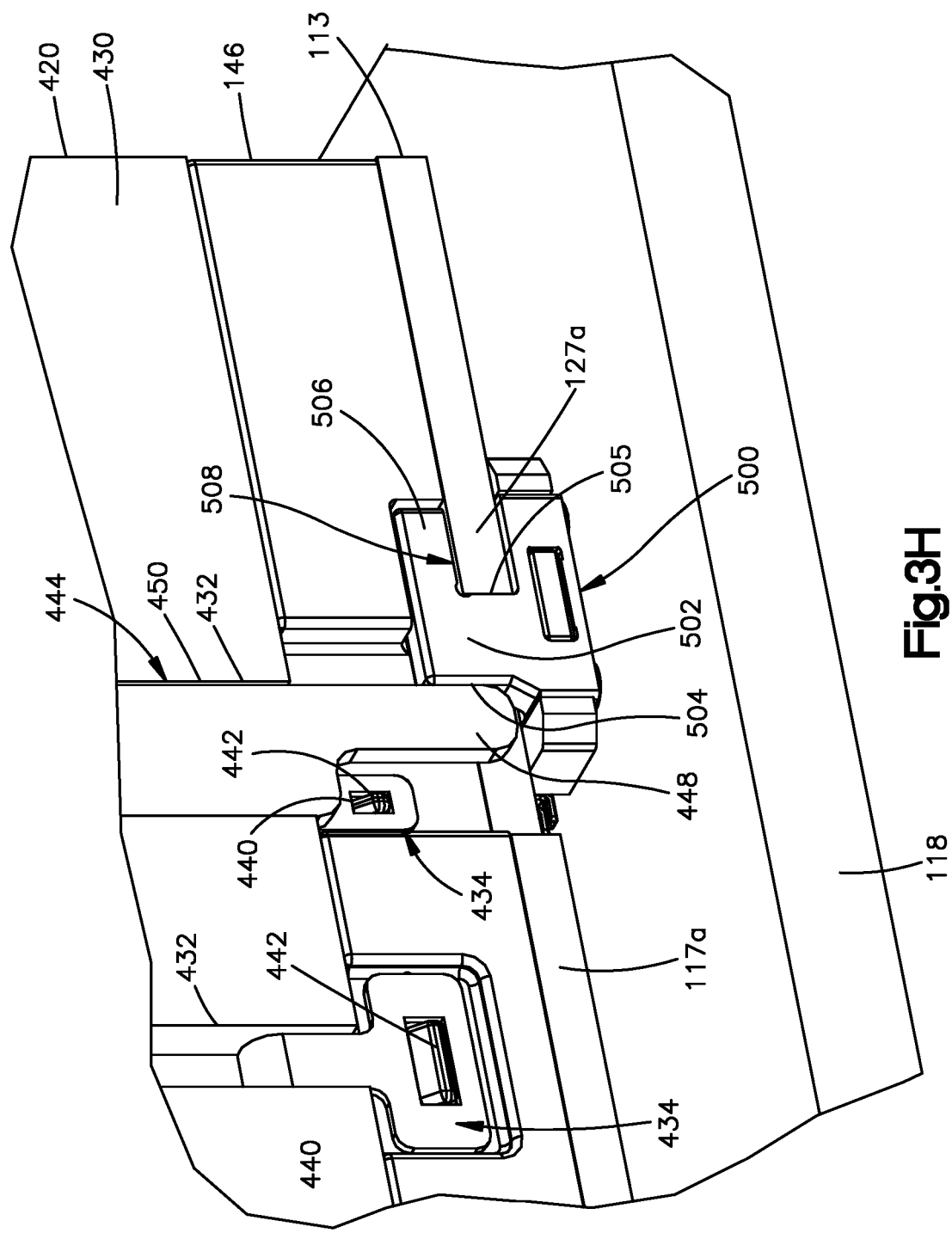
FIG. 3H is an enlarged perspective view of of additional portions of the interconnect module illustrated in FIG. 3G.
Figure 3I:
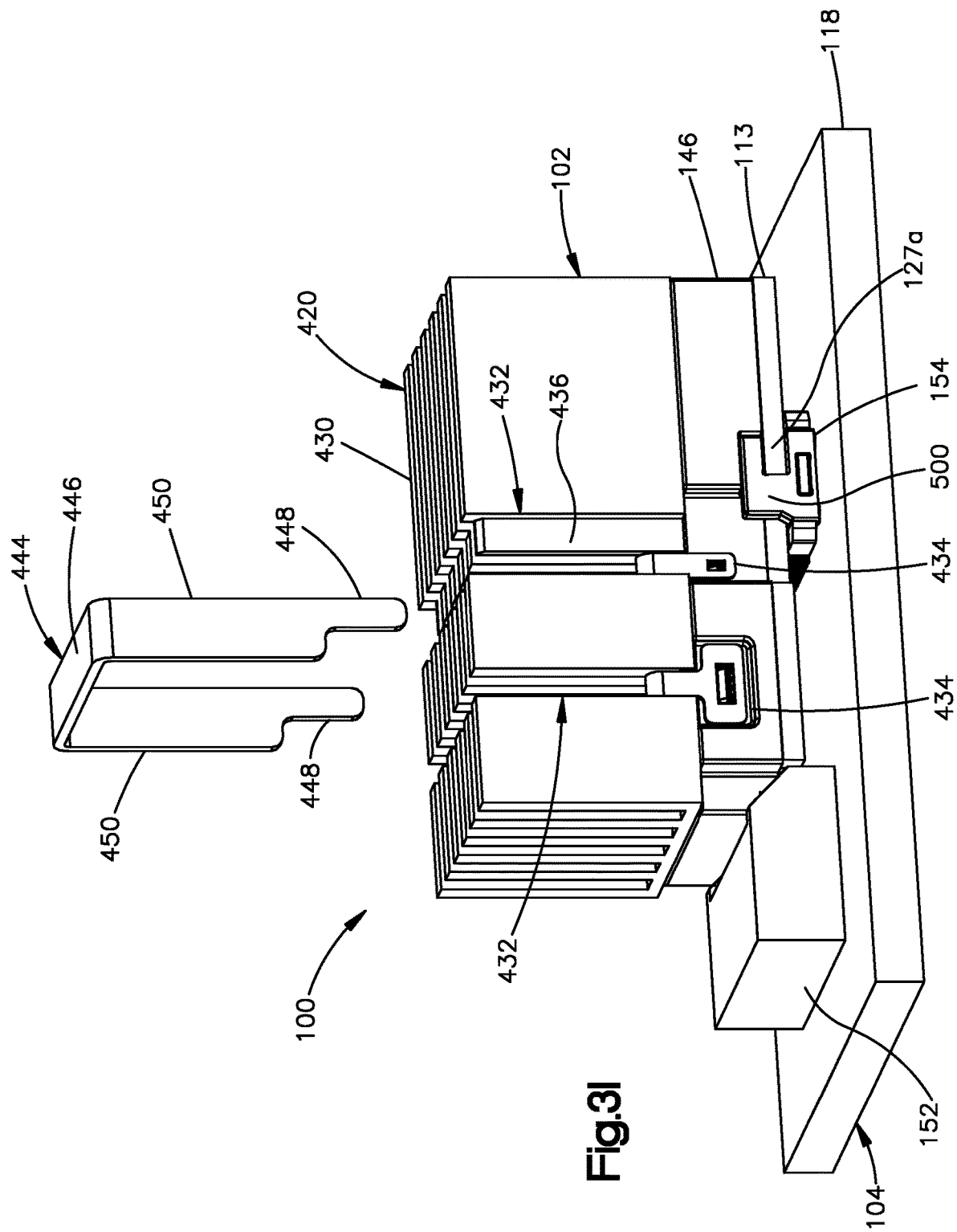
FIG. 3I is a perspective view of the interconnect module illustrated in FIG. 3G, showing the latch member in a disengaged position.

Referring now to FIG. 3I, once the module substrate 113 has been mated with the first and second electrical connectors 152 and 154, the latch 444 can be moved from the disengaged position (FIG. 3I) to the engaged position (FIG. 3A). For instance, the latch 444 is configured to be translated between the disengaged position and the engaged position along a direction angularly offset with respect to the rearward direction. The angularly offset direction can be the transverse direction T. In particular, the latch 444 can be inserted into the interconnect system 100 along the transverse direction T such that the fingers 448 are inserted to a location forward of the securement wall 504 of the respective securement member 500. In one example, the fingers 448 can abut the securement surface 504.

Abutment between the latch 444 and the interconnect module 102 can define the first mechanical interference that prevents movement of the latch 444 with respect to the interconnect module 102 in the rearward direction. For instance, abutment between the interconnect module 102 and one or both of the support member 446 and the fingers 448 can define the first mechanical interference that prevents movement of the latch 444 with respect to the interconnect module 102 in the rearward direction. Abutment between the fingers 448 and the securement member 500 can define the second mechanical interference. In particular, abutment between the fingers 448 and the securement surface 504 can define the second mechanical interference. Thus, it should thus be appreciated that the fingers 448 and the securement surface 504 define respective complementary engagement members that are configured to engage so as to attach the latch 444 to the second electrical connector 154. It can further be said that the engagement member of the latch 444 is configured to mate with the complementary engagement member so as to attach the interconnect module 102 to the host module 104.

In one example, the interconnect module 102 can include a heat sink 420 that is attachable to the module housing 146. Alternatively, the heat sink 420 can be monolithic with the module housing 146. Abutment between the latch 444 and the heat sink 420 can define the first mechanical interference. Referring to FIGS. 3A-3C, the heat sink 420 includes a plurality of fins 430 that are configured to dissipate heat. In one example, the fins 430 can be spaced from each other along the lateral direction A. The heat sink 420 can further include at least one securement recess 432 such as a plurality of securement recesses 432 that extend into the fins 430. Each at least one securement recess 432 can include a securement notch that extends into upper ends of the fins 430 along the transverse direction T toward the module housing 146. The securement notch can further extend through the fins 430 along the lateral direction A. Each at least one securement recess 432 can further include a pair of securement channels that extend into the heat sink 420 along the lateral direction. The securement channels can extend into respective ones of a pair of opposed walls of the heat sink 420. The opposed walls can be laterally opposed walls. For instance, the opposed walls can be defined by the outermost ones of the fins 430 along the lateral direction A. The securement channels can extend into the laterally outer surfaces of the outermost ones of the fins 430 along the lateral direction A. At least a portion up to an entirety of each of the securement channels does not extend through the respective outermost ones of the fins 430 along the lateral direction A. The securement channels can extend through the outermost ones of the fins 430 along the transverse direction.

The interconnect module 102 can include a corresponding at least one more securement bands 434 that are configured to secure the heat sink 430 to the module housing 146. For instance, the at least one securement band 434 can be configured to be inserted into a corresponding one of the at least one securement recesses 432 and secured to the module housing 146, thereby securing the heat sink 420 to the module housing 146. In particular, each of the securement bands 434 can define respective opposed ends 438. Each of the securement bands can further include a middle section 435 that extends between the opposed ends 438. The middle sections are configured to be received in respective ones of the securement notches. The opposed ends 438 can be configured to extend through the securement channels, respectively, along the transverse direction T. The securement bands 434 can define apertures 440 that are configured to receive complimentary projections 442 of the module housing 146 so as to attach the securement bands 434 to the module housing 146. The projections 442 can extend out from the module housing 146 along the lateral direction A. The projections 442 can extend out from opposed laterally outer surfaces of the module housing 146. The apertures 440 can extend through the opposed ends 438, respectively. One pair of the projections 442 can be narrower than another pair of projections 442 along the longitudinal direction L. The one of the pair of projections 442 can be spaced from the another of the pair of projections 442 in the rearward direction. Alternatively, the pairs of projections 442 can have the same size and shape as each other.

The ends 438 of one of the securement bands 422 can be narrower than the ends 438 of another of the securement bands 422 along the longitudinal direction L. The one of the securement bands 422 can be spaced from the another of the securement bands 422 in the rearward direction. Alternatively, the ends 438 of the securement bands 422 can have the same size and shape as each other. When the securement bands 422 are inserted into the respective securement recesses 432 and secured to the module housing 146, the heat sink 420 can be said to be mounted to the module housing 146. For instance, the heat sink 420 can be mounted to the upper surface of the module housing 146.

The heat sink 420 can further define a latch-receiving recess 436 that is configured to receive the latch 444 when the latch 444 is in the engaged position. In particular, the latch-receiving recess 436 can extend into at least one of the fins 430 along the lateral direction A, and can extend along the at least one of the fins 430 along the transverse direction T. In particular, the latch-receiving recess 436 can include a pair of channels that extend into the heat sink 420 along the lateral direction, and a notch that extends down into the upper end of the heat sink 420 along the transverse direction T. In particular, the notch can extend into the upper surfaces of the fins 430. The notch can further extend through the fins 430 along the lateral direction A. The channels can extend into respective ones of a pair of opposed walls of the heat sink 420. The opposed walls can be laterally opposed walls. For instance, the opposed walls can be defined by the outermost ones of the fins 430 along the lateral direction A. The channels can extend into the laterally outer surfaces of the outermost ones of the fins 430 along the lateral direction A. At least a portion up to an entirety of each of the channels does not extend through the respective outermost ones of the fins 430 along the lateral direction A. The channels can extend through the outermost ones of the fins 430 along the transverse direction. Respective portions of the latch 444 can ride in the channels as the latch translates along the transverse direction T between the engaged position and the disengaged position.

At least a portion of the latch-receiving recess 436 can be open to one of the securement recesses 432. It should be appreciated, of course, that the latch 444 can be received by a recess in the heat sink 420 that does not also receive a securement band. In accordance with one example, the latch, and in particular the support member 446, is configured to rest against the fins 430 in the latch-receiving recess 436. Thus, the support member 446 can be upwardly spaced from the securement band 434 along the transverse direction T. When the support member 446 is disposed in the latch-receiving securement recess 436, the fingers 448 extend to a location that is aligned with the corresponding securement members 500 along the longitudinal direction. For instance, the fingers 448 can be in abutment when the securement surface 504. While the latch 444 can abut the heat sink 420 so as to define the first engagement, it should be appreciated that the latch 444 can alternatively be seated in a recess defined by the module housing 146 so as to define the first engagement. Whether the latch 444 is in abutment with the heat sink 420 or the module housing 146, it can be said that the abutment between the heat sink 420 and the interconnect module 102 can define the first mechanical interference.

As illustrated in FIGS. 3G-3I, the heat sink 420 can be attached to the module housing 146 after the module substrate 113 has been mated with the first and second electrical connectors 152 and 154. Alternatively, as illustrated in FIG. 3J, the heat sink 420 can be attached to the module housing 146 prior to mating the module substrate 113 with the first and second electrical connectors 152 and 154.

As shown in FIG. 3I, the latch 444 can be removed from the host module 104 in the upward direction along the transverse direction T to the disengaged position, thereby removing the second interference. In particular, the latch fingers 448 can be removed from alignment with the securement member 500, and in particular with the securement wall 502, so as to remove the second interference. Thus, when the latch 444 is in the disengaged position, the latch 444 does not prevent the interconnect module 102 from translating relative to the host module 104 in the rearward direction a sufficient distance so as to unmate the interconnect module 102 from at least one or both of the first electrical connector 152 and the second electrical connector 154. The latch 444 can further translated in the upward direction so as to remove the latch 444 from the latch-receiving securement recess 432 of the heat sink 420, thereby removing the first mechanical interference.

Referring now also to FIG. 3K, the interconnect system 100 can include a biasing member 437 that is configured to apply a biasing force to the latch 444 in the forward direction. The biasing force can therefore maintain the interconnect module 102 mated with the first electrical connector 152. In particular, the biasing force can maintain the front end of the module substrate 113 in the first electrical connector 152. The biasing member 437 can be configured to contact the latch 444 when the latch is in the engaged position. For instance, the biasing member 437 can be configured to contact the latch 444 only when the latch is in the engaged position. The biasing member 437 can be supported by the host module 104. In one example, the biasing member 437 can be supported by the second electrical connector 154. For instance, the biasing member 437 can extend out from the securement member 188. Alternatively, the biasing member 437 can extends out from the second connector housing. The latch 444 can include a cantilevered leg 439 that has a spring constant with respect to deflection along the longitudinal direction L with respect to a remainder of the latch 444, and in particular with respect to the arm 450 of the latch 444. The cantilevered leg 439 can be spaced from the finger 448 along the longitudinal direction L. Alternatively, the finger 448 can define the cantilevered leg 439. The cantilevered leg 439 can contact the biasing member 437 when the latch 444 moves to the engaged position. In particular, a portion of the cantilevered leg 439 can be aligned with the biasing member 437 along the transverse direction T when the latch 444 is received in the securement recess 432 in the disengaged position. Thus, as the latch 444 is moved to the engaged position, the biasing member 437 can abut the cantilevered leg 439. The biasing force can cause the cantilevered leg 439 to deflect in the forward direction, which thus biases the interconnect module to move in the forward direction with respect to the host module. The latch 444 can include a stop member 441 that is configured to abut the cantilevered leg 439 to prevent further deflection of the cantilevered leg 439 in the forward direction. For instance, the stop member 441 can extend in the rearward direction from the arm 450.

Referring to FIG. 3L, in another example, the channel of the securement recess 432 can have a first section 443a and an angled section 443b that extends from a lowed end of the first section 443a. The first section 443a can extend along the transverse direction T. The angled section 443b can extend in the rearward direction as it extends down from the first section 443a. The latch 444 can define a front surface 445 that is configured to ride along a complementary surface 447 of the heat sink 420 that defines the angled section 443b. In particular, the front surface 445 can be defined by the cantilevered leg 439. Further, the front surface 445 can be in surface contact with the complementary surface 447 of the heat sink 420. Thus, the front surface 445 can extend in the rearward direction as it extends down along the transverse direction T. As the latch 444 moves down to the engaged position, along the securement recess, the front surface complementary surface 447 of the heat sink 420 urges the cantilevered leg 439 to deflect in the rearward direction against the biasing member 437. The biasing member 437 thus applies a forward biasing force to the cantilevered leg 439 that biases the interconnect module 102 in the forward direction with respect to the host module 104.

Figure 4A:
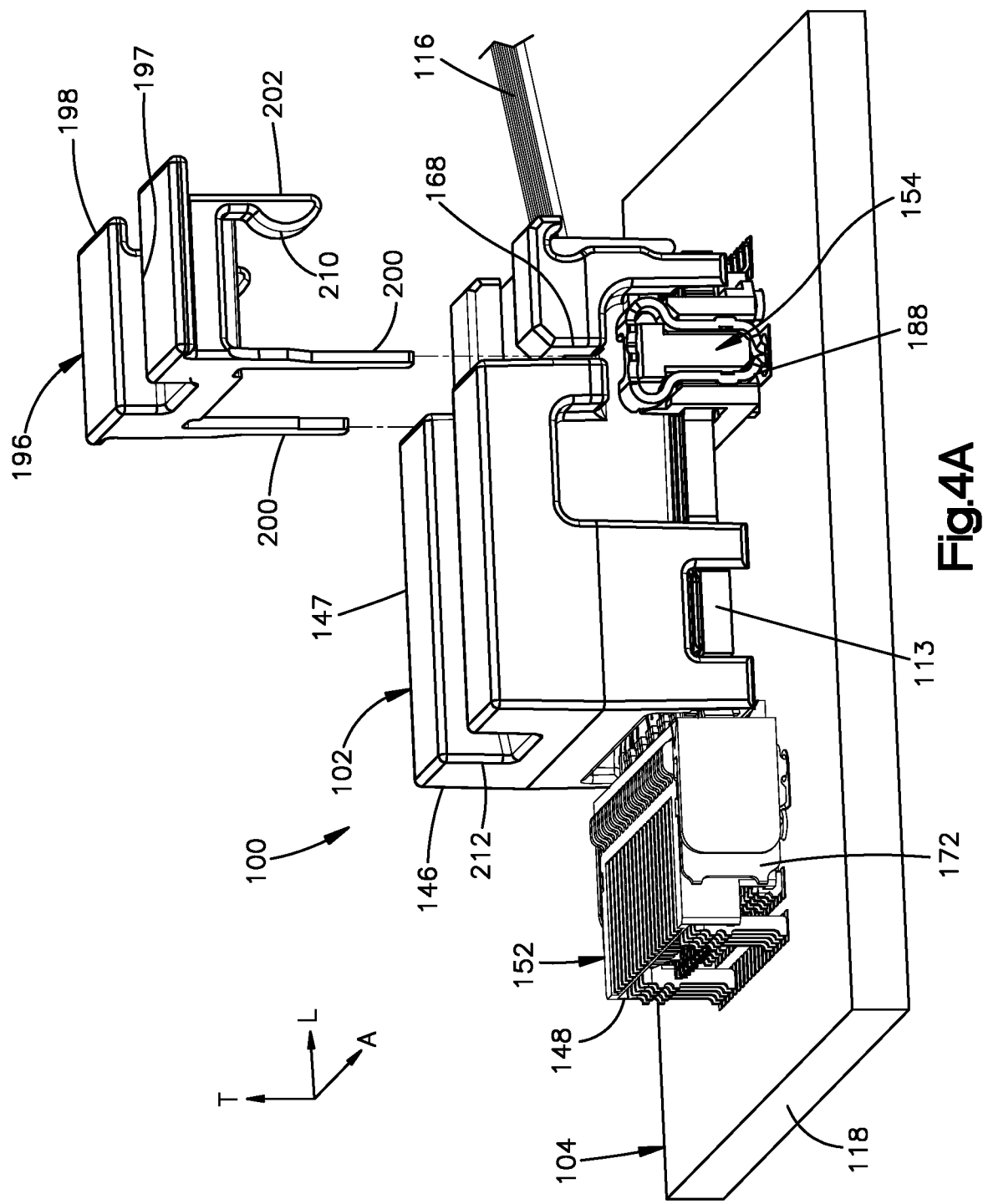
FIG. 4A is an exploded perspective view of an interconnect system including an interconnect module, a host module, and an anti-backout latch constructed in accordance with another embodiment shown in a disengaged position.
Figure 4C:
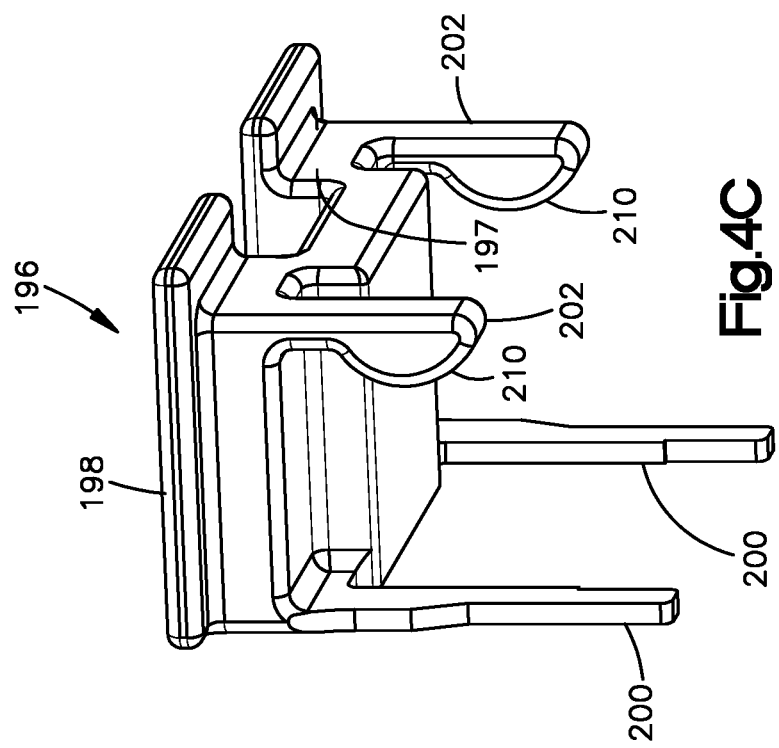
FIG. 4C is a perspective view of the anti-backout latch illustrated in FIG. 4A.
Figure 4B:
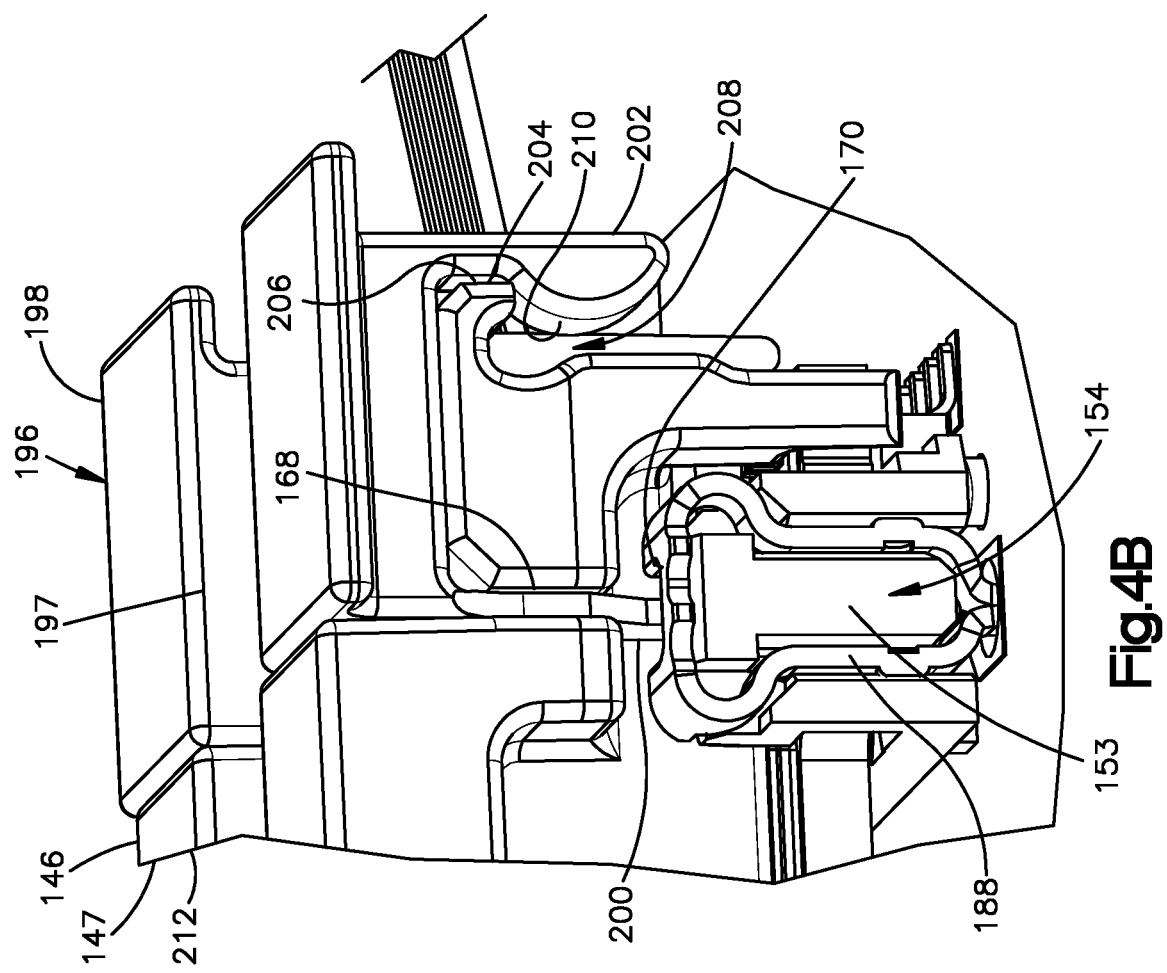
FIG. 4B is an enlarged perspective view of a portion of the interconnect system illustrated in FIG. 4A, showing the anti-backout latch in an engaged position.

Referring now to FIGS. 4A-4C, the interconnect system 100 (FIG. 4A) can include an anti-backout latch 196 designed to prevent the interconnect module 102 (FIGS. 4A and 4B) from being inadvertently unmated from the host module 104 (FIG. 4A). The latch 196 can include a support member 198 that is configured to be placed in mechanical communication with the interconnect module 102, and at least one finger 200 that extends out from the support member 198, and is configured to be placed in mechanical communication with the host module 104. For instance, the at least one finger 200 can extend down from the support member 198 along the transverse direction T. When the interconnect module 102 is mated with at least one electrical connector of the host module 104, the latch 196 can be movable between a disengaged position and an engaged position. For instance, the latch 196 can be translatable along the transverse direction T between the disengaged position and the engaged position. For instance, the latch 196 can be translatable in the downward direction to move the latch 160 from the disengaged position to the engaged position, and in the upward direction to move the latch 160 from the engaged position to the disengaged position. When the latch 196 is in the engaged position, a first mechanical interference is defined between the latch 196 and the interconnect module 102 that limits rearward movement of the interconnect module 102 with respect to the latch 196 in the rearward direction. The first mechanical interference can include an abutment between the anti-backout latch 196 and the interconnect module 102.

Further, when the latch 196 is in the engaged position, a second mechanical interference is defined between the finger 200 and the host module 104 limits rearward movement of the latch 196 respect to the at least one electrical connector of the host module 104. The second mechanical interference can include an abutment between the anti-backout latch 196 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 196, and of the latch 196 with respect to the at least one electrical connector of the host module 104, respectively. When the latch 196 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104.

The at least one finger 200 of the latch 196 can include a first pair of first and second fingers 200 that extends from the support member 198. Thus, the support member 198 can be connected between the fingers 200. In particular, a support member 198 can be connected between the fingers 200 along the lateral direction A. The support member 198 and the fingers 200 can be monolithic with each other. Alternatively, the support member 198 and fingers 200 can be attached to each other in any suitable manner as desired. The support member 198 can be configured as an upper cross-bar that is elongate along the lateral direction A. The fingers 200 can extend down from laterally opposed ends of the support member 198. For instance, the fingers 200 can be elongate along the transverse direction T.

The latch 196 can further include a second at least one finger 202 that extends from the support member 198. The at least one finger 202 can be referred to as a first a least one finger. The second at least one finger 202 can be configured to releasably secure the latch 196 in the engaged position. In particular, the second at least one finger 202 is configured to engage the module housing 146 (FIGS. 4A and 4B) when the latch is in the engaged position. The second at least one finger 202 can be spaced from the first at least one finger 202 along the longitudinal direction. In particular, the second at least one finger 202 can be spaced from the first at least one finger 202 in the rearward direction. Thus, the first and second at least one fingers 200 and 202 can be positioned so as to capture a portion of the interconnect module 102 therebetween. The captured portion of the interconnect module 102 can be defined by the module housing 146.

Referring to FIGS. 4A and 4B, the second at least one finger 202 can be configured to seat against a rear end 204 of the module housing 146. In particular, the second at least one finger 202 can be configured to seat against an external surface of the module housing 146. In one example, the rear end 204 of the module housing 146 can define a wall 206 and a recess 208 disposed below the wall 206. The second at least one finger 202 can define a catch member 210 (FIGS. 4A-4C) that is configured to sit below the wall 206, such that a portion of the catch member 210 is aligned with the wall 206 along the transverse direction T. The catch member 210 can extend in the forward direction to a position below the wall 206. The second at least one finger 202 can be resilient, such that the catch member 210 is configured to cam over the wall 206 as the latch is moved in the downward direction to the engaged position. Further, the second at least one finger 202 can be configured to cam over the wall 206 as the latch 196 is moved in the upward direction from the engaged position to the disengaged position. Accordingly, when the second at least one finger 202 is disposed in the recess between the wall 206 and the host substrate 118, the anti-backout latch can be said to be releasably secured in the engaged position.

As shown in FIGS. 4A-4C, the second at least one finger 202 can be configured as first and second fingers 202 that are spaced from each other along the lateral direction A. The first and second fingers 202 can be aligned with respective ones of the first and second fingers 200 along the longitudinal direction L. Alternatively, the first and second fingers 202 can be offset with respect to each of the first and second fingers 200 along the lateral direction A.

As shown in FIGS. 4A and 4B, the module housing 146 can define a channel 212 that extends into an upper surface 147 of the module housing 146, and extends through the module housing 146 along the longitudinal direction L. The channel 212 is sized to receive the at least one cable 116. Accordingly, when the interconnect module 102 is rearwardly spaced from an interconnect module 102 of another interconnect system 100 (FIG. 4A) during operation, at least one cable 116 of the other interconnect system 100 is configured to extend through the channel 212. As shown in FIGS. 4A-4C, the latch 196 can include a channel 197 that extends into the upper end of the support member 198 along the transverse direction T. The channel 197 can extend through the support member 198 along the longitudinal direction L. The channel 197 can be aligned with the channel 212 (FIGS. 4A and 4B) along the longitudinal direction L so as to receive the at least one cable from the other interconnect system.

During operation, the latch 196 can be translatable between the engaged position and the disengaged position. For instance, the latch 196 can be translatable between the engaged position (FIG. 4B) and the disengaged position (FIG. 4A) along a direction angularly offset with respect to the rearward direction. The angularly offset direction can be the transverse direction T. In particular, the latch 196 can be inserted into the interconnect system 100 (FIG. 4A) along the transverse direction T such that 1) the support member 198 seats in the recess 166 (FIGS. 4A and 4B), and the first fingers 200 extend through the at least one channel 168 and the channels 170, respectively. Further, the second fingers 202 cam over the wall 206 of the module housing 146 so as to releasably secure the latch 196 in the engaged position. Abutment between the support member 198 and the module housing 146 can at least partially define the first mechanical interference. Further, abutment between the first fingers 200 and the module housing 146 can at least partially define the first mechanical interference. Abutment between the fingers 200 and the second connector housing 153 can define the second mechanical interference. In particular, abutment between the first fingers 200 and laterally opposed ends of the second connector housing 153 can define the second mechanical interference.

The latch 196 can be removed from the host module 104 (FIG. 4A) in the upward direction along the transverse direction T, thereby removing the second interference. In particular, as shown in FIGS. 4A and 4B, as the latch 196 is moved in the upward direction, the catch members 210 cam over the wall 206 of the module housing 146. Interference between the catch members 210 and the wall 206 prevent inadvertent movement of the latch 196 to the disengaged position from the engaged position. As the latch is removed from the host module 104, the first latch fingers 200 can be removed from the channels 170 so as to remove the second interference. Thus, the latch 196 does not prevent the interconnect module 102 from translating relative to the host module 104 in the rearward direction a sufficient distance so as to unmate the interconnect module 102 from at least one or both of the first electrical connector 152 and the second electrical connector 154 (FIG. 4A). The latch 196 can further translated in the upward direction so as to remove the latch 196 from the interconnect module 102, thereby removing the first mechanical interference.

Figure 5A:
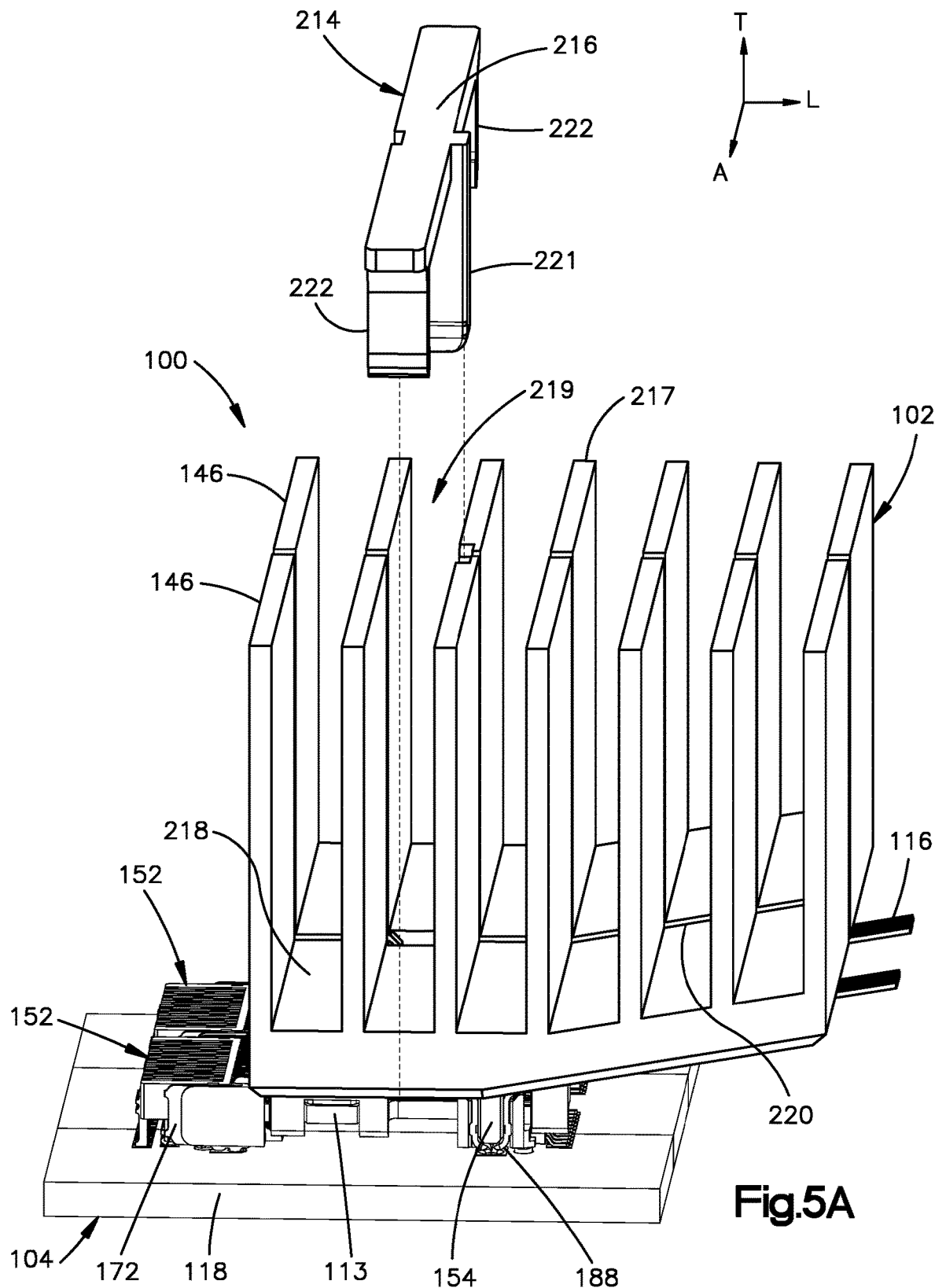
FIG. 5A is an exploded perspective view of an interconnect system including an interconnect module, a host module, and an anti-backout latch constructed in accordance with another embodiment shown in a disengaged position.
Figure 5C:
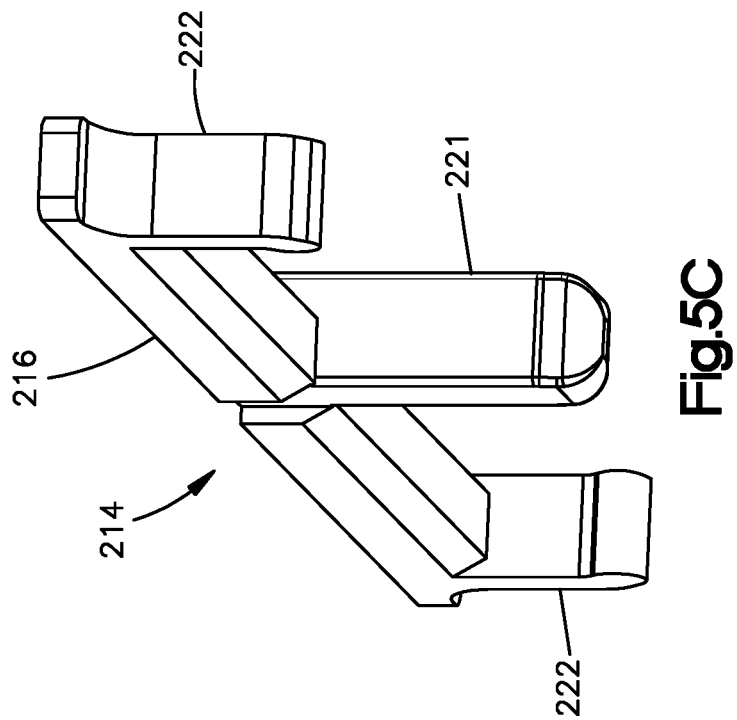
FIG. 5C is a perspective view of the anti-backout latch illustrated in FIG. 5A.
Figure 5B:
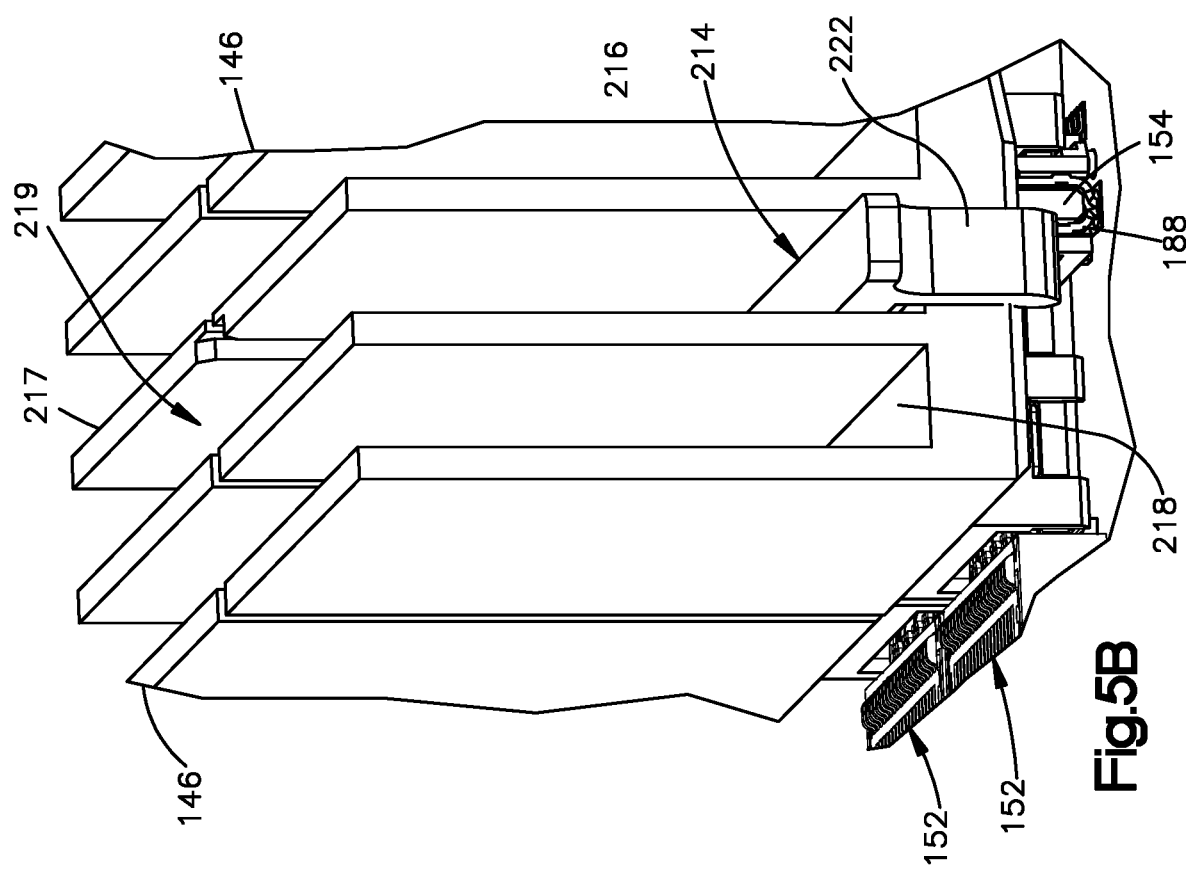
FIG. 5B is an enlarged perspective view of a portion of the interconnect system illustrated in FIG. 5A, showing the anti-backout latch in an engaged position.

Referring now to FIGS. 5A, 5B, and 5D, the interconnect system 100 (FIGS. 5A and 5D) can include an anti-backout latch 214 that is configured to attach to interconnect module 102. The interconnect module can include a heat sink 420 that is supported by the module housing 146. In particular, the heat sink 420 can be secured to the module housing 146. Alternatively, the heat sink 420 can be monolithic with the module housing 146. Thus, it can be said that the heat sink 420 can define the module housing 146. It can also be said that the module housing 146 defines the heat sink 420. The heat sink 420 can include a base 218 and a plurality of upstanding fins 217 that extend from the base 218. The fins 217 can be spaced from each other so as to define a plurality of recesses 219 disposed between respective adjacent ones of the fins 217. In particular, the fins 217 can be spaced from each other along the longitudinal direction L. The fins 217 can extend along respective planes that are oriented along the transverse direction T and the lateral direction A. Thus, it can be said that the recesses 219 extend down from an upper surface of the heat sink 420 to a location between the fins 217. A bottom end of the recesses can be defined by the base 218. Referring to FIGS. 5A and 5B, the host module 104 (FIG. 5A) can include first and second ones of the module housings 146 arranged so as to define a gap 220 therebetween. The gap 220 can extend along the lateral direction A between first and second ones of the module housing 146. Alternatively, the interconnect module 102 can include a single module housing 146 that defines a gap that extends through the base 218 along the transverse direction T. The module housings 146 can be aligned with first and second ones of the first electrical connector 152 in a plane that includes the transverse direction T and the longitudinal direction L. It should be appreciated that all module housings 146 described herein can be a unitary structure or a plurality of separate structures as desired. It should be further appreciated that all host modules 104 described herein can include a plurality of first and second electrical connectors 152 and 154 as desired.

As shown in FIGS. 5A-5C, the latch 214 can include a support member 216 that is configured to be placed in mechanical communication with the interconnect module 102 (FIG. 5A), and a finger 221 (FIGS. 5A, 5C and 5D) that extends out from the support member 216, and is configured to be placed in mechanical communication with the host module 104. For instance, the finger 221 can extend down from the support member 216 along the transverse direction T. The finger 221 can be oriented along a plane that is defined by the longitudinal direction L and the transverse direction T. Thus, the finger 221 can be longer along the longitudinal direction L than it is wide along the lateral direction A. Further, the finger 221 is taller along the transverse direction T than it is long along the longitudinal direction L. The latch 214 further includes at least one outer finger 222 that extends from the support member 216. For instance, the at least one outer finger 222 can extend down from the support member 216 along the transverse direction T. The at least one outer finger 222 can include a pair of outer fingers 222, such that the finger 221 disposed between the outer fingers 222 along the lateral direction A. Thus, the finger 221 can be referred to as a middle finger. The finger 221 can extend further down from the support member 216 than each of the outer fingers 222. Further, the at least one finger 221 can be aligned with each of the outer fingers 222 along the lateral direction A.

As shown in FIG. 5A, when the interconnect module 102 is mated with at least one electrical connector of the host module 104, the latch 214 can be movable between a disengaged position (FIG. 5A) and an engaged position (FIGS. 5B and 5D). For instance, the latch 214 can be translatable along the transverse direction between the disengaged position and the engaged position. For instance, the latch 214 can be translatable in the downward direction to move the latch 160 from the disengaged position to the engaged position, and in the upward direction to move the latch 160 from the engaged position to the disengaged position. When the latch 214 is in the engaged position, a first mechanical interference is defined between the latch 214 and the interconnect module 102 that limits rearward movement of the interconnect module 102 with respect to the latch 214 in the rearward direction. The first mechanical interference can include an abutment between the anti-backout latch 214 and the interconnect module 102. In particular, the first mechanical interference can be defined by the module housing 146 and the latch 214.

Further, when the latch 214 is in the engaged position, a second mechanical interference is defined between the finger 221 and the host module 104 limits rearward movement of the latch 214 respect to at least one electrical connector of the host module 104. The second mechanical interference can include an abutment between the anti-backout latch 214 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 214, and of the latch 214 with respect to the at least one electrical connector of the host module 104, respectively. When the latch 214 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104. When the latch 214 is in the disengaged position, the first mechanical interference can also be removed, both in this and in all other embodiments illustrated in FIGS. 2A-7C. As described above, the at least one connector of the host module 104 can include one or both of the first electrical connector 152 and the second electrical connector 154.

As shown in FIGS. 5A, 5B and 5D, the latch 214 is configured to be received in a respective one of the recesses 219 of the module housing 146 so as to move the latch 214 from the disengaged position to the engaged position. In particular, the support member 216 is sized to be received in the respective one of the recesses. Thus, the first mechanical interference can be defined by the module housing 146 and the latch 214. In particular, the first mechanical interference can be defined by a respective one of the fins 217 and the support member 216. When the support member 216 is disposed in the respective one of the recesses 219, the finger 221 can extend through the gap 220 of the at least one module housing 146 to a location below the at least one module housing 146 and into the host module 104.

In particular, the finger can extend to a location that is aligned with the second electrical connector 154 along the longitudinal direction L. For instance, the finger 221 can be disposed adjacent the second electrical connector 154 in the forward direction. For instance, the finger 221 can be disposed adjacent the second connector housing 153. In particular, the finger 221 can abut the second electrical connector 154, and in particular the second connector housing 153, so as to define the second mechanical interference. The finger 221 can extend to a location in contact with the host substrate 118 when the latch 214 is in the engaged position. Alternatively, the finger 221 can be spaced above the host substrate 118 along the transverse direction T when the latch is in the engaged position.

The outer fingers 222 can be configured to extend over respective lateral sides of the at least one module housing 146. The lateral sides can be external laterally outermost sides of the module housing 146. The outer fingers 222 can be configured to clip onto the respective lateral sides of the module housing 146. The lateral sides of the module housing 146 can be defined by the base 218 of the module housing 146. The outer fingers 222 can be configured to clip onto the respective lateral sides of the module housing 146. Thus, the outer fingers 222 can define clip members that are configured to cam over the lateral sides of the module housing 146 as the latch is moved in the downward direction to the engaged position. The outer fingers 222 can be resilient, such that the outer fingers are configured to cam over the lateral sides of the module housing 146 as the latch is moved in the downward direction to the engaged position. Thus, the distal ends of the outer fingers 222 can be disposed between the base 218 and the host substrate 118. Accordingly, when the outer fingers 222 are engaged with the base 218, the outer fingers can be said to be releasably secured to the interconnect module 102 in the engaged position. Thus, the latch 214 is releasably secured in the engaged position. The outer fingers 222 can cam over the base 218 in the upward direction as the latch 214 is moved from the engaged position toward the disengaged position.

Referring now to FIGS. 6A-6B, the interconnect system 100 (FIG. 6A) can include an anti-backout latch 230 that is configured to attach to the interconnect module 102 (FIGS. 6A and 6B). The interconnect module 102 can include a heat sink 420 that is supported by the module housing 146. In particular, the heat sink 420 can be secured to the module housing 146. Alternatively, the heat sink 420 can be monolithic with the module housing 146. Thus, it can be said that the heat sink 420 can define the module housing 146. It can also be said that the module housing 146 defines the heat sink 420. The heat sink 420 can include a base 233 and a plurality of upstanding fins 232 that extend from a base 233 (FIG. 6A). The fins 232 can be spaced from each other so as to define a plurality of recesses 234 disposed between respective adjacent ones of the fins 232. In particular, the fins 232 can be spaced from each other along the lateral direction A. The fins 232 can extend along respective planes that are oriented along the transverse direction T and the longitudinal direction L. Thus, it can be said that the recesses 234 extend down from an upper surface of the heat sink 420 to a location between adjacent ones of the fins 232. A bottom end of the recesses 234 can be defined by the base 233 (FIG. 6A). The fins 232 can include first and second outermost ones of the fins 232 that define outer surfaces 236 that face away from the center of the module housing 146. The outer surfaces 236 can face away from the center of the heat sink 420 along the lateral direction A. Further, the outer surfaces 236 can face away from each other along the lateral direction A.

The heat sink 420 can define a latch-receiving recess 237 that is configured to receive the latch 230. In particular, the latch-receiving recess 237 can include a pair of channels 240 that extend into the heat sink 420 along the lateral direction, and a notch 238 that extends down into the upper end of the heat sink 420 along the transverse direction T. In particular, the notch 238 can extend into the upper surfaces of the fins 232. The notch 238 can further extend through the fins 232 along the lateral direction A. Further, the channels 240 can extend into respective ones of a pair of opposed walls of the heat sink 420. The opposed walls can be laterally opposed walls. For instance, the opposed walls can be defined by the outermost ones of the fins 232 along the lateral direction A. The channels 240 can extend into the laterally outer surfaces of the fins 232 along the lateral direction A. At least a portion up to an entirety of each of the channels 240 does not extend through the respective one of the fins 232 along the lateral direction. The channels 240 can extend through the fins 232 along the transverse direction T. The channels 240 and the notch 238 can be aligned with each other along a plane that is defined by the lateral direction A and the transverse direction T.

As shown in FIGS. 6A-6C, the latch 230 can include a support member 242 that is configured to be placed in mechanical communication with the interconnect module 102 (FIG. 6A). As shown in FIGS. 6A and 6B, the support member 242 is sized to seat against the upper ends of the fins 232 in the notch 238. The latch 230 can further include a pair of fingers 244 that extend out from the support member 242 and are configured to be placed in mechanical communication with the host module 104 (FIG. 6A). For instance, the fingers 244 can extend down from the support member 242 along the transverse direction T. The fingers 244 can be spaced from each other along the lateral direction A. The fingers 244 can be oriented along respective planes defined by the longitudinal direction L and the transverse direction T. Thus, each of the fingers 244 can be longer along the longitudinal direction L than it is wide along the lateral direction A. Further, each of the fingers 244 is taller along the transverse direction T than it is long along the longitudinal direction L. The fingers 244 can be resiliently supported by the support member 242, so as to define a spring force toward each other when biased away from each other. Further, the fingers 244 can each define distal ends that define projections 246. The projection 246 can be oriented so as to face each other. In particular, the projections 246 can face each other along the lateral direction A. As will be described, the fingers 244 can be resilient, such that the projections 246 are configured as clips that releasably secure the latch 230 to the heat sink 420, and in particular to the base 233 of the heat sink 420, when the latch 230 is in the engaged position. Further, the projections 246 can releasably secure the latch 230 to the heat sink 420 when the latch 230 is disposed in the channels 240 in the disengaged position.

As shown in FIG. 6A, when the interconnect module 102 is mated with at least one electrical connector of the host module 104, the latch 230 can be movable between the disengaged position and the engaged position (FIG. 6B). For instance, the latch 230 can be translatable along the transverse direction between the disengaged position and the engaged position. For instance, the latch 230 can be translatable in the downward direction to move the latch 230 from the disengaged position to the engaged position, and in the upward direction to move the latch 230 from the engaged position to the disengaged position. When the latch 230 is in the engaged position, a first mechanical interference is defined between the latch 230 and the interconnect module 102 that limits rearward movement of the interconnect module 102 with respect to the latch 230 in the rearward direction. The first mechanical interference can include an abutment between the anti-backout latch 230 and the interconnect module 102. In particular, the fingers 244 are configured to seat in respective ones of the channels 240, such that forward ends of the fins 232 that partially define the channels 240 also at least partially define the first mechanical interference. Further, the support member 242 is sized to be received in the notch 238, such that a forward end of the upper end of the module housing 146 that partially defines the notch 238 and the support member 242 also at least partially define the first mechanical interference.

The latch 230 can and the heat sink 420 can include complementary locking members that engage each other so as to releasably lock the latch 230 in the engaged position. For instance, the latch 230 can include a locking projection 227 that extends from one or both of the fingers 244 toward the other of the fingers 244 along the lateral direction. The heat sink 420 can define a complementary locking recess 229 that is sized and configured to receive the locking projection 227 when the latch 230 is in the engaged position. The locking recess 229 can extend into or through the heat sink 420. Alternatively, the heat sink 420 can include the locking projection, and the latch 230 can include the locking recess. Further, the locking projection can extend out from one of the heat sink 420 and the latch 230 along the longitudinal direction L, and the locking recess can extend into or through the other of the heat sink 420 and the latch 230 along the longitudinal direction L (see FIG. 3L). Alternatively or additionally, the locking projection and the locking recess can be configured to engage each other when the latch 230 is in the disengaged position to prevent inadvertent movement of the latch 230 to the engaged position. The locking projection can be removed from the locking recess when it is desired to remove the latch 230 from the respective disengaged position or the engaged position. Thus, it can be said that one of the latch 230 and the heat sink 420 can include a locking projection, and the other of the latch 230 and the heat sink 420 can include a locking recess that receives the locking projection, thereby maintaining the latch 230 in at least one of the engaged position and the disengaged position. Alternatively, the latch 230 can be devoid of the respective locking member (see FIG. 6C).

Further, when the latch 230 is in the engaged position as shown in FIG. 6B, a second mechanical interference is defined between the fingers 244 and the host module 104 limits rearward movement of the latch 230 respect to at least one electrical connector of the host module 104. The second mechanical interference can include an abutment between the anti-backout latch 230 and the host module 104. The limited rearward movements can prevent the interconnect module 102 from moving in the rearward direction with respect to the at least one electrical connector of the host module 104 a distance that would be sufficient to unmate the interconnect module 102 (FIG. 6A) from the at least one electrical connector of the host module 104. For instance, the first and second mechanical interferences can substantially prevent rearward movement of the interconnect module 102 with respect to the anti-backout latch 230, and of the latch 230 with respect to the at least one electrical connector of the host module 104, respectively. In one example, the second mechanical interference can be defined by the fingers 244 and the second electrical connector 154. In particular, when the latch 230 is in the engaged position, the fingers 244 extend to a location adjacent the second electrical connector 154 in the forward direction. In particular, the fingers 244 can abut the second electrical connector 154, such as the second connector housing 153.

As described above, the fingers 244 can each define projections 246. The projections 246 can be configured as clips that secure the latch 230 to the module housing 146, and in particular to the heat sink 420, when the latch is in the engaged position. In particular, as the latch 230 is translated along the transverse direction T to the engaged position, the fingers 244 are configured to resiliently move away from each other as the projections 246 side along the surfaces of the fins 232 that define the channels 240. The projections 246 ride along the channels until the projections 246 slide past the surfaces of the fins 232 and the base 233 in the downward direction. The fingers 244 then move toward each other along the lateral direction such that at least a portion of the projections 246 are aligned with the module housing 146 along the transverse direction. Thus, mechanical interference between the projections 246 and the module housing 146 resists movement of the latch 230 from the engaged position to the disengaged position. The mechanical interference between the projections 246 and the module housing 146 can be overcome by a first force when the latch 230 is moved upward from the engaged position to the disengaged position. Further, the projections 246 can ride along the channels until the projections 246 ride into respective pockets that are disposed in the channels at a location spaced upward from the base 233 when the latch 230 is in the disengaged position. Interference between the projections 246 and the heat sink 420 when the projections 246 are disposed in the pockets can resist movement of the latch 230 from the disengaged position to the engaged position. The mechanical interference can be overcome by a second force when the latch is moved down from the disengaged position to the engaged position. In one example, the first and second forces can be substantially equal (for instance 10% of each other). In another example, the first force can be greater than the second force (for instance, greater than 10% of the second force). In still another example, the second force can be greater than the first force (for instance, greater than 10% of the second force). In still another example, one of the first and second forces can be directed along the transverse direction T. Alternatively or additionally, the first force can include a separation of the fingers 244 away from the heat sink (and away from each other) along the lateral direction A so as to remove the mechanical interference (see projection 227 and recess 229). Alternatively or additionally still, the second force can include a separation of the fingers 244 away from the heat sink (and away from each other) along the lateral direction A so as to remove the mechanical interference (see projection 227 and recess 229).

As shown in FIG. 6A, when the latch 230 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104. When the latch 230 is in the disengaged position, the first mechanical interference can also be removed.

Figure 7A:
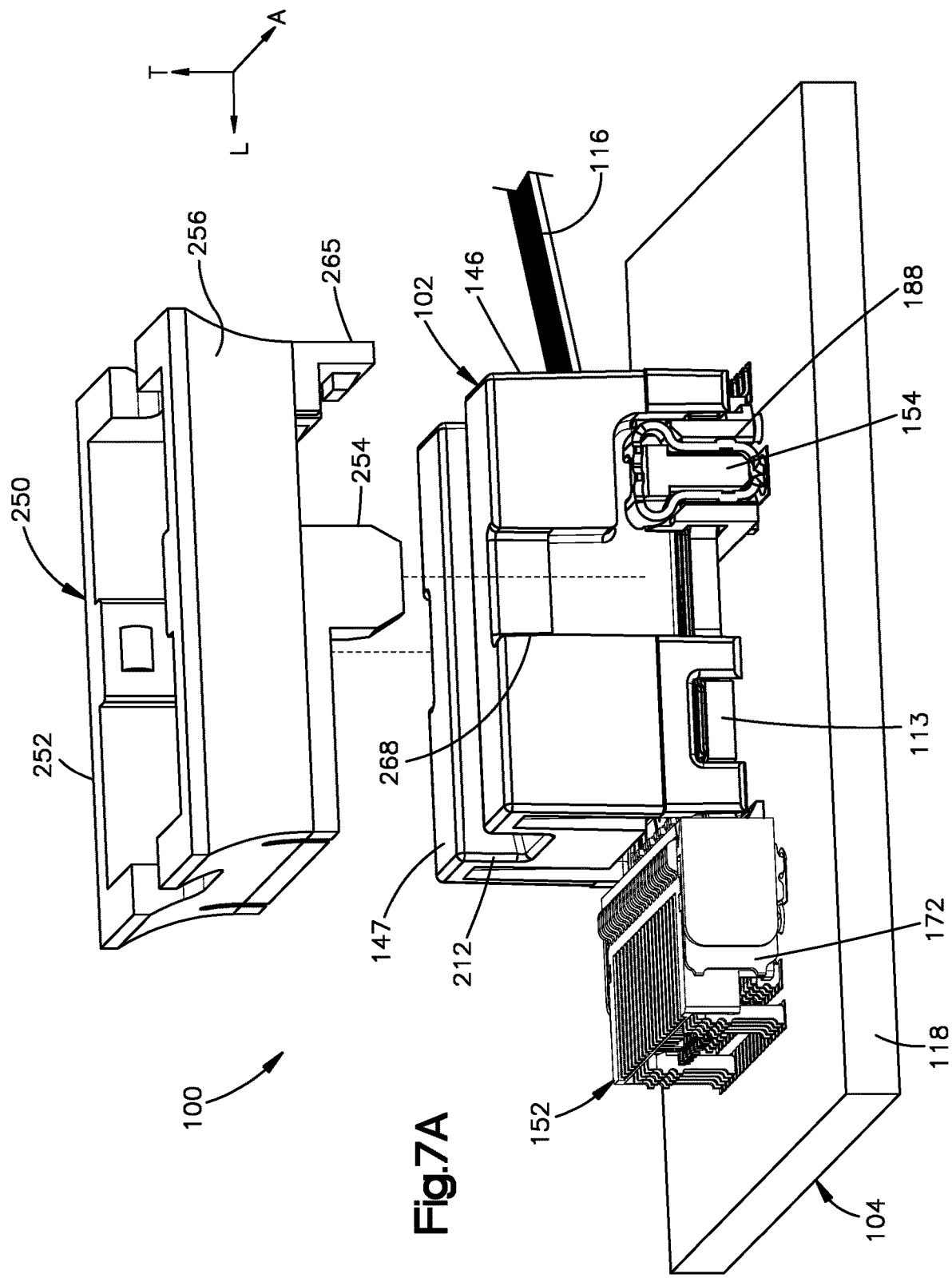
FIG. 7A is an exploded perspective view of an interconnect system including an interconnect module, a host module, and an anti-backout latch constructed in accordance with another embodiment shown in a disengaged position.
Figure 7B:
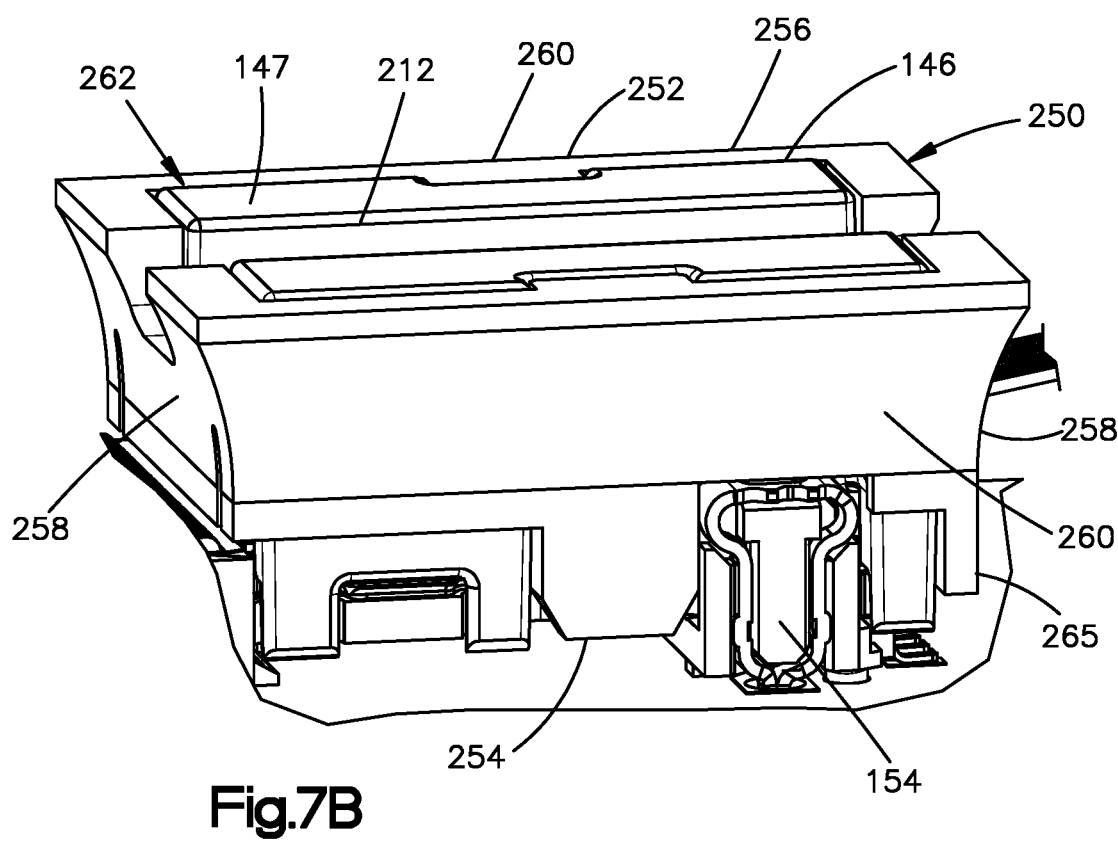
FIG. 7B is an enlarged perspective view of a portion of the interconnect system illustrated in FIG. 7A, showing the anti-backout latch in an engaged position.
Figure 7C:
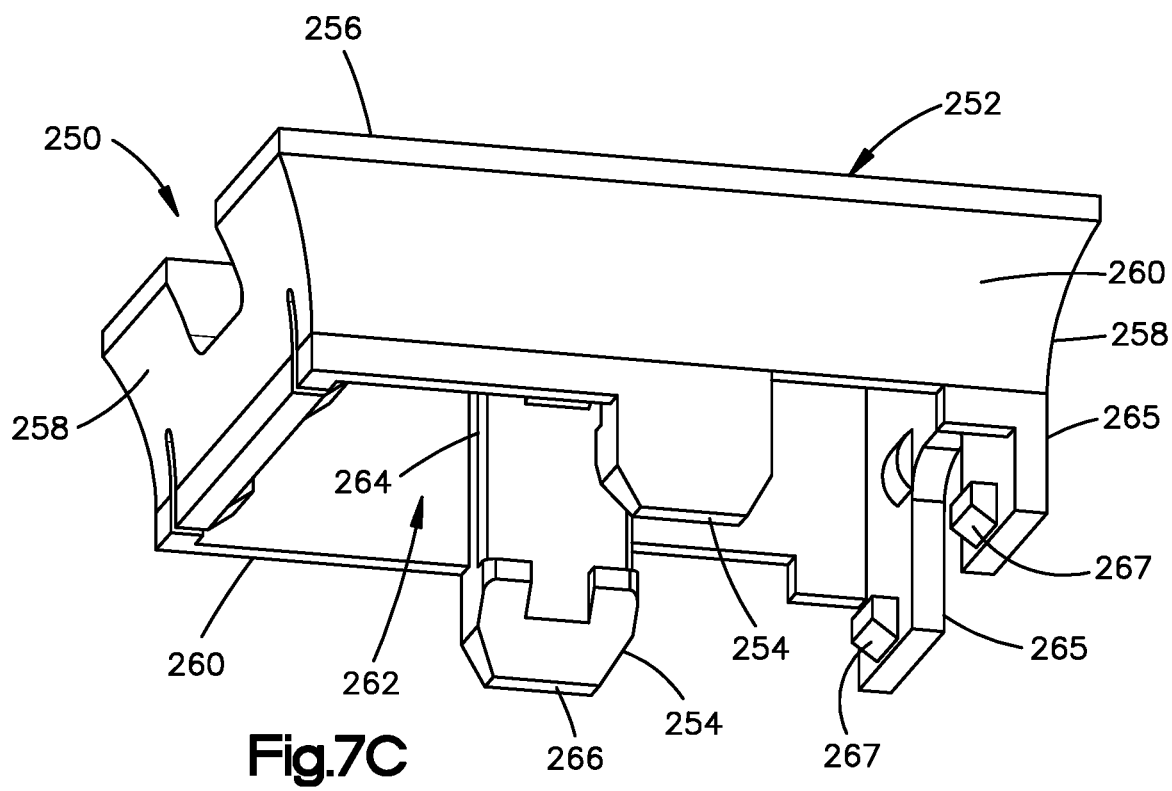
FIG. 7C is a perspective view of the anti-backout latch illustrated in FIG. 6A.

Referring now to FIGS. 7A and 7B, the interconnect system 100 (FIG. 7A) can include an anti-backout latch 250 designed to prevent the interconnect module 102 from being inadvertently unmated from the host module 104. The latch 250 can include a support member 252 that is configured to be placed in mechanical communication with the interconnect module 102. The latch 250 can further include at least one finger 254 that extends out from the support member 252, and is configured to be placed in mechanical communication with the host module 104. For instance, the at least one finger 254 can extend down from the support member 252 along the transverse direction T. When the interconnect module 102 is mated with at least one electrical connector of the host module 104, the latch 250 can be movable between a disengaged position and an engaged position along the transverse direction T. For instance, the latch 250 can be translatable along the transverse direction T between the disengaged position and the engaged position. For instance, the latch 250 can be translatable in the downward direction to move the latch 250 from the disengaged position (FIG. 7A) to the engaged position (FIG. 7B), and in the upward direction to move the latch 250 from the engaged position to the disengaged position. When the latch 250 is in the engaged position, a first mechanical interference is defined between the latch 250 and the interconnect module 102 that limits rearward movement of the interconnect module 102 with respect to the latch 250 in the rearward direction. The first mechanical interference can include an abutment between the anti-backout latch 250 and the interconnect module 102.

Further, when the latch 250 is in the engaged position, a second mechanical interference is defined between the finger 254 and the host module 104 limits rearward movement of the latch 250 respect to the at least one electrical connector of the host module 104. The second mechanical interference can include an abutment between the anti-backout latch 250 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 250, and of the latch 250 with respect to the at least one electrical connector of the host module 104, respectively. When the latch 250 is in the disengaged position, at least the second mechanical interference is removed, such that the interconnect module 102 is movable in the rearward direction with respect to the at least one electrical connector of the host module 104 a sufficient distance so as to unmate the interconnect module 102 from the at least one electrical connector of the host module 104.

The support member 252 can define a frame 256 that is configured to surround at least three sides of the module housing 146 that are perpendicular to each other. For instance, the frame 256 includes first and second walls that are opposite each other, and a third wall connected between the first and second walls. In one example, the frame 256 includes first and second end walls 258 that are opposite other along the longitudinal direction L. The frame 256 further includes first and second side walls 260 that are opposite each other along the lateral direction A. The side walls 260 are connected between the end walls 258. The latch 250 further defines an aperture 262 that extends through the support member 252 along the transverse direction T. The aperture 262 can be defined by the end walls 258 and the side walls 260. The frame 256 can define any size and shape as desired, such that the aperture 262 is sized to receive the module housing 146 therein. In one example, the support member 252 can be longer along the longitudinal direction L than it is wide along the lateral direction A.

The module housing 146 can further include first and second channels 268 (FIG. 7A) that extend at least into opposed walls of the support member 252. In one example, the channels 268 extend into the side walls 260. The channels 268 can extend inward into the outer laterally opposed sides along the lateral direction A. At least a portion up an entirety of the channels 268 can extend into the sides but not through the side walls along the lateral direction A. The channels 268 can extend through the sides along the transverse direction T. The channels 268 can extend into laterally outer surfaces of the sides that face away from each other.

The fingers 254 extend out from the support member 252 along the transverse direction T. Further, the fingers 254 can be opposite each other along a direction that is perpendicular to the transverse direction T. For instance, the fingers 254 can be opposite each other along the lateral direction A. The fingers 254 can be longer along the longitudinal direction L than they are wide along the lateral direction A. Further, the fingers 254 can be taller along the transverse direction T than they are long along the longitudinal direction L. The fingers 254 extend down from respective walls of the support member 252. For instance, the fingers 254 can extend down from the side walls 260 along the transverse direction T. In one example, the fingers 254 can define respective upper portions 264 that extend along respective inner surfaces of the side walls 260. The fingers 254 can define respective lower portions 266 that extend down from the upper portions 264, and thus extend down from the side walls 260 as described above.

During operation, the latch 250 can be translatable between the engaged position and the disengaged position. For instance, the latch 250 can be translatable between the engaged position and the disengaged position along a direction angularly offset with respect to the rearward direction. The angularly offset direction can be the transverse direction T. In particular, the latch 250 can be inserted into the interconnect system 100 (FIG. 7A) downward along the transverse direction T toward the engaged position such that 1) the support member 252 receives the module housing 146 in the aperture 262, and 2) the fingers 254 ride along the channels 268. The end walls 258 of the support member 252 can ride along longitudinal ends of the module housing 146 while the fingers 254 translate along the channels 268 along the transverse direction T. The support member 252 can thus substantially surround at least three sides of the module housing 146 along a plane defined by the longitudinal direction L and a lateral direction A, such that the module housing 146 and the support member 252 define the first interference. In particular, the support member 252 can at least substantially surround an entirety of the module housing 146 along the plane that includes the longitudinal direction L and the lateral direction A. Abutment between the rear one of the end walls 258 of the support member 252 and the module housing 146 can define the first interference that prevents the interconnect module 102 from translating in the rearward direction relative to the latch 250.

The latch 250 can include first and second rear fingers 265 that extend down from the support member 252 along the transverse direction T. The rear fingers 265 can be spaced from each other along the lateral direction. Further, the rear fingers 265 can be in alignment with respective ones of the fingers 254 along the longitudinal direction L. The latch 250 can further include projections 267 that extend from the fingers 265 in the forward direction. When the latch 250 is in the engaged position, the fingers 265 can be disposed adjacent the module housing 146 in the rearward direction. Further, the projections 267 can extend into corresponding recesses of the module housing 146, thereby releasably securing the latch 250 to the module housing 146 when the latch 250 is in the engaged position. When the latch 250 is moved from the engaged position to the disengaged position, the projections 267 can be removed from the corresponding recesses.

When the latch 250 is in the engaged position, the upper portions 264 of the fingers 254 reside in the channels 268, and the lower portions 266 of the fingers 254 are disposed adjacent the second electrical connector 154, and in particular the second connector housing 153 or a securement member 188 that secures the second electrical connector to the host substrate 118, in the forward direction. The fingers 254 are further in alignment with the second electrical connector 154 along the longitudinal direction L. Thus, the fingers 254 and the second electrical connector 154 can define the second mechanical interference. For instance, the fingers 254 can abut the second electrical connector 154 so as to define the second mechanical interference. In particular, abutment between the fingers 254 and the second connector housing 153 can define the second mechanical interference. The latch 250 can be moved from the engaged position to the disengaged position by translating the latch 250 upward along the transverse direction until the fingers 254 are removed from alignment with the second electrical connector 154 along the longitudinal direction L, thereby removing the second mechanical interference. The support member 252 can further be removed from the interconnect module 102, thereby removing the first mechanical interference. It is recognized that the latch 250 can further define any suitable catch or clamp of the type described above if it is desired to releasably secure the latch 250 in the engaged position. Further, it is appreciated that if the latch 250 is in the engaged position prior to mating the interconnect module 102 with the host module 104, abutment between the second electrical connector 154, such as the second connector housing or the securement member 188, as the interconnect module 102 is mated with the host module 104 can urge the latch 250 upwards to the disengaged position. Once the interconnect module 102 has been mated with the host module 104, the latch 250 can be moved down to the engaged position in the manner descried herein.

As described above with respect to FIGS. 2A-7C, the latch can be constructed in accordance with any embodiment as desired, suitable to be translatable along the transverse direction T between the engaged position and the disengaged position. Alternatively, as will now be described with respect to FIGS. 8A-12I, the present disclosure recognizes that the interconnect system 100 can further include a latch that can be pivotable between the engaged position and the disengaged position. In particular, the latch can include at least one pivot member configured to be pivotally attached to the interconnect module 102 such that the latch is pivotable relative to the interconnect module 102 about a pivot axis between the disengaged position and the engaged position. The latch can be pivotable relative to the interconnect module 102 about a first direction from the disengaged position to the engaged position, and a second direction opposite the first direction from the engaged position to the disengaged position. The pivot axis can be oriented perpendicular to the longitudinal direction L. For instance, as illustrated in FIGS. 8A-10D, the pivot axis can be oriented along the lateral direction A. Alternatively, as illustrated in FIGS. 11A-12I, the pivot axis can be oriented along the transverse direction T. Because the latch remains pivotally attached to the module housing 146 when the latch is in the disengaged position, the first mechanical interference can when the latch 270 is in the disengaged position. Another embodiment may include a latch for mated first and second connectors. The latch can include a non-hinged housing having a first wall, a second wall, a third wall, and a fourth wall, wherein the first and third walls oppose each other, the second and fourth walls oppose each other, the first, second, third and fourth walls define an opening and opposed latch arms defined by the second and fourth walls, the opposed latch arms each having a cantilevered latch that extends from the second and fourth walls, wherein the first, second, third and fourth walls at least partially encompass four (or all of the) corresponding sidewalls of the first connector.

Figure 8B:
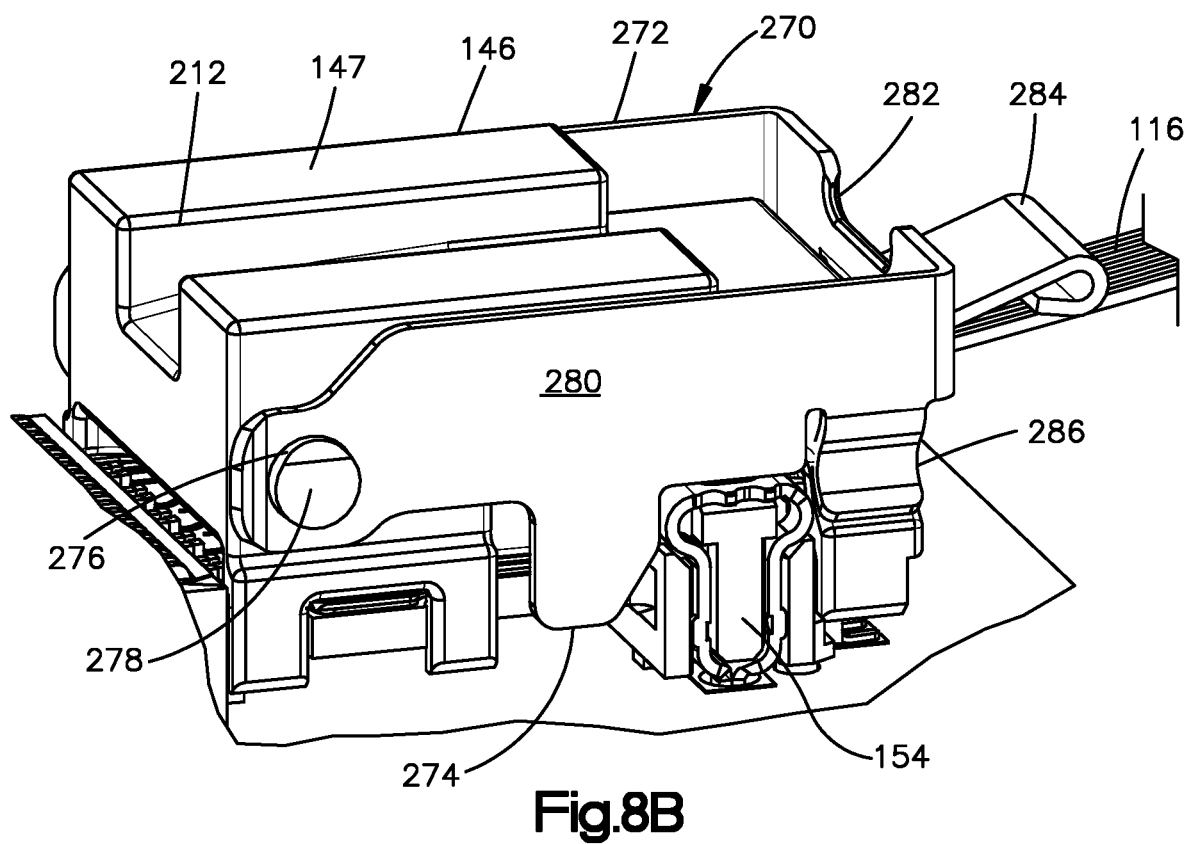
FIG. 8B is an enlarged perspective view of a portion of the interconnect system illustrated in FIG. 8A, showing the anti-backout latch in an engaged position.
Figure 8C:
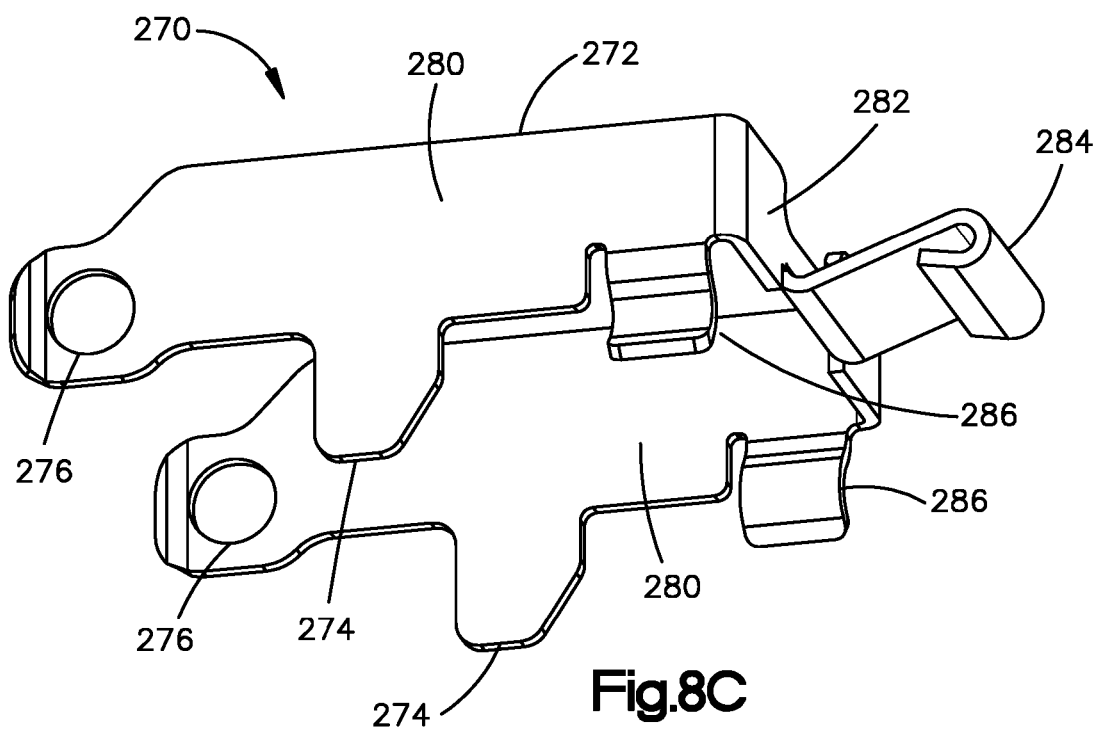
FIG. 8C is a perspective view of the anti-backout latch illustrated in FIG. 8A.

Referring now to FIGS. 8A-8C, the interconnect system 100 (FIG. 8A) can include an anti-backout latch 270 designed to prevent the interconnect module 102 (FIG. 8A) from being inadvertently unmated from the host module 104 (FIG. 8A). The latch 270 can include a support member 272 that is configured to be placed in mechanical communication with the interconnect module 102, and at least one finger 274 that extends out from the support member 272 and is configured to be placed in mechanical communication with the host module 104. As shown in FIGS. 8A and 8B, the latch 270 is pivotally supported by the module housing 146. For instance, the latch 270 can be pivotally attached to the module housing 146. In particular, the support member 272 can be pivotally supported by, for instance attached to, the module housing 146.

When the interconnect module 102 is mated with the at least one electrical connector of the host module 104, the latch 270 can be movable between a disengaged position and an engaged position. In particular, the latch 270 can be pivotable about a pivot axis between the disengaged position and the engaged position. For instance, the latch 270 can be pivotable in a first direction about the pivot axis to move the latch 270 from the disengaged position to the engaged position, and in a second direction opposite the first direction about the pivot axis to move the latch 270 from the engaged position to the disengaged position. The pivot axis can be spaced from the first electrical connector 152 (FIG. 8A) in the rearward direction. The at least one finger 274 can extend down from the support member 272 along the transverse direction T when the latch 270 is in the engaged position. The at least one finger 274 and clip 286 straddle the second electrical connector 154.

When the latch 270 is in the engaged position (FIG. 8B), a first mechanical interference is defined between the latch 270 and the interconnect module 102 that limits rearward movement of the interconnect module 102 with respect to the latch 270 in the rearward direction. The first mechanical interference can be defined by a pivotal attachment of the latch 270 to the interconnect module 102. Further, when the latch 270 is in the engaged position, a second mechanical interference is defined between the finger 274 and the host module 104 limits rearward movement of the latch 270 with respect to the at least one electrical connector of the host module 104. The second mechanical interference can include an abutment between the anti-backout latch 270 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 270, and of the latch 270 with respect to the at least one electrical connector of the host module 104, respectively. When the latch 270 is in the disengaged position, the second mechanical interference is removed such that the interconnect module 102 is movable in the rearward direction with respect to the at least one electrical connector of the host module 104 a sufficient distance so as to unmate the interconnect module 102 from the at least one electrical connector of the host module 104.

The support member 272 can include first and second pivot members 276 that are pivotally attached to the module housing 146. In particular, the support member 272 can include first and second support walls 280 that are pivotally attached to the module housing 146. The first and second support walls 280 can be spaced from each other along the lateral direction A. Thus, the support walls 280 can be positioned such that respective inner surfaces of the support walls face each other, and further face the module housing 146, when pivotally attached to the module housing 146. The pivot members 276 can be configured as apertures that extend through the support member 272 along the lateral direction A. The apertures are sized to receive a respective pivot pin 278 (FIGS. 8A and 8B) that is attached to the module housing 146, so as to pivotally attach the support member 272 to the module housing 146. Thus, the pivot pins 278 can define the pivot axis. It should be appreciated that the pivot members 276 can include the pivot pins 278 as desired.

The latch 270 can be mounted to the module housing 146 such that the support member 272 extends in the rearward direction from the pivot axis when the anti-backout latch 270 is in the engaged position. Further, when the latch 270 is in the engaged position, the pivot axis can be spaced from the at least one finger 274 in the forward direction. The support member 272 can further include a cross beam 282 that is connected between the support walls 280. Thus, the cross beam 282 can extend along the lateral direction A from the first support wall 280 to the second support wall 280. The support walls 280 can extend in the rearward direction from the pivot axis to the cross beam 282. The support walls 280 can also be referred to as side walls, and the cross beam 282 can be referred to as an end wall connected between the side walls. The latch 270 can include a handle 284 that extends out from the cross beam 282. The handle 284 is configured to receive a force that urges the latch to move between the engaged and disengaged positions.

The latch 270 can include first and second fingers 274 that extend from the support member 272. In particular, the first and second fingers 274 can extend from the first and second support walls 280, respectively. Thus, the first and second fingers 274 can be spaced from each other along the lateral direction A. Further, the first and second fingers 274 can be aligned with each other along the lateral direction A. The first and second fingers 274 can be spaced from the pivot axis in the rearward direction when the latch 270 is in the engaged position. Further, the cross beam 282 can be spaced from the first and second fingers 274 in the rearward direction when the latch 270 is in the engaged position. Thus, the fingers 274 can be disposed between the pivot axis and the cross beam 282 when the latch 270 is in the engaged position.

The latch 270 can further include at least one clip 286 that extends out from the support member 272. The clip 286 is configured to releasably secure the latch 270 in the engaged position. In particular, the clip 286 is configured to releasably attach to the interconnect module 102 when the latch 270 is in the engaged position. In one example, the clip 286 is configured to releasably attach to the module housing 146 when the latch 270 is in the engaged position. The at least one clip 286 can include first and second clips 286 that extend from respective ones of the first and second support walls 280. The clips 286 can thus be spaced from each other along the lateral direction A. Further, the clips 286 can be disposed between the fingers 274 and the cross beam 282 with respect to the longitudinal direction L. Thus, the clips 286 can be spaced from the fingers 274 in the rearward direction.

The clips 286 can define protrusions that extend laterally inwardly toward each other so as to resiliently cam over a respective wall of the module housing 146, and into a recess disposed below the wall when the latch 270 is in the engaged position. The clips 286 can be resilient such that when they are disposed below the respective wall of the module housing 146, a portion of the clips 286 is aligned with the respective wall along the transverse direction T. Thus, a mechanical interference between the clips 286 and the respective walls can prevent the latch from being inadvertently moved from the engaged position to the disengaged position. The mechanical interference between the clips 286 and the module housing 146 can be overcome when actuating the latch 270 to move from the engaged position to the disengaged position. Accordingly, when the latch 270 is in the engaged position, the latch 270 can be said to be releasably secured in the engaged position.

As shown in FIG. 8B, when the latch 270 is in the engaged position, the fingers 274 can extend to a location adjacent the second electrical connector 154, and in particular the second connector housing 153, in the forward direction. Further, the fingers 274 can be aligned with the second electrical connector 154, and in particular aligned with the second connector housing 153, along the longitudinal direction L. Thus, the fingers 274 and the second electrical connector 154 can define the second mechanical interference. In particular, abutment between the fingers 274 and the second electrical connector 154 can define the second mechanical interference when the latch 270 is in the engaged position. Further, when the latch 270 is in the engaged position, the second connector housing 153 can be disposed between the fingers 274 and the clips 286 with respect to the longitudinal direction L. A bottom surface of the latch 270 can be configured to face or rest against an upper surface of the second connector housing 153 when the latch 270 is in the engaged position. The cross beam 282 can be disposed adjacent the module housing 146 when the latch 270 is in the engaged position.

As shown in FIG. 8A, when the latch 270 is pivoted from the engaged position to the disengaged position, the fingers 274 are removed from longitudinal alignment with the second electrical connector 154, such that the interconnect module can be unmated from the first and second electrical connectors 152 and 154. Further, as the latch 270 is pivoted from the engaged position to the disengaged position, the clips 286 can disengage from the respective walls of the module housing, and ride along the module housing 146.

Figure 9B:
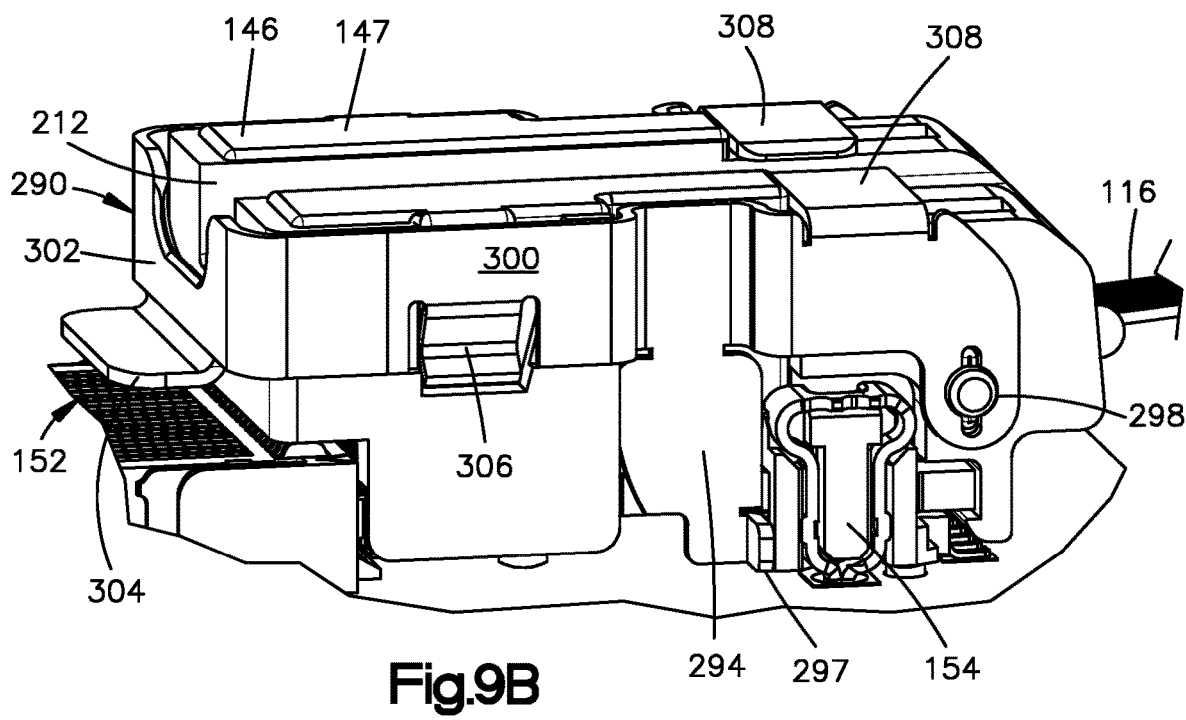
FIG. 9B is an enlarged perspective view of a portion of the interconnect system illustrated in FIG. 9A, showing the anti-backout latch in an engaged position.
Figure 9C:
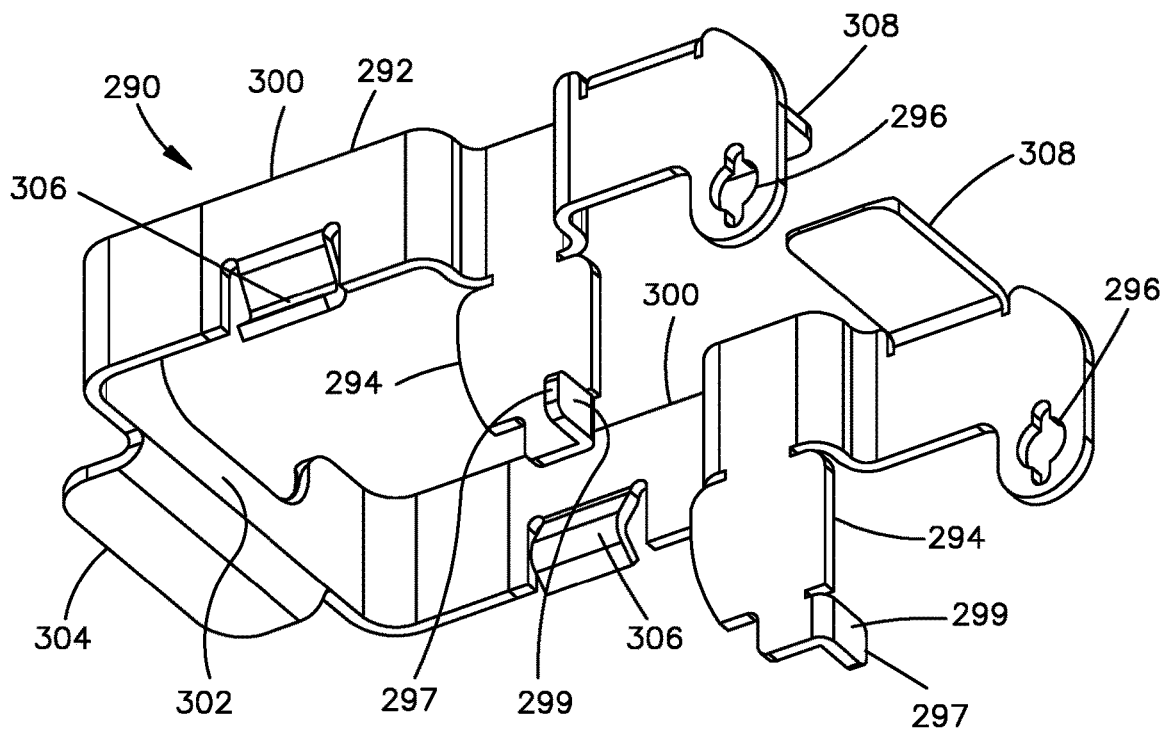
FIG. 9C is a perspective view of the anti-backout latch illustrated in FIG. 9A.

Referring now to FIGS. 9A-9C, the interconnect system 100 (FIG. 9A) can include an anti-backout latch 290 designed to prevent the interconnect module 102 (FIG. 9A) from being inadvertently unmated from the host module 104 (FIG. 9A). The latch 290 can include a support member 292 that is configured to be placed in mechanical communication with the interconnect module 102, and at least one finger 294 that extends out from the support member 292 and is configured to be placed in mechanical communication with the host module 104. In one example, the latch 290 is pivotally supported by the module housing 146. For instance, the latch 290 can be pivotally attached to the module housing 146. In particular, the support member 292 can be pivotally supported by, for instance attached to, the module housing 146.

As shown in FIG. 9A, when the interconnect module 102 is mated with the at least one electrical connector of the host module 104, the latch 290 can be movable between a disengaged position and an engaged position (FIG. 9B). In particular, the latch 290 can be pivotable about a pivot axis between the disengaged position and the engaged position. For instance, the latch 290 can be pivotable in a first direction about the pivot axis to move the latch 290 from the disengaged position to the engaged position, and in a second direction opposite the first direction about the pivot axis to move the latch 290 from the engaged position to the disengaged position. The pivot axis can be spaced from the first electrical connector 152 in the rearward direction. Further, the pivot axis can be spaced from the second electrical connector 154 in the rearward direction. The at least one finger 294 can extend down from the support member 292 along the transverse direction T when the latch 290 is in the engaged position.

When the latch 290 is in the engaged position, a first mechanical interference is defined between the latch 290 and the interconnect module 102 that limits rearward movement of the interconnect module 102 with respect to the latch 290 in the rearward direction. The first mechanical interference can be defined by a pivotal attachment of the latch 290 to the interconnect module 102. Further, when the latch 290 is in the engaged position, a second mechanical interference is defined between the finger 294 and the host module 104 limits rearward movement of the latch 290 with respect to the at least one electrical connector of the host module 104. The second mechanical interference can include an abutment between the anti-backout latch 290 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 290, and of the latch 290 with respect to the at least one electrical connector of the host module 104, respectively. When the latch 290 is in the disengaged position, the second mechanical interference is removed such that the interconnect module 102 is movable in the rearward direction with respect to the at least one electrical connector of the host module 104 a sufficient distance so as to unmate the interconnect module 102 from the at least one electrical connector of the host module 104.

The support member 292 can include first and second pivot members 296 that are pivotally attached to the module housing 146. In particular, the support member 292 can include first and second support walls 300 that are pivotally attached to the module housing 146. The first and second support walls 300 can be spaced from each other along the lateral direction A. Thus, the support walls 300 can be positioned such that respective inner surfaces of the support walls face each other, and further face the module housing 146, when pivotally attached to the module housing 146. The pivot members 296 can be configured as apertures that extend through the support member 292 along the lateral direction A. The apertures are sized to receive a respective pivot pin 298 that is attached to the module housing 146, so as to pivotally attach the support member 292 to the module housing 146. Thus, the pivot pins 298 can define the pivot axis. It should be appreciated that the pivot members 296 can include the pivot pins 298 as desired.

The latch 290 can be mounted to the module housing 146 such that the support member extends 292 in the forward direction from the pivot axis when the anti-backout latch 270 is in the engaged position. Further, when the latch 270 is in the engaged position, the pivot axis can be spaced from the at least one finger 274 in the rearward direction. As shown in FIG. 9C, the support member 292 can further include a cross beam 302 that is connected between the support walls 300. Thus, the cross beam 302 can extend along the lateral direction A from the first support wall 300 to the second support wall 300. The support walls 300 can extend in the forward direction from the pivot axis to the cross beam 302. The support walls 300 can also be referred to as side walls, and the cross beam 302 can be referred to as an end wall connected between the side walls. The latch 290 can include a handle 304 that extends out from the cross beam 302. The handle 304 is configured to receive a force that urges the latch to move between the engaged and disengaged positions. The handle 304 can be spaced above the first electrical connector 152 (FIGS. 9A and 9B) along the transverse direction T.

The latch 290 can include first and second fingers 294 that extend from the support member 292. In particular, the first and second fingers 294 can extend from the first and second support walls 300, respectively. Thus, the first and second fingers 294 can be spaced from each other along the lateral direction A. Further, the first and second fingers 294 can be aligned with each other along the lateral direction A. The first and second fingers 294 can be spaced from the pivot axis in the forward direction when the latch 290 is in the engaged position. Further, the cross beam 302 can be spaced from the first and second fingers 294 in the forward direction when the latch 290 is in the engaged position. Thus, the fingers 294 can be disposed between the pivot axis and the cross beam 302 when the latch 290 is in the engaged position. The support member 292 can extend from the pivot axis to the fingers 294 in the forward direction.

The latch 290 can further include at least one clip 306 that extends out from the support member 292. The clip 306 is configured to releasably secure the latch 290 in the engaged position. In particular, the clip 306 is configured to releasably attach to the interconnect module 102 when the latch 290 is in the engaged position. In one example, the clip 306 is configured to releasably attach to the module housing 146 when the latch 290 is in the engaged position. The at least one clip 306 can include first and second clips 306 that extend from respective ones of the first and second support walls 300. The clips 306 can thus be spaced from each other along the lateral direction A. Further, the clips 306 can be spaced from the fingers 294 in the forward direction. Thus, the clips 306 can be disposed between the fingers 294 and the cross beam 282 with respect to the longitudinal direction L. The fingers 294 can be disposed between the clips 306 and the pivot axis with respect to the longitudinal direction L.

The clips 286 can define protrusions that extend laterally inwardly toward each other so as to resiliently cam over a respective wall of the module housing 146, and into a recess disposed below the wall when the latch 290 is in the engaged position. The clips 306 can be resilient such that when they are disposed below the respective wall of the module housing 146, a portion of the clips 306 is aligned with the respective wall along the transverse direction T. Thus, a mechanical interference between the clips 306 and the respective walls can prevent the latch from being inadvertently moved from the engaged position to the disengaged position. The mechanical interference between the clips 306 and the module housing 146 can be overcome when actuating the latch 290 to move from the engaged position to the disengaged position. Accordingly, when the latch 290 is in the engaged position, the latch 290 can be said to be releasably secured in the engaged position.

When the latch 290 is in the engaged position, the fingers 294 can extend to a location adjacent the second electrical connector 154, and in particular adjacent the second connector housing 153, in the forward direction. Further, the fingers 294 can be aligned with the second electrical connector 154, and in particular the second connector housing 153, along the longitudinal direction L when the latch 290 is in the engaged position. Thus, abutment between the fingers 294 and the second electrical connector 154 can defines the second mechanical interference when the latch 290 is in the engaged position. In particular, the fingers 294 can each include can include an abutment member 297 that extends from the distal end of each of the fingers 294. The abutment member 297 can extend laterally out from the finger 294 along a direction away from the other finger. The abutment member 297 can define an abutment surface 299 that faces the rearward direction. The abutment surface 299 can be configured to abut the second electrical connector 154 when the latch 290 is in the engaged position, thereby defining the second mechanical interference.

Further, when the latch 290 is in the engaged position, the fingers 294 can be disposed between the second connector housing 153 and the clips 306 with respect to the longitudinal direction L. The latch 290 can include at least one support arm 308 that extends from the support member 292, and is configured to rest against an upper surface of the module housing 146 when the latch 290 is in the engaged position. For instance, the latch 290 can include a pair of support arms 308 that extend from respective ones of the support walls 300 along the lateral direction A toward each other. The cross beam 302 can be disposed adjacent the module housing 146 when the latch 290 is in the engaged position. For instance, the cross beam 302 can be adjacent a front wall of the module housing 146 in the forward direction when the latch 290 is in the engaged position.

When the latch 290 is pivoted from the engaged position to the disengaged position, the fingers 294, are removed from longitudinal alignment with the second electrical connector 154, such that the interconnect module 102 can be unmated from the first and second electrical connectors 152 and 154. Further, as the latch 290 is pivoted from the engaged position to the disengaged position, the clips 306 can disengage from the respective walls of the module housing, and ride along the module housing 146.

Figure 10A:
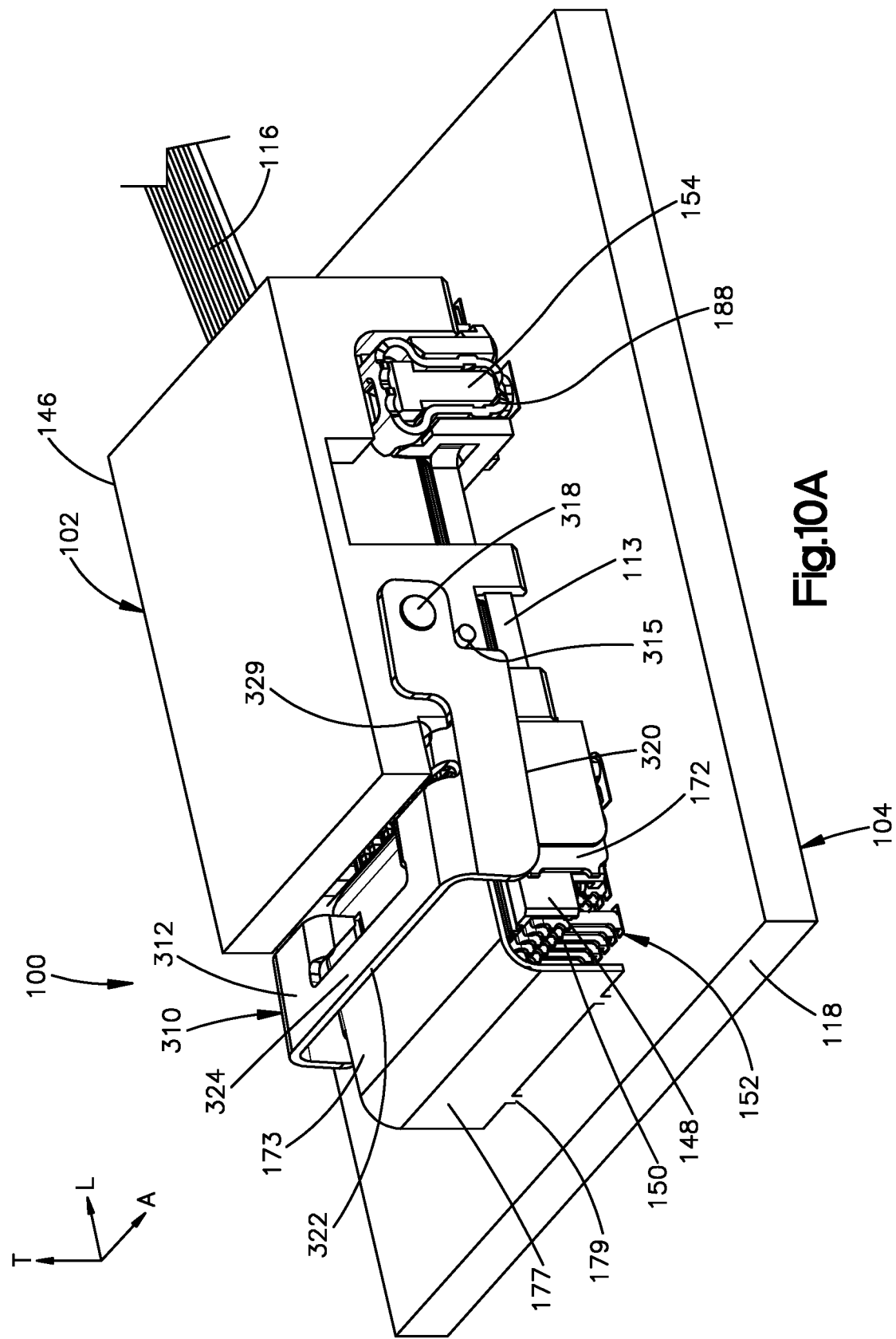
FIG. 10A is a perspective view of an interconnect system including an interconnect module, a host module, and an anti-backout latch constructed in accordance with another embodiment shown in a disengaged position.
Figure 10B:
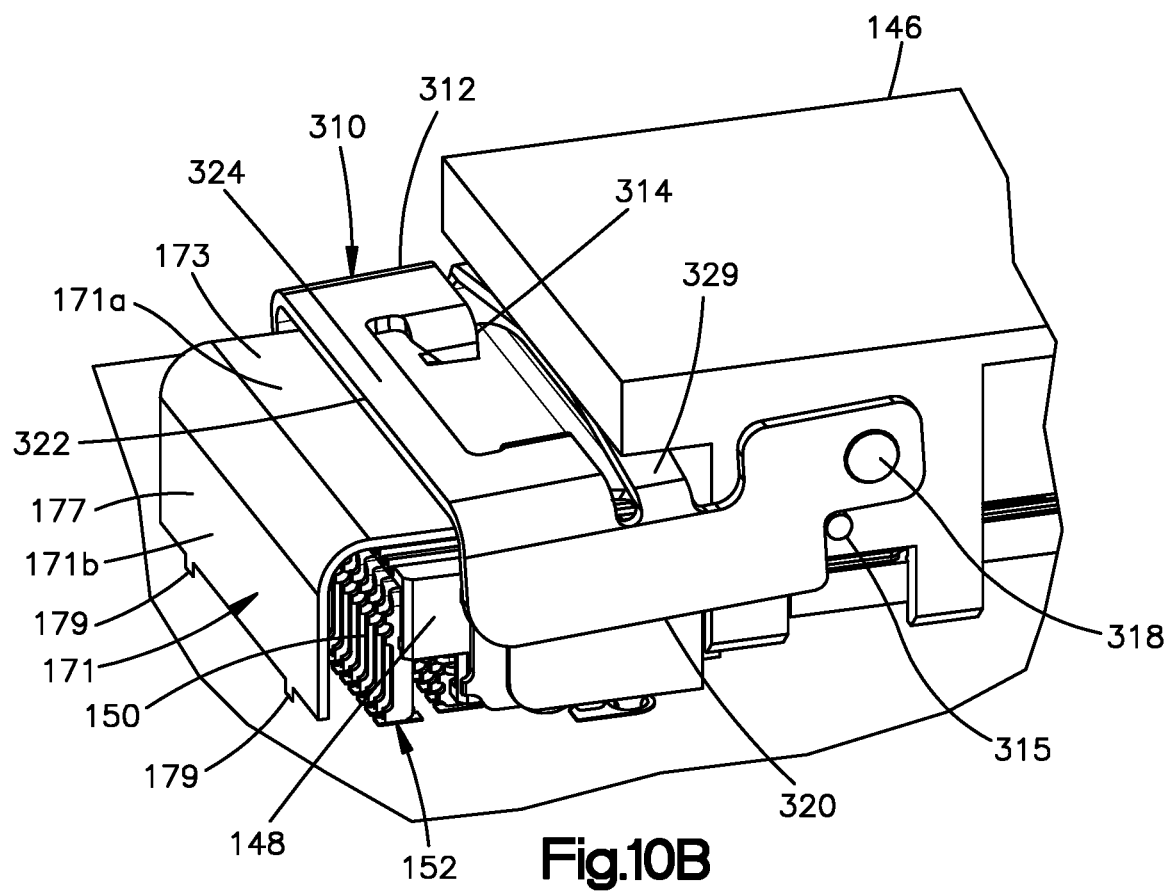
FIG. 10B is an enlarged perspective view of a portion of the interconnect system illustrated in FIG. 10A, showing the anti-backout latch in an engaged position.
Figure 10C:
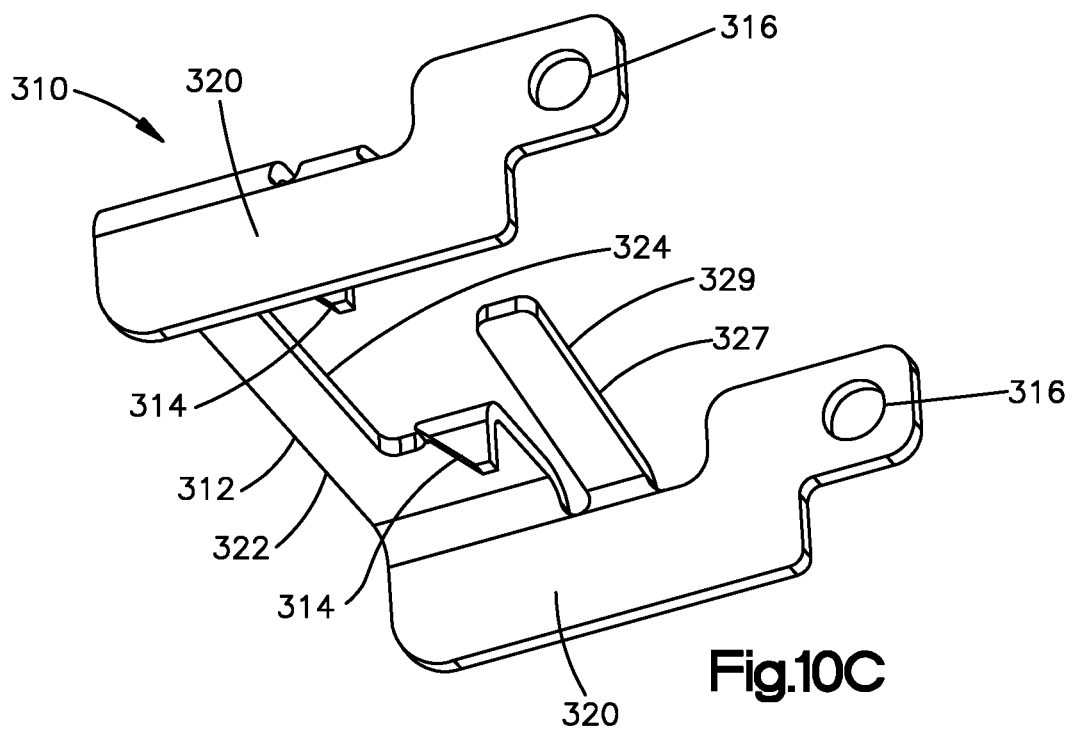
FIG. 10C is a perspective view of the anti-backout latch illustrated in FIG. 10A.

Referring now to FIG. 10A, the interconnect system 100 can include an anti-backout latch 310 designed to prevent the interconnect module 102 from being inadvertently unmated from the host module 104. The latch 310 can include a support member 312 that is configured to be placed in mechanical communication with the interconnect module 102, and at least one engagement member that is configured to be placed in mechanical communication with the host module 104. In particular, the at least one engagement member can abut the host module 104 when the latch is in the engaged position, so as to define the second mechanical interference. Thus, the at least one engagement member can be spaced from a forward-most end of the module housing 164 in the forward direction. Further, the at least one engagement member can be spaced from the electrical contact pads at the front end 119a of the module substrate 113 in the forward direction. It can further be said that the anti-backout latch 310 can extend from the pivot axis to the at least one engagement member in the forward direction. The at least one engagement member can be configured as at least one outwardly extending finger 314 that extends out from the support member 312. The at least one finger 314 can be configured to extend into the host module 104 when the latch is in the engaged position, so as to define the second mechanical interference. Thus, the at least one finger 314 is configured to be received by the host module 14 when the latch is in the engaged position. The at least one finger 314 can be configured as a pair of fingers spaced from each other along the lateral direction A. In one example, the latch 310 is pivotally supported by the module housing 146. For instance, the latch 310 can be pivotally attached to the module housing 146. In particular, the support member 312 can be pivotally supported by, for instance attached to, the module housing 146.

When the interconnect module 102 is mated with the at least one electrical connector of the host module 104, the latch 310 can be movable between a disengaged position and an engaged position. In particular, the latch 310 can be pivotable about a pivot axis between the disengaged position and the engaged position. For instance, the latch 310 can be pivotable in a first direction about the pivot axis to move the latch 310 from the disengaged position to the engaged position, and in a second direction opposite the first direction about the pivot axis to move the latch 310 from the engaged position to the disengaged position. The pivot axis can be spaced from the first electrical connector 152 in the rearward direction. The pivot axis can further be spaced from the second electrical connector 154 in the forward direction. The at least one finger 314 can extend down from the support member 312 along the transverse direction T when the latch 310 is in the engaged position. An entirety of the latch 310 can be spaced from the host substrate 318 in the upward direction. Thus, it can be said that no part of the latch 310 extends into the host substrate 318 both when the latch 310 is in the engaged position and when the latch 310 is in the disengaged position. Further, in one example, no part of the latch 310 extends to a location below the module substrate 318.

When the latch 310 is in the engaged position, as shown in FIG. 10A, a first mechanical interference is defined between the latch 310 and the interconnect module 102 that limits rearward movement of the interconnect module 102 with respect to the latch 310 in the rearward direction. The first mechanical interference can be defined by a pivotal attachment of the latch 310 to the interconnect module 102. Further, when the latch 310 is in the engaged position, a second mechanical interference is defined between the finger 314 and the host module 104 limits rearward movement of the latch 310 with respect to the at least one electrical connector of the host module 104. The second mechanical interference can include an abutment between the anti-backout latch 310 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 310, and of the latch 310 with respect to the at least one electrical connector of the host module 104, respectively. When the latch 310 is in the disengaged position, the second mechanical interference is removed such that the interconnect module 102 is movable in the rearward direction with respect to the at least one electrical connector of the host module 104 a sufficient distance so as to unmate the interconnect module 102 from the at least one electrical connector of the host module 104.

The support member 312 can include first and second pivot members 316 that are pivotally attached to the module housing 146. In particular, the support member 312 can include first and second support walls 320 that are pivotally attached to the module housing 146. The first and second support walls 320 can further extend past the module housing 146 in the forward direction. The first and second support walls 320 can be spaced from each other along the lateral direction A. The support walls 320 can thus define outermost sides of the latch 310. The support walls 320 can further support the fingers 314. The support walls 320 can be positioned such that respective inner surfaces of the support walls face each other also, and further face the module housing 146, when pivotally attached to the module housing 146. The pivot members 316 can be configured as apertures that extend through the support member 312 along the lateral direction A. The apertures are sized to receive a respective pivot pin 318 that is attached to the module housing 146, so as to pivotally attach the support member 312 to the module housing 146. Thus, the pivot pins 318 can define the pivot axis. It should be appreciated that the pivot members 316 can include the pivot pins 318 as desired.

The latch 310 can be mounted to the module housing 146 such that the support member 312 extends in the forward direction from the pivot axis when the anti-backout latch 310 is in the engaged position. Further, when the latch 310 is in the engaged position, the pivot axis can be spaced from the at least one finger 314 in the rearward direction. The support member 312 can further include a cross beam 322 that is connected between the support walls 320. Thus, the cross beam 322 can extend along the lateral direction A from the first support wall 320 to the second support wall 320. The support walls 320 can extend in the forward direction from the pivot axis to the cross beam 322. The support walls 320 can also be referred to as side walls, and the cross beam 322 can be referred to as an end wall connected between the side walls. The cross beam 322 can define a handle 324 that is configured to receive a force that urges the latch to move from the engaged position to the disengaged position.

The latch 310 can include engagement members that are configured to engage the host module so as to define the second mechanical interference. In particular, the engagement members can be configured as first and second fingers 314 that extend from the support member 312. The first and second fingers 314 can be inwardly offset along the lateral direction A with respect to the first and second support walls 320. Thus, the first and second fingers 314 can be disposed between the first and second support walls 320 with respect to the lateral direction A. Further, the first and second fingers 314 can be aligned with the first and second support walls 320 along the lateral direction. The first and second fingers 314 can extend down from the cross beam 322. Alternatively, the first and second fingers 314 can extend from the first and second support walls 320, respectively, or any suitable alternative location of the latch 310. Thus, the first and second fingers 314 can be spaced from each other along the lateral direction A. Further, the first and second fingers 314 can be aligned with each other along the lateral direction A. The first and second fingers 314 can be spaced from the pivot axis in the forward direction when the latch 310 is in the engaged position. Further, the cross beam 322 can be spaced from the pivot axis in the forward direction when the latch 310 is in the engaged position. Thus, it can be said that the latch 310 extends from the pivot axis in the forward direction to the first and second fingers 314. The fingers 314 can be spaced from the handle 324 in the rearward direction. Thus, the fingers 314 can be disposed between the handle 324 and the pivot axis with respect to the longitudinal direction L.

The latch 310 can further include at least one biasing member 327 that is configured to apply a biasing force that biases the latch 310 toward the engaged position. In one example, the biasing member 327 can be configured to abut the interconnect module 102 so as to provide the biasing force. For instance, the biasing member 327 can be configured to abut a lower surface of the module housing 146 so as to provide the biasing force. The biasing member 327 can be defined by a resilient spring arm 329 that extends from the support member 312. The spring arm 329 can be upwardly curved as it extends from the support member 312. In one example, the biasing member 327 can extend from one of the support walls 320 toward the other support wall 320. The biasing member 327 can terminate prior to reaching the other support wall 320. For instance, the at least one biasing member 327 can include a pair of biasing members 327. Each biasing member 327 can extend from one of the support walls toward the other support wall 320, but can terminate without contacting each other. The pivot axis can be spaced from the biasing members 327 in the rearward direction. The biasing members 327, in turn, can be spaced from the fingers 314 in the rearward direction. Accordingly, the biasing members 327 can be disposed between the pivot axis and the fingers 314 with respect to the longitudinal direction L. Thus, each of the biasing members 327 can abut a lower surface of the module housing 146, thereby biasing the fingers 314 downward to the engaged position. The module housing 146 can include an abutment peg 315 that is configured to abut a lower end of the latch 310 when the latch 310 is in the engaged position, thereby limiting the distance that the fingers 314 extend downward. The abutment peg 315 (FIGS. 10A and 10B) can extend outward in the lateral direction at a location spaced downward from the pivot axis. The abutment peg 315 can further be offset from the pivot axis in the forward direction. The module housing 146 can include first and second abutment pegs 315 configured to abut opposed support walls 320 of the latch 310.

As will be appreciated from the description below, the latch 310 can be configured to be lifted against the biasing force so as to actuate the latch 310 from the engaged position to the disengaged position. For instance, an upward disengagement force can be applied to the latch 310 at a location spaced forward from the pivot axis, thereby urging the latch 310 to move from the engaged position (FIG. 10A) to the disengaged position. In one example, the upward force can be applied to the handle 324. Alternatively, the upward force can be applied to the latch 310 at any suitable alternative location spaced forward from the pivot axis in the forward direction. Alternatively still, the latch 310 can be configured such that a downward force can be applied to the latch 310 at a location spaced from the pivot axis in the rearward direction, thereby urging the latch 310 to move from the engaged position to the disengaged position.

Figure 10D:
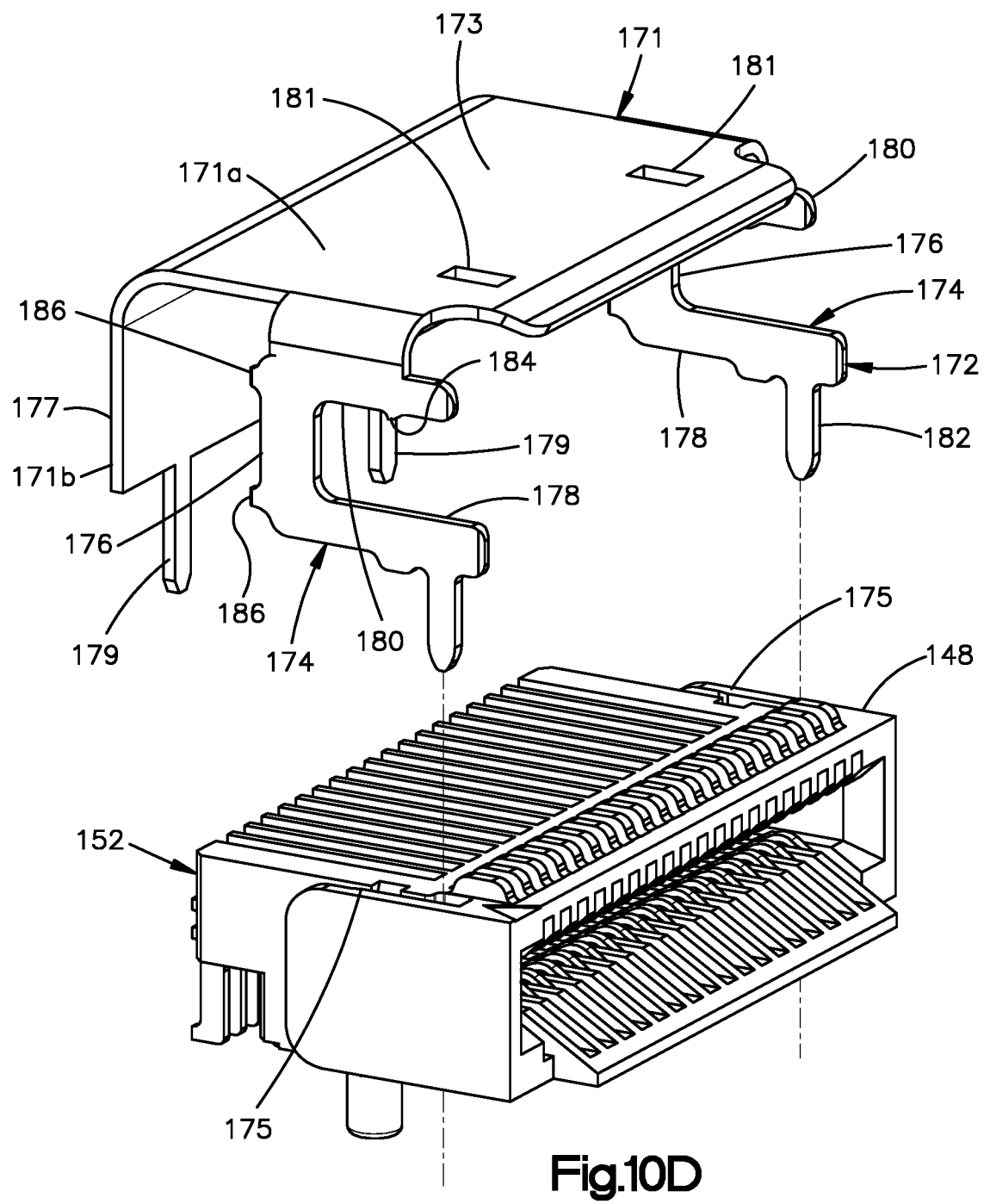
FIG. 10D is an exploded perspective view of a first electrical connector of the host module, showing securement tabs configured to be secured to an underlying substrate.

As described above with respect to FIG. 2D and with respect to FIG. 10D, the host module 104, and thus the interconnect system 100 (see FIG. 10A), can include a securement member 172 that is configured to further secure the first electrical connector 152 to the host substrate 118 (FIG. 10A). For instance, the securement member 172 can include at least one securement body 174 that is configured to be mounted to the underlying substrate 118. In one example, the securement member 172 can include first and second securement bodies 174. The securement bodies 174 can be spaced from each other along the lateral direction A. The host module 104 can further include a housing 171 that can at least partially surround the first electrical connector 152. Thus, the housing 171 can also at least partially surround the electrical contacts 150 of the first electrical connector 152. For instance, the housing 171 can define an upper end 171a that overlaps the electrical contacts 150 along the transverse direction T. In particular, the upper end 171a can be spaced upward with respect to the electrical contacts 150. Further, the housing 171 can define a front end 171b that is spaced forward from the electrical contacts 152.

The securement member 172 can extend from the housing 171. Thus, it can be said that the housing 171 is configured to be mounted to the underlying substrate 118. In one example, the securement member 172 can be monolithic with the housing 171. Each of the securement bodies 174 can have an upstanding wall 176, and a lower wall 178 that extends from a lower end of the upstanding wall 176 in the rearward direction. The securement body 174 can further include an upper wall 180 that extends from an upper end of the upstanding wall 176 in the rearward direction. The upper wall 180 can be opposite the lower wall 178, and can be spaced from the lower wall 178 along the transverse direction T so as to define an opening therebetween. The lower wall 178 can extend to a location offset with respect to the upper wall 180 in the rearward direction. The upstanding wall 176, the upper wall 180, and the lower wall 178 can all be coplanar with each other along a plane defined by the transverse direction T and the longitudinal direction L. Further, the upstanding wall 176, the upper wall 180, and the lower wall 178 can all dimensioned greater in the plane than in the lateral direction A that is perpendicular to the plane.

The securement member 172 can further include a securement tab 182 that extends down from each of the securement bodies 174. For instance, the securement tab 182 can extend from the lower wall 178. The securement tab 182 is configured to be secured in an aperture of the underlying host substrate 118 (FIG. 10A). For instance, the securement tab 182 can be welded in the aperture of the host substrate 118. The securement member 172 can be configured to be received in a slot 175 of the first connector housing 148 so as to attach the securement member 172 to the first electrical connector 152. For instance, the upstanding wall 176 can be configured to be inserted into the slot 175.

The securement body 174 can include a retention bump 184 that is configured to engage the first connector housing 148 so as to secure the securement member 172 to the first electrical connector 152. For instance, the retention bump 184 can extend from the upper wall 180. In one example, the retention bump 184 can extend from the upper wall 180 toward the lower wall 178. Thus, the retention bump 184 can extend from the securement body 174 into the opening. The securement body 174 can further include at least one projection 186 that extends from the upstanding wall 176 in the forward direction. Thus, the projection 186 can extend away from the upstanding wall 176 in a direction away from the opening of the securement member 172. The projection 186 can lie in the same plane defined by the transverse direction T and the longitudinal direction L. In one example, the securement body 174 can include first and second projections 186 spaced from each other along the transverse direction.

The securement member 172 can include first and second securement bodies 174 that are each configured to be coupled between the host substrate 118 and the first electrical connector 152 in the manner described above. For instance, the first and second securement bodies 174 can attach to laterally outer ends of the first connector housing 148. In one example, the first plurality of electrical contacts 150 can be disposed between the first and second securement bodies 174.

As described above, the housing 171 can define an upper end 171a that overlaps the electrical contacts 150 along the transverse direction T. In particular, the upper end 171a can be spaced upward with respect to the electrical contacts 150. Further, the housing 171 can define a front end 171b that is spaced forward from the electrical contacts 152. For instance, the housing 171 can include at least one plate that is extends between the first and second securement bodies 174. The at least one plate can further be connected between the first and second securement bodies 174. The at least one plate can be monolithic with the first and second securement bodies 174. Alternatively, the at least one plate can be separate from and attached to the first and second securement bodies 174 in any manner as desired. Further, because the securement member 172 can be monolithic with the housing 171, it can also be said that the securement member 172 includes the at least one plate that is connected between the first and second securement bodies 174.

In one example, the at least one plate can include an upper plate 173 that is connected between the first and second securement bodies 174. The upper plate 173 can, for instance, be connected between the upper walls 180 of the first and second securement bodies 174. The upper plate 173 can be positioned so as to be upwardly offset from the first electrical connector 152 when the securement member 172 is attached to the first electrical connector 152. Thus, the upper plate 173 can be spaced from the electrical contacts of the first electrical connector 152 in the upward direction, and aligned with the electrical contacts of the first electrical connector 152 along the transverse direction. The upper plate 173 can be aligned with the first electrical connector 152 along the transverse direction T when the securement member 172 is attached to the first electrical connector 152. Further, the upper plate 173 can be aligned with the first electrical connector 152 along the transverse direction T when the securement member 172 is mounted to the host substrate 118. The upper plate 173 can be oriented in a plane that is defined by the longitudinal direction L and the lateral direction A. The upper plate 173 can be offset from the upper walls of the first and second securement bodies 174 in the upward direction. The upper plate 173 can define the upper end 171a of the housing.

The at least one plate can further include a front plate 177 that extends down from the upper plate 173. The front plate 177 can be oriented in a plane defined by the lateral direction A and the transverse direction T. The front plate 177 can have the same width along the lateral direction A as the upper plate 173. Alternatively, the front plate 177 can be dimensioned different than the upper plate 173 along the lateral direction A. The front plate 177 can be monolithic with the upper plate 173. Alternatively, the front plate 177 can be separate from and attached to the upper plate 173 in any manner as desired. The front plate 177 can be spaced from the securement bodies 174 in the forward direction. Thus, the front plate 177 can be disposed adjacent the first electrical connector 152 in the forward direction when the securement member 172 is attached to the first electrical connector 152. Accordingly, the front plate 177 can be disposed adjacent the electrical contacts 150 of the first electrical connector 152.

The securement member 172 can further include at least one front securement tab 179 that extends down from the front plate 177 and is configured to be secured to the host substrate 118 (FIG. 10A). For instance, the at least one front securement tab 179 can be inserted into an aperture of the host substrate 118. In one example, the at least one front securement tab 179 can be welded in the aperture of the host substrate 118, which can be configured as a through hole plated with a metallic material. The at least one front securement tab 179 can include first and second securement tabs 179 that are spaced from each other along the lateral direction A. Further, the front securement tabs 179 can be aligned with respective ones of the securement tabs 182 along the longitudinal direction L. The front securement tabs 179 can be spaced from the securement tabs 182 in the forward direction. The front plate 177 can define the front end 171b of the housing.

As will now be described, "the latch 310 can include at least one engagement member, and the securement member 172 defines a complementary engagement member, such that the engagement member of the latch 310 is configured to mate with the engagement member of the securement member 172 so as to attach the latch 310 to the securement member 172. For instance, the engagement member of the latch 310 can be configured to mate with the engagement member of the securement member 172 so as to attach the latch 310 to the securement member 172 when the latch 310 is in the engaged position. The latch 310 and the securement member 172 can at least partially define the second mechanical interference. It should be appreciated that the securement member 172 as illustrated in FIGS. 10A-10D can be incorporated into any embodiment described herein so as to engage the respective latch finger when the latch is in the engaged position in the manner described herein."

In one example, the at least one engagement member of the latch 310 can be defined by the at least one finger 314. The at least one finger 314 can be configured to extend into the securement member 172 so as to define the second mechanical interference. Thus, the complementary engagement member of the securement member 172 can be configured as at least one aperture 181 that extends at least therein or therethrough, and is sized to receive the engagement member of the latch 310. In one example, the aperture 181 can extend at least into the upper plate 173. For instance, the at least one aperture 181 can extend through the upper plate 173. In one example, the securement member 172 can include first and second apertures 181 that extend through the upper plate 173 along the transverse direction T. Similarly, the at least one finger 314 can include the first and second fingers 314. The apertures 181 can be sized to receive a respective one of the first and second fingers 314 when the latch 310 is in the engaged position. Thus, the fingers 314 can be spaced forward of an inner edge of the upper plate 173 that partially defines the apertures 181 so as to define the second mechanical interference between the fingers 314 and the upper plate 173.

When the latch 310 is in the engaged position, the fingers 314 can extend at least into or through the apertures 181. The fingers 314 can terminate above the first electrical connector 152. Thus, because upper plate 173 can be aligned with the first electrical connector 152 along the transverse direction T, it can be concluded that the fingers 314 can be aligned with the electrical connector along the transverse direction T. Further, the latch 310 can extend to a position that is above the first electrical connector 152 and aligned with the first electrical connector along the transverse direction T. For instance, the engagement member of the latch 310 can be disposed above the first electrical connector 152, such that the first electrical connector 152 is disposed between the engagement member and the host substrate 118. Alternatively, the fingers 314 can extend into the first connector housing 148 as desired. Thus, the fingers can be received by the first connector housing 148 as desired.

Abutment between the fingers 314 and the securement member 172 can define the second mechanical interference when the latch 310 is in the engaged position. The biasing members of the latch 310 can apply a biasing force that urges the fingers 314 in the apertures 181. The disengagement force can be applied to the latch 310 against the biasing force sufficient to remove the fingers 314 from the apertures 181, thereby removing the mechanical interference. The disengagement force can compress the biasing members of the latch 310. When the latch 310 is pivoted from the engaged position to the disengaged position, the interconnect module 102, including the latch 310, is movable with respect to the host module 104 in the rearward direction, thereby unmating the interconnect substrate 113 from at least one or both of the first and second electrical connectors 152 and 154.

Referring now to FIG. 11A, the interconnect system 100 can include an anti-backout latch 350 designed to prevent the interconnect module 102 from being inadvertently unmated from the host module 104. The latch 350 can include a support member 352 that is configured to be placed in mechanical communication with the interconnect module 102, and at least one finger 354 that extends out from the support member 352 and is configured to be placed in mechanical communication with the host module 104. The at least one finger 354 can be configured to extend into the host module 104 when the latch 350 is in the engaged position, so as to define the second mechanical interference. In one example, the latch 350 is pivotally supported by the module housing 146. For instance, the latch 350 can be pivotally attached to the module housing 146. In particular, the support member 352 can be pivotally supported by, for instance attached to, the module housing 146. Referring to FIG. 11D, the module housing 146 can include a plurality of downwardly extending legs 149 that are sized and positioned to be inserted into respective recesses 123 (FIG. 11A) of the host substrate 118.

Figure 11B:
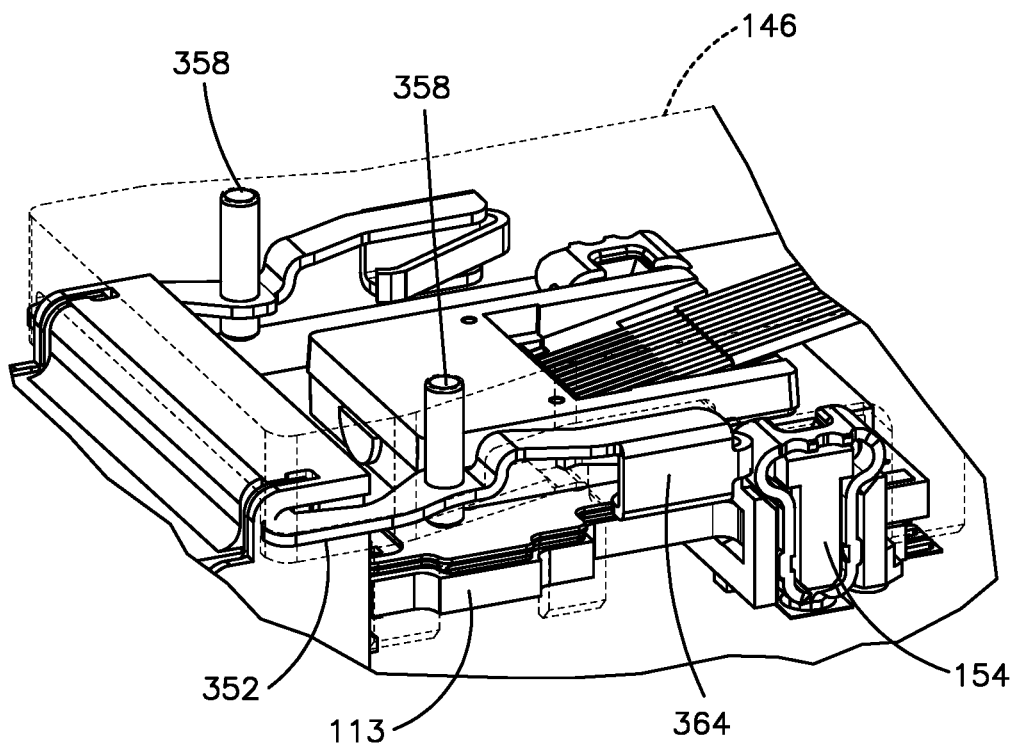
FIG. 11B is an enlarged perspective view of a portion of the interconnect system illustrated in FIG. 11A, showing the anti-backout latch in an engaged position.

When the interconnect module 102 is mated with the at least one electrical connector of the host module 104, the latch 350 can be movable between a disengaged position (FIG. 11A) and an engaged position (FIG. 11B). In particular, the latch 350 can be pivotable about a pivot axis between the disengaged position and the engaged position. The pivot axis can be oriented along the transverse direction T. Thus, the pivot axis can be oriented normal to the host substrate 118 which is oriented along a plane defined by the longitudinal direction L and the lateral direction A. For instance, the latch 350 can be pivotable in a first direction about the pivot axis to move the latch 350 from the disengaged position to the engaged position, and in a second direction opposite the first direction about the pivot axis to move the latch 350 from the engaged position to the disengaged position. As shown in FIG. 11A, the pivot axis can be spaced from the first electrical connector 152 in the rearward direction. The pivot axis can further be spaced from the second electrical connector 154 in the forward direction. The at least one finger 354 can extend inward from the support member 352 along the lateral direction A when the latch 350 is in the engaged position. Thus, the finger 354 can extend from the support member 352 along a direction that lies in a plane that includes the longitudinal direction L and the lateral direction A.

When the latch 350 is in the engaged position (FIG. 11B), a first mechanical interference is defined between the latch 350 and the interconnect module 102 that limits rearward movement of the interconnect module 102 with respect to the latch 350 in the rearward direction. As shown in FIG. 11A, the first mechanical interference can be defined by a pivotal attachment of the latch 350 to the interconnect module 102. Further, when the latch 350 is in the engaged position, a second mechanical interference is defined between the finger 354 and the host module 104 limits rearward movement of the latch 350 with respect to the at least one electrical connector of the host module 104. The finger 354 can be aligned with the first electrical connector 152 along a plane that is defined by the lateral direction A and the transverse direction T when the latch 350 is in the engaged position. The second mechanical interference can include an abutment between the anti-backout latch 350 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 350, and of the latch 350 respect to the at least one electrical connector of the host module 104, respectively. When the latch 350 is in the disengaged position, the second mechanical interference is removed such that the interconnect module 102 is movable in the rearward direction with respect to the at least one electrical connector of the host module 104 a sufficient distance so as to unmate the interconnect module 102 from the at least one electrical connector of the host module 104.

Figure 11C:
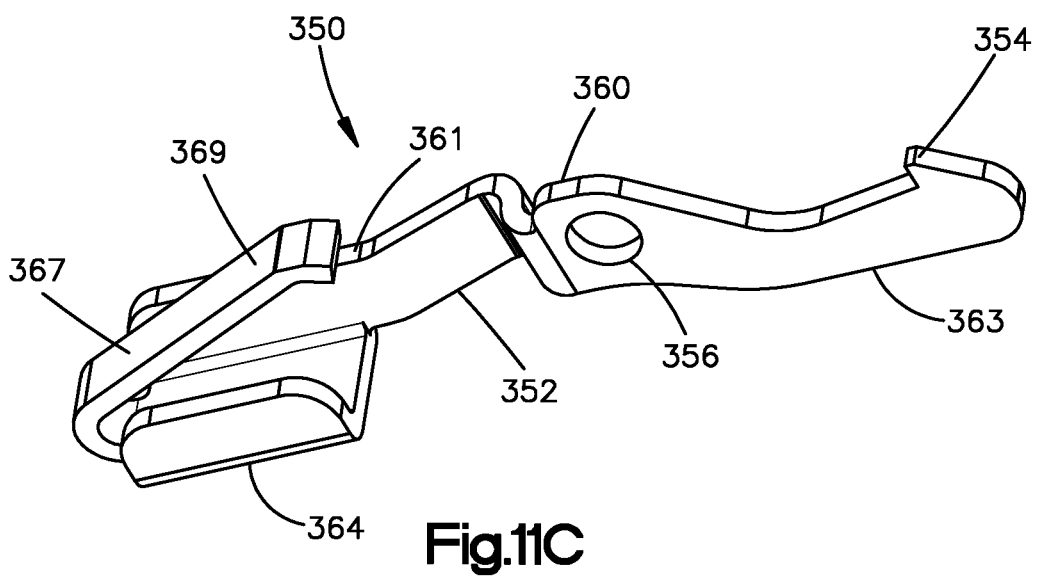
FIG. 11C is a perspective view of the anti-backout latch illustrated in FIG. 11A.
Figure 11F:
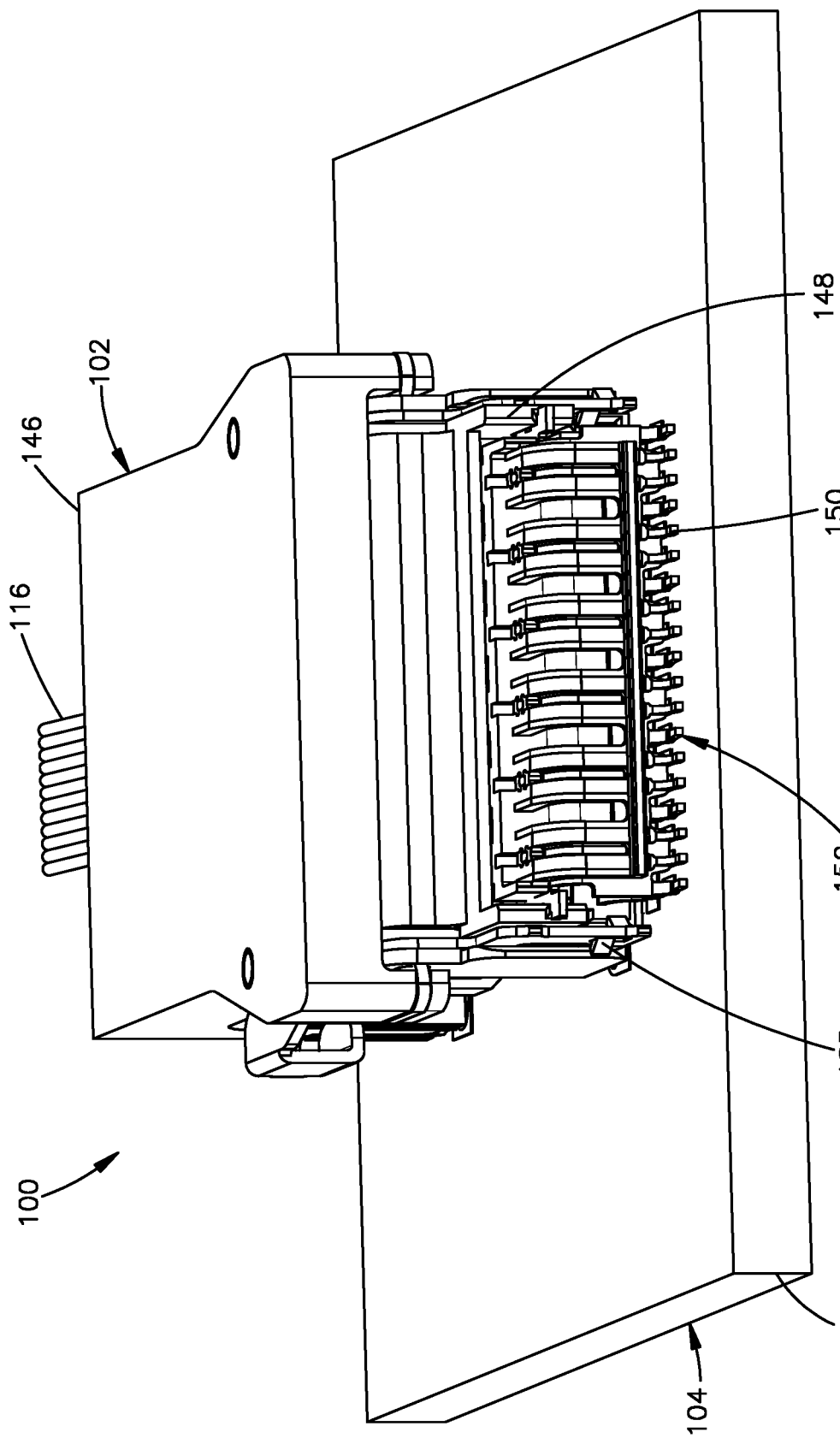
FIG. 11F is another perspective view of the interconnect system.

The support member 352 can include a pivot member 356 that is pivotally attached to the module housing 146. As shown in FIG. 11C, the support member 352 can include a support wall 360 that is pivotally attached to the module housing 146 via the pivot member 356 and pivot pin 358 (FIG. 11B). The support wall 360 can include a handle portion 361 and an attachment portion 363. The finger 354 can extend from inward the attachment portion 363 along the lateral direction A. The attachment portion 363 can be spaced from the handle portion 361 in the forward direction when the latch 350 is pivotally attached to the module housing 146. The pivot member 356 can be configured as an aperture that extends through the support member 352 along the transverse direction T. The aperture can be disposed between the handle portion 361 and the attachment portion 363 with respect to the longitudinal direction L. The latch 350 can further include a handle 364 that is disposed at the rear end of the support member 352. The aperture is sized to receive a respective pivot pin 358 that is attached to the module housing 146, so as to pivotally attach the support member 352 to the module housing 146. Thus, the pivot pin 358 can define the pivot axis. It should be appreciated that the pivot member 356 can include the pivot pin 358 as desired. Further, it should be appreciated that the pivot pin 358, and the other pivot pins described herein, can be inserted into an aperture of the module housing 146 or can be monolithic with the module housing 146 as desired.

The latch 350 can be mounted to the module housing 146 such that the support member 352 extends both in the forward direction and in the rearward direction from the pivot axis when the anti-backout latch 350 is in the engaged position. In particular, the handle portion 361 can extend in the rearward direction from the pivot axis, and the attachment portion 363 can extend in the forward direction from the pivot axis. Thus, the pivot axis can be spaced from the finger 354 in the rearward direction. The handle portion 361 can be configured to receive a disengagement force that urges the latch 350 to move from the engaged position to the disengaged position.

The latch 350 can further include at least one biasing member 367 that is configured to apply a biasing force that biases the latch 350 toward the engaged position. In one example, the biasing member 367 can extend from the handle portion 361, and can be configured to abut the interconnect module 102 so as to provide the biasing force. In particular, the biasing member 367 can extend from the handle 364 inwardly along the lateral direction A toward the module housing 146. The biasing member 367 can be configured to abut a lateral side of the module housing 146 so as to provide the biasing force. The biasing member 367 can be defined by a resilient spring arm 369 that extends from the support member 352. In particular, the spring arm 369 extends from the handle portion 361 toward the module housing 146. The spring arm 369 can be inwardly curved along the lateral direction A as it extends from the support member 352 so as to abut the module housing 146 when the latch 350 is in the engaged position. The pivot axis can be spaced from the biasing members 327 in the forward direction. The finger 354 can also be spaced from the biasing members 327 and the pivot axis in the forward direction. Accordingly, the pivot axis can be disposed between the finger 354 and biasing member 367 with respect to the longitudinal direction L.

As will be appreciated from the description below, the disengagement force is configured to cause the finger 354 to move away from the host module 104 against the biasing force so as to actuate the latch 350 from the engaged position to the disengaged position. For instance, an inward disengagement force in the lateral direction can be applied to the handle portion 361 of the latch 350 at a location spaced rearward from the pivot axis, thereby urging the latch 350 to move from the engaged position to the disengaged position. The disengagement force can be applied toward the module housing 146. Alternatively still, the latch 350 can be configured such that an outward force along the lateral direction A away from the module housing 146 can be applied to the latch 350 at a location spaced from the pivot axis in the forward direction, thereby urging the latch 350 to move from the engaged position to the disengaged position As described above with respect to FIG. 2D, the host module 104, and thus the interconnect system 100, can include a securement member 172 that is configured to further secure the first electrical connector 152 to the host substrate 118. For instance, as shown in FIG. 11E, the securement member 172 can include a securement body 174 having an upstanding wall 176, and a lower wall 178 that extends from a lower end of the upstanding wall 176 in the rearward direction. The securement body 174 can further include an upper wall 180 that extends from an upper end of the upstanding wall 176 in the rearward direction. The upper wall 180 can be opposite the lower wall 178, and can be spaced from the lower wall 178 along the transverse direction T so as to define an opening therebetween. The lower wall 178 can extend to a location offset with respect to the upper wall 180 in the rearward direction. The upstanding wall 176, the upper wall 180, and the lower wall 178 can all be coplanar with each other along a plane defined by the transverse direction T and the longitudinal direction L. Further, the upstanding wall 176, the upper wall 180, and the lower wall 178 can all dimensioned greater in the plane than in the lateral direction A that is perpendicular to the plane.

The securement member 172 can further include a securement tab 182 that extends down from the securement body 174. For instance, the securement tab 182 can extend from the lower wall 178. The securement tab 182 is configured to be secured in an aperture of the underlying host substrate 118 (FIG. 11A). For instance, the securement tab 182 can be welded in the aperture of the host substrate 118. The securement member 172 can be configured to be received in a slot 175 of the first connector housing 148 so as to attach the securement member 172 to the first electrical connector 152. For instance, the upstanding wall 176 is configured to be inserted into the slot 175.

The securement body 174 can include a retention bump 184 that is configured to engage the first connector housing 148 so as to secure the securement member 172 to the first electrical connector 152. For instance, the retention bump 184 can extend from the upper wall 180. In one example, the retention bump 184 can extend from the upper wall 180 toward the lower wall 178. Thus, the retention bump 184 can extend from the securement body 174 into the opening. The securement body 174 can further include at least one projection 186 that extends from the upstanding wall 176 in the forward direction. Thus, the projection 186 can extend away from the upstanding wall 176 in a direction away from the opening of the securement member 172. The projection 186 can lie in the same plane defined by the transverse direction T and the longitudinal direction L. In one example, the securement body 174 can include first and second ones of the projection 186 spaced from each other along the transverse direction.

The securement member 172 can include first and second securement bodies 174 that are each configured to be coupled between the host substrate 118 and the first electrical connector 152 in the manner described above. For instance, the first and second securement bodies 174 can attach to laterally outer ends of the first connector housing 148. In one example, the first plurality of electrical contacts 150 can be disposed between the first and second securement bodies 174.

Each of the securement bodies 174 can further include a retention member 185 that projects inward along the lateral direction A toward the other of the securement bodies 174. As described above, the first electrical connector 152 includes a first plurality of electrical contacts 150 that are supported by the first connector housing 148. The first plurality of electrical contacts 150 can be arranged in rows that extend along the lateral direction A. The rows includes an outer row 157 of electrical contacts 150 and an inner row 159 of electrical contacts 150. The mating ends of the electrical contacts 150 of the outer row 157 can be disposed above the mating ends of the electrical contacts 150 of the inner row 159. Further, the mounting ends of the electrical contacts 150 of the outer row 157 can be spaced in the rearward direction from the mounting ends of the electrical contacts 150 of the inner row 159. The electrical contacts 150 of each of the outer and inner rows can be arranged in respective electrically insulative leadframe housings 161 that, in turn, are supported by the first connector housing 148. The retention member 185 is configured to bear against one of the leadframe housings 161. For instance, the retention member 185 can be configured to bear against the leadframe housing 161 of the inner row 159. The retention member 185 can define a barbed front end that is configured to bear against the rear end of the leadframe housing 161.

Each of the securement bodies 174 can include first and second retention members 185 that extend laterally inward and laterally outward, respectively. Accordingly, the securement bodies 174 can be positioned at either lateral side of the first connector housing 152, such that one of the retention members 185 is configured to engage the first electrical connector 152 in the manner described above.

As will now be described, the latch 350 can include at least one engagement member, and the securement member 172 defines a complementary engagement member, such that the engagement member of the latch 350 is configured to mate with the engagement member of the securement member 172 so as to attach the latch 350 to the securement member 172. For instance, the engagement member of the latch 350 can be configured to mate with the engagement member of the securement member 172 so as to attach the latch 350 to the securement member 172 when the latch 350 is in the engaged position. The latch 350 and the securement member 172 can at least partially define the second mechanical interference. It should be appreciated that in all embodiments described herein, the latch and securement member 172 can be configured to attach to each other when the latch is in the engaged position. It should be appreciated that the securement member 172 as illustrated in FIGS. 11A-11F can be incorporated into any embodiment described herein so as to engage the respective latch finger when the latch is in the engaged position in the manner described herein.

In one example, the at least one engagement member of the latch 350 can be defined by the at least one finger 354. The at least one finger 354 can be configured to extend into the securement member 172 so as to define the second mechanical interference. Thus, the complementary engagement member of the securement member 172 can be configured as at least one aperture 181 that extends at least therein or therethrough, and is sized to receive the engagement member of the latch 350. In one example, the aperture 181 can extend at least into the securement body 174 along the lateral direction A. For instance, the aperture 181 can extend inward along the lateral direction A at least into an outer lateral surface of the securement body 174 that faces away from the other securement body 174. The aperture 181 can extend through the securement body 174 along the lateral direction A. For instance, the aperture 181 can extend at least into or through the upper wall 180, and can be sized to receive the finger 354 of the latch 350 that extends into the aperture 181. Thus, the finger 314 can be spaced forward of an inner edge of the securement body 174 that partially defines the apertures 181 so as to define the second mechanical interference between the finger 314 and the securement body 174, and in particular the upper wall 180.

When the latch 350 is in the engaged position, the fingers 354 can extend at least into or through the apertures 181. The fingers 354 can terminate at a location spaced from the first electrical connector 152 along the lateral direction A. Alternatively, the fingers 354 can extend into the first connector housing 148 as desired. Thus, abutment between the fingers 354 and the securement member 172 can define the second mechanical interference when the latch 350 is in the engaged position. The biasing member 367 of the latch 350 can resiliently compress against the module housing 146 so as to apply a biasing force that urges the finger 354 into the aperture 181. The disengagement force can be applied to the latch 350 sufficient to overcome the biasing force so as to remove the finger 354 from the aperture 181, thereby removing the mechanical interference. In particular, the disengagement force can be applied to the handle portion 361 along the lateral direction A toward the module housing 146. Thus, the disengagement force can compress the biasing member 367 against the module housing 146. When the latch 350 is pivoted from the engaged position to the disengaged position, the interconnect module 102, including the latch 350, is movable with respect to the host module 104 in the rearward direction, thereby unmating the interconnect substrate 113 from at least one or both of the first and second electrical connectors 152 and 154.

It should be appreciated that the interconnect system 100 can include any number of latches 350 as desired, such as first and second ones of the latch 350. The latches 350 can be spaced from each other along the lateral direction A. In particular, the latches 350 can be positioned such that the respective pivot axes are aligned with each other along the lateral direction A. Further, the fingers 354 can be spaced from each other and aligned with each other along the lateral direction A. Accordingly, the fingers 354 can move toward each other as the latches 350 move from the disengaged position to the engaged position. Similarly, the fingers 354 can move away each other and out of the respective apertures 181 as the latches 350 move from the engaged position to the disengaged position. Further still, the biasing members 367 can be aligned with each other along the lateral direction A. It should be appreciated that the interconnect system 100 can be said to include a latch system that includes the second ones of the latch 350.

Referring now to FIG. 12A-12G, the interconnect system 100 can include an anti-backout latch 400 designed to prevent the interconnect module 102 from being inadvertently unmated from the host module 104. The latch 400 can include a support member 402 that is configured to be placed in mechanical communication with the interconnect module 102, and a finger 404 that extends out from the support member 402 and is configured to be placed in mechanical communication with the host module 104. The finger 404 can be continuous with the support member 402, or can define a jog with respect to the support member 402. The finger 404 can be configured to be secured to the host module 104 when the latch 400 is in the engaged position, so as to define the second mechanical interference. For instance, the finger 404 can be configured to be secured to the module housing 146 when the latch 400 is in the engaged position, so as to define the second mechanical interference. In one example, the latch 400 is pivotally supported by the module housing 146. For instance, the latch 400 can be pivotally attached to the module housing 146. In particular, the support member 402 can be pivotally supported by, for instance attached to, the module housing 146.

Figure 12A:
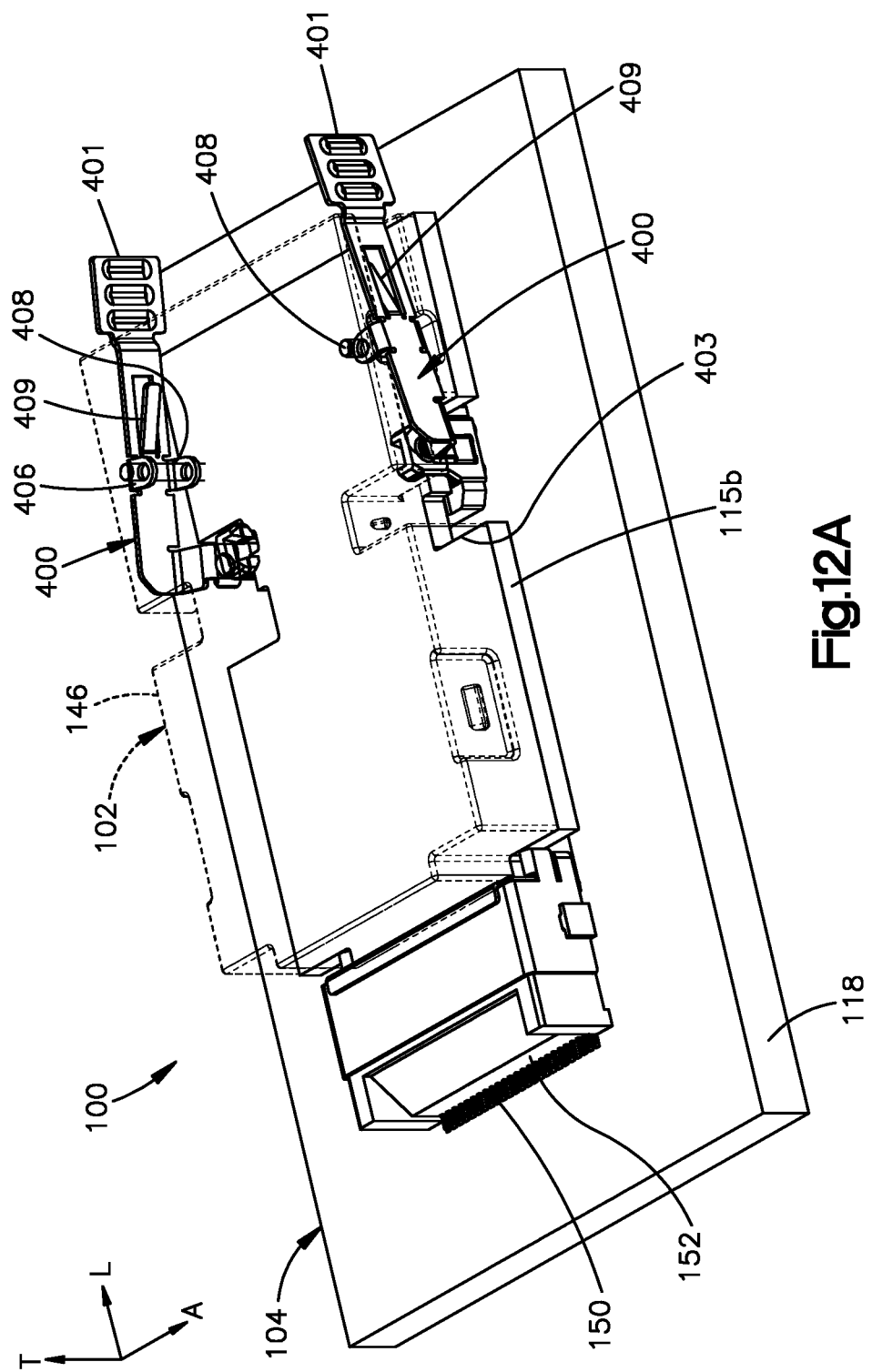
FIG. 12A is a perspective view of an interconnect system including an interconnect module, a host module, with portions hidden to show an anti-backout latch constructed in accordance with another embodiment shown in a disengaged position.

When the interconnect module 102 is mated with the at least one electrical connector of the host module 104, the latch 400 can be movable between a disengaged position (FIGS. 12A, 12E, and 12G) and an engaged position (FIGS. 12B and 12F). In particular, the latch 400 can be pivotable about a pivot axis between the disengaged position and the engaged position. The pivot axis can be oriented along the transverse direction T. Thus, the pivot axis can be oriented normal to the host substrate 118 which is oriented along a plane defined by the longitudinal direction L and the lateral direction A. For instance, the latch 400 can be pivotable in a first direction about the pivot axis to move the latch 400 from the disengaged position to the engaged position, and in a second direction opposite the first direction about the pivot axis to move the latch 400 from the engaged position to the disengaged position. As shown in FIG. 12A, the pivot axis can be spaced from the first electrical connector 152 in the rearward direction. The pivot axis can further be spaced from the second electrical connector 154 in the rearward direction. The at least one finger 404 can extend inward from the support member 402 along the lateral direction A when the latch 400 is in the engaged position. Thus, the finger 404 can extend from the support member 402 along a direction that lies in a plane that includes the longitudinal direction L and the lateral direction A.

When the latch 400 is in the engaged position, a first mechanical interference is defined between the latch 400 and the interconnect module 102 that limits rearward movement of the interconnect module 102 with respect to the latch 400 in the rearward direction. The first mechanical interference can be defined by a pivotal attachment of the latch 400 to the interconnect module 102. For instance, the first mechanical interference can be defined by a pivotal attachment of the latch 400 to the module housing 146.

Further, when the latch 400 is in the engaged position, a second mechanical interference is defined between the finger 404 and the host module 104 limits rearward movement of the latch 400 with respect to the at least one electrical connector of the host module 104. The second mechanical interference can include an abutment between the anti-backout latch 400 and the host module 104. The limited rearward movements can prevent the interconnect module 102 from moving in the rearward direction with respect to the at least one electrical connector of the host module 104 a distance that would be sufficient to unmate the interconnect module 102 from the at least one electrical connector of the host module 104. For instance, the first and second mechanical interferences can substantially prevent rearward movement of the interconnect module 102 with respect to the anti-backout latch 400, and of the latch 400 with respect to the at least one electrical connector of the host module 104, respectively. When the latch 400 is in the disengaged position, the second mechanical interference is removed such that the interconnect module 102 is movable in the rearward direction with respect to the at least one electrical connector of the host module 104 a sufficient distance so as to unmate the interconnect module 102 from the at least one electrical connector of the host module 104.

Figure 12C:
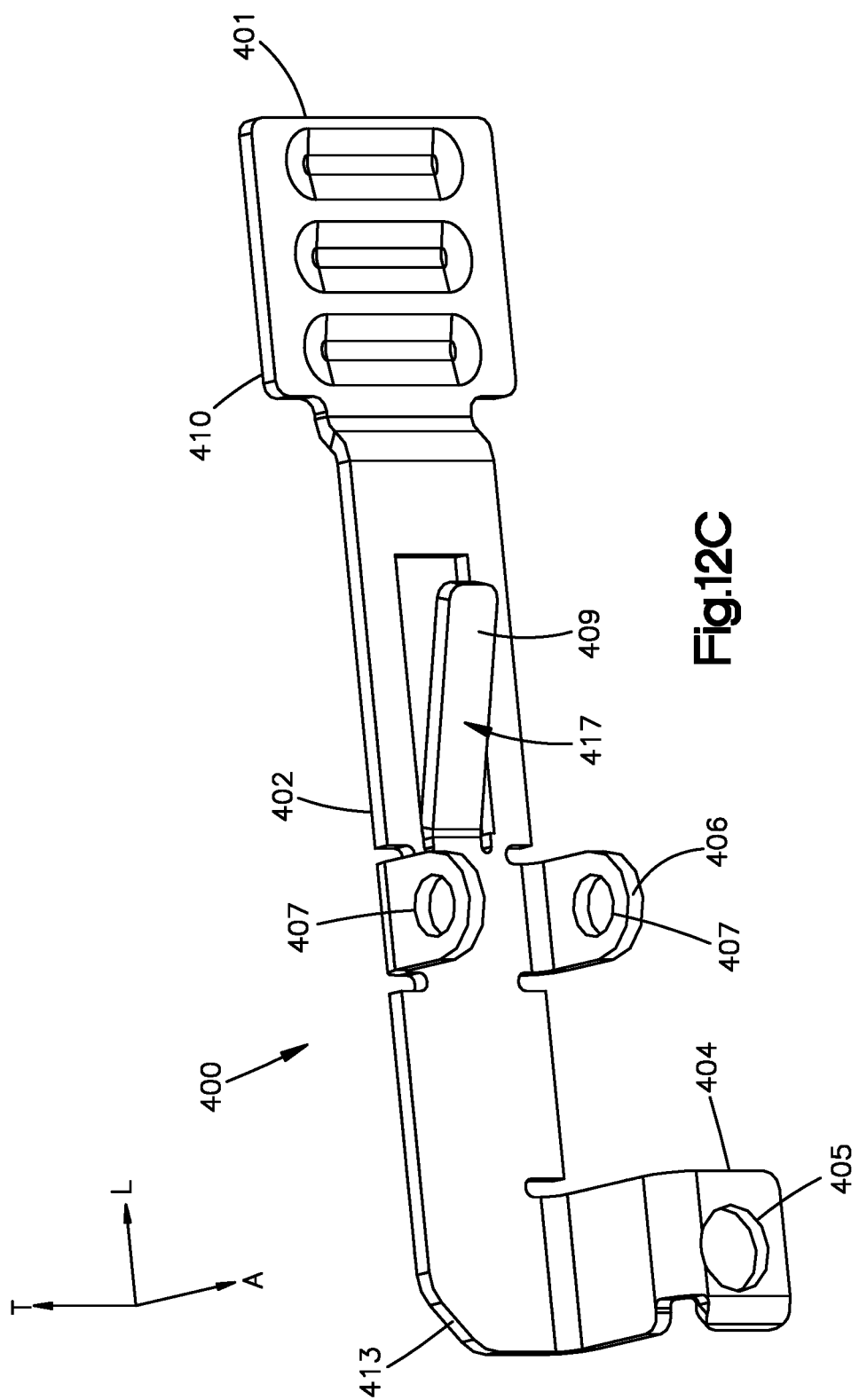
FIG. 12C is a perspective view of the anti-backout latch illustrated in FIG. 12A.

The support member 402 can include a pivot member 406 that is pivotally attached to the interconnect module 102. In particular, the pivot member 406 can be pivotally attached to the module housing 146. As shown in FIG. 12C, the support member 402 can include a support wall 410 that is pivotally attached to the module housing 146 via pivot member 406 and pivot pin 408 (FIG. 12A). The latch 400 can include pivot apertures 407 that extend through the pivot member 406 along the transverse direction T and are sized to receive the pivot pins 408. For instance, the pivot member can be friction fit to the pivot pin 408. In one example, the pivot pin 408 can be rotatably fixed to the interconnect module 102. For instance, the pivot pin 408 can be rotatably fixed to the module housing 146. The latch 400 can thus be pivotable about the pivot pin 408. In particular, the support wall 410 can be pivotable about the pivot pin 408. Alternatively, the latch 400 can be rotatably fixed to the pivot pin 408. Thus, the pivot pin 408 can be rotatable about its long axis with respect to the interconnect module 102. For instance, the pivot pin 408 can be rotatable about its long axis with respect to the module housing 146. In one example, the latch 400 can be monolithic with the pivot pin 408. Alternatively, the latch 400 can be secured to the pivot pin 408 in any manner desired.

The support wall 410 can include a handle portion 401 and an attachment portion 413. The finger 404 can extend inward the attachment portion 413 along the lateral direction A. The attachment portion 413 can be spaced from the handle portion 401 in the forward direction when the latch 400 is pivotally attached to the module housing 146. The pivot member 406 can be configured as an aperture that extends through the support member 402 along the transverse direction T. The aperture can be disposed between the handle portion 401 and the attachment portion 413 with respect to the longitudinal direction L. The latch 400 can further include a handle portion 401 that is disposed at the rear end of the support member 402. The aperture can be sized to receive a respective one of the pivot pins 408 that is supported by the module housing 146, so as to pivotally attach the support member 402 to the module housing 146. Thus, the pivot pin 408 can define the pivot axis along its long axis. It should be appreciated that the pivot member 406 can include the pivot pin 408 as desired. Further, it should be appreciated that the pivot pin 408, and the other pivot pins described herein can be disposed in an aperture of the module housing 146 or can be monolithic with the module housing 146 as desired.

The latch 400 can be mounted to the module housing 146 such that the support member 402 extends both in the forward direction and in the rearward direction from the pivot axis when the anti-backout latch 400 is in the engaged position. In particular, the handle portion 401 can extend in the rearward direction from the pivot axis, and the attachment portion 413 can extend in the forward direction from the pivot axis. Thus, the pivot axis can be spaced from the attachment portion 413 in the rearward direction. The handle portion 401 can be configured to receive a disengagement force that urges the latch 400 to move from the engaged position to the disengaged position.

The latch 400 can further include at least one biasing member 417 that is configured to apply a biasing force that biases the latch 400 toward the engaged position. In one example, the biasing member 417 can extend from the handle portion 401, and can be configured to abut the interconnect module 102 so as to provide the biasing force. In particular, the biasing member 417 can extend from the handle portion 401 inwardly along the lateral direction A toward the module housing 146. The biasing member 417 can be configured to abut a lateral side of the module housing 146 so as to provide the biasing force. The biasing member 417 can be defined by a resilient spring arm 409 that extends from the support member 402. In particular, the spring arm 409 extends in the rearward direction as it extends away from the support member 402 along the lateral direction A. Thus, it can be said that the spring arm 409 can extend from the support member 402 along the longitudinal direction L toward the handle portion 401. The spring arm 419 can be planar. Alternatively, the spring arm 419 curved along the lateral direction A as it extends from the support member 402. The spring arm 419 is configured to abut the module housing 146 when the latch 400 is in the engaged position. The pivot axis can be spaced from the biasing members 417 in the forward direction. The finger 404 can also be spaced from the biasing members 417 and the pivot axis in the forward direction. Accordingly, the pivot axis can be disposed between the finger 404 and biasing member 417 with respect to the longitudinal direction L.

As will be appreciated from the description below, the disengagement force is configured to cause the finger 404 to move away from the host module 104 against the biasing force so as to actuate the latch 400 from the engaged position to the disengaged position. For instance, an inward disengagement force in the lateral direction can be applied to the handle portion 401 of the latch 400 at a location spaced rearward from the pivot axis, thereby urging the latch 400 to move from the engaged position to the disengaged position. The disengagement force can be applied toward the module housing 146. Alternatively still, the latch 400 can be configured such that an outward force along the lateral direction A away from the module housing 146 can be applied to the latch 400 at a location spaced from the pivot axis in the forward direction, thereby urging the latch 400 to move from the engaged position to the disengaged position.

The interconnect system 100 can include a pair of the latches 400 that are each attached to laterally opposed sides of the interconnect module 102. For instance, each of the pair of latches 400 can be attached to laterally opposed sides of the module housing 146. Thus, the latches 400 can be squeezed toward each other to actuate the latches 400 from their engaged positions to their disengaged positions. In particular, the handle portions 401 can be squeezed toward each other to actuate the latches 400 from their engaged positions to their disengaged positions.

Figure 12D:
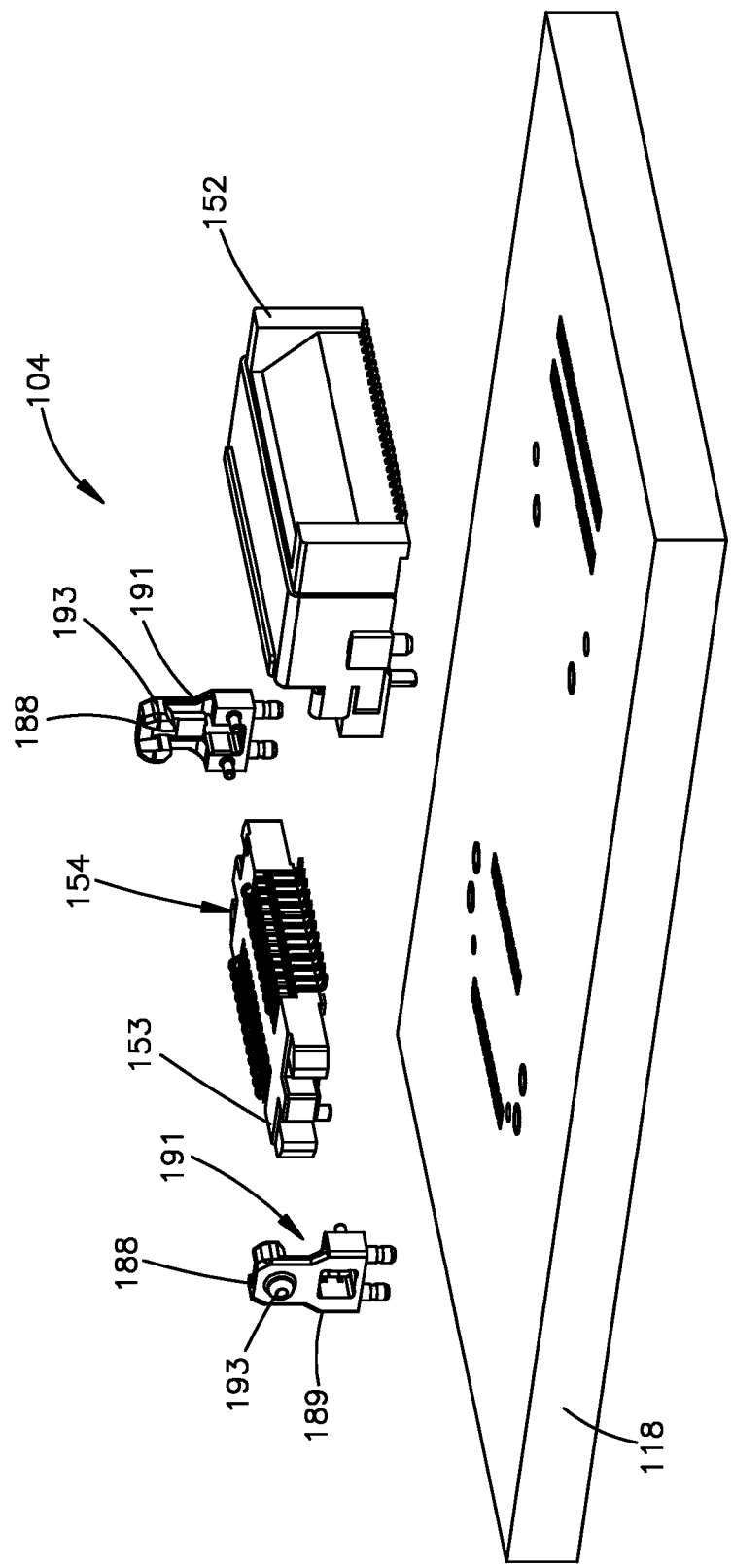
FIG. 12D is an exploded perspective view of a portion of the interconnect system illustrated in FIG. 12A.

As shown in FIG. 12D, and described above, the interconnect system 100 can include at least one securement member 188 that is configured to secure the first electrical connector 152 to the host substrate 118. For instance, the interconnect system 100 can include a pair of securement members 188 that are configured to be mounted to the host substrate 118, and attach to opposed lateral sides of the second electrical connector 154. Each securement member 188 can include an upstanding securement body 189 that having a laterally inner end that is configured to attach to the second electrical connector 154. The upstanding securement body extends from the host substrate 118 along the transverse direction. For instance, the laterally inner end can define a groove 191 that is configured to receive the second electrical connector 154. The securement members 188 can be configured to attach to the second electrical connector 154 in any suitable alternative manner as desired. The securement members 188 can each also include a projection 193 that extends out from the securement body 189. In particular, the projection 193 can extend out from a laterally outer end of the securement body 189. The laterally outer end is opposite the laterally inner end with respect to the lateral direction A. The securement members 188, including the securement body 189 and the projection 193, can be made from any suitable material, such as metal or plastic. Metal can be desirable to add strength to the securement member and securement body 189 and projection 193. Alternatively, the projection 193 can extend out from the second electrical connector 154, and in particular from the second connector housing 153.

As will now be described, the latch 400 can include at least one engagement member, and the projection 193 can define a complementary engagement member, such that the engagement member of the latch 400 is configured to mate with the complementary engagement member so as to attach the latch 400 to the second electrical connector 154. It can further be said that the engagement member of the latch 400 is configured to mate with the complementary engagement member so as to attach the interconnect module 102 to the host module 104. Disengagement of the latch 400 from the complementary engagement member allows the interconnect module 102 to be removed from the host module. The engagement member of the latch 400 can be configured to mate with the complementary engagement member so as to attach the latch 400 to the securement member 188. In one example, the projection 193 extends out from the securement body 189. Thus, the securement member 188 can define the complementary engagement member. In another example, the projection 193 extends out from the second electrical connector 154, and in particular from the second connector housing 153. Thus, one or both of the second electrical connector 152 and the second connector housing 153 can be said to define the complimentary engagement member.

The latch 400 and the projection 193 can at least partially define the second mechanical interference. It should be appreciated that in all embodiments described herein, the latch 400 and securement member 188, and alternatively the second electrical connector 154, can be configured to attach to each other when the latch is in the engaged position. It should be appreciated that the securement member 188 as illustrated in FIG. 12D can be incorporated into any embodiment described herein so as to engage the respective latch finger when the latch is in the engaged position in the manner described herein.

In one example, the at least one engagement member of the latch 400 can be defined by the at least one finger 404. The at least one finger 404 can define a receiving aperture 405 that is configured to receive the projection 193 as to define the second mechanical interference. In one example, the receiving aperture 405 can extend at least into the finger 404 along the lateral direction A. For instance, the receiving aperture 405 can extend through the finger 404 along the lateral direction A. The finger 404 can be offset laterally inward with respect to the support member 402. The spring arm 409 also extends laterally inward with respect to the support member 402. The receiving aperture receives 405 the projection 193 along the lateral direction A. Thus, the latch 400 mates with the securement member 188 along the lateral direction A. Further, the latch 400 mates with a laterally outermost surface of the securement member 188.

Figure 12E:
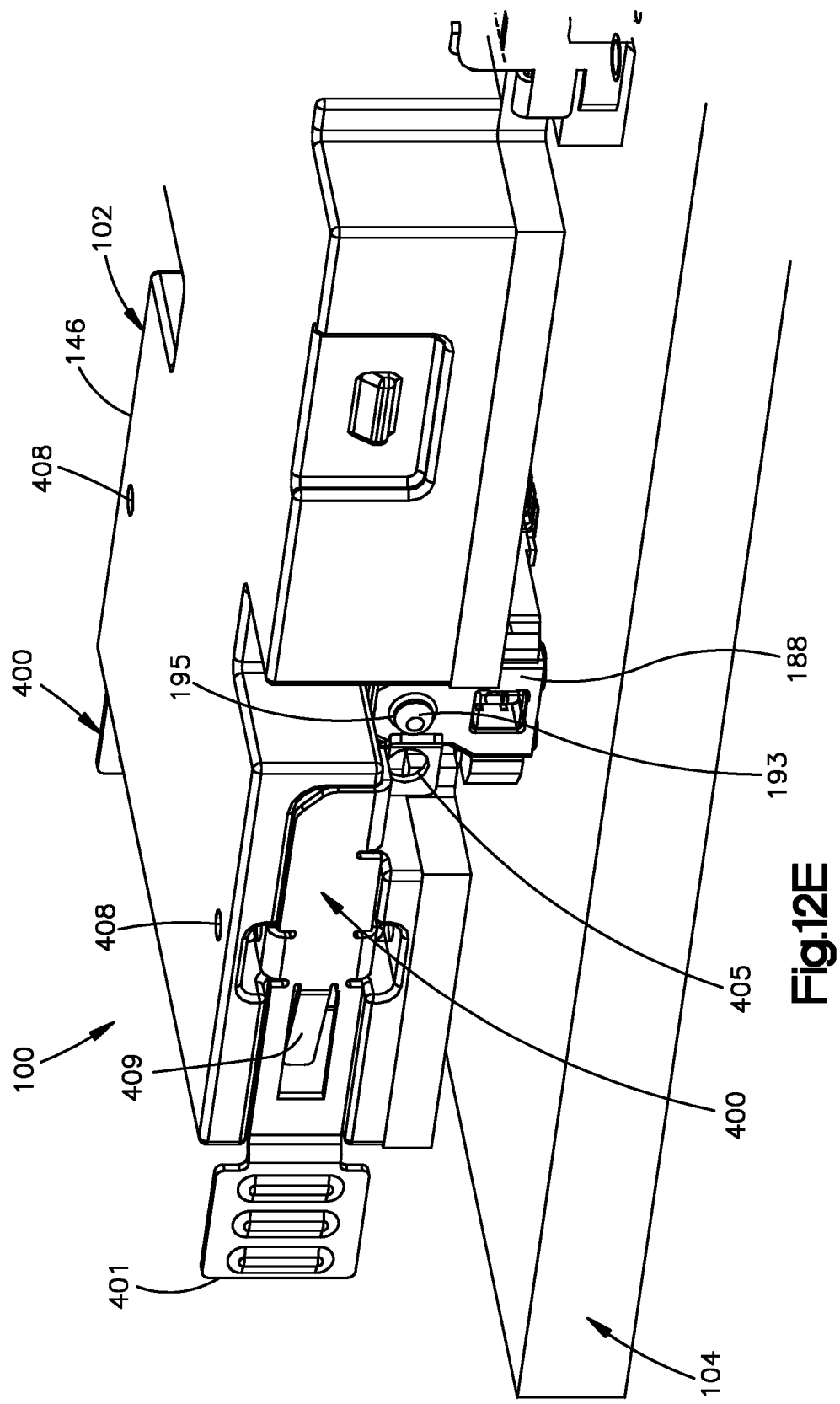
FIG. 12E is an enlarged perspective view of a portion of the interconnect system illustrated in FIG. 12A, showing the latch in the disengaged position and being moved toward the engaged position.

Thus, the complementary engagement member of the securement member 188 can be configured as at least one projection 193 that is sized to be received in the receiving aperture 405. As illustrated in FIG. 12E, the projection 193 can define a tapered surface 195 be tapered at its rear end. The tapered surface 195 can define a cam surface along which the finger 404 is configured to ride as it moves from the disengaged position to the engaged position, as shown in FIG. 12E. The finger 404 can define a plate that defines the receiving aperture 405. The plate can be substantially planar. For instance, the plate can be substantially planar along a plane that is defined by the transverse direction T and the longitudinal direction L. The plate can be offset laterally inward with respect to the support member 402. Alternatively, the plate can be coplanar with the support member 402.

When the latch 400 is in the engaged position, the projection 193 can extend at least into or through the receiving aperture 405, as shown in FIG. 12F. Thus, abutment between the finger 404 (and thus the latch 400) and the projection can define the second mechanical interference when the latch 400 is in the engaged position. The biasing member 417 of the latch 400 can resiliently compress against the module housing 146 so as to apply a biasing force that urges the finger 404 into a position whereby the receiving aperture 405 receives the projection 193 when the receiving aperture is aligned with the projection 193 along the lateral direction A. As illustrated in FIG. 12G, the disengagement force can be applied to the latch 400 sufficient to overcome the biasing force so as to remove the finger 404 from the receiving aperture 405, thereby removing the second mechanical interference. In particular, the disengagement force can be applied to the handle portion 401 along the lateral direction A toward the module housing 146. Thus, the disengagement force can compress the biasing member 417 against the module housing 146. When the latch 400 is pivoted from the engaged position to the disengaged position, the interconnect module 102, including the latch 400, is movable with respect to the host module 104 in the rearward direction, thereby unmating the interconnect substrate 113 from at least one or both of the first and second electrical connectors 152 and 154. The interconnect substrate 113 can define a notch 403 that extends therethrough along the transverse direction T and is sized to receive the securement member 188 when the interconnect module 102 is attached to the first and second electrical connectors 152 and 154, respectively.

When the latches 400 are in the disengaged position, the distance between the laterally inner surfaces of the handle portions 401 along the lateral direction A is greater than the distance between the respective laterally inner surfaces of the plates that define the receiving apertures 405.

In an alternative embodiment, the latch 400 can define a projection, and the securement member 188 can define a receiving aperture that receives the projection when the latch is in the engaged position. Thus, it can be said that one of the latch 400 and the securement member 188 defines a receiving aperture, and the other of the latch 400 and the securement member 188 defines a projection that is sized to be received in the receiving aperture so as to secure the latch 400 to the second electrical connector 154.

Figure 12H:
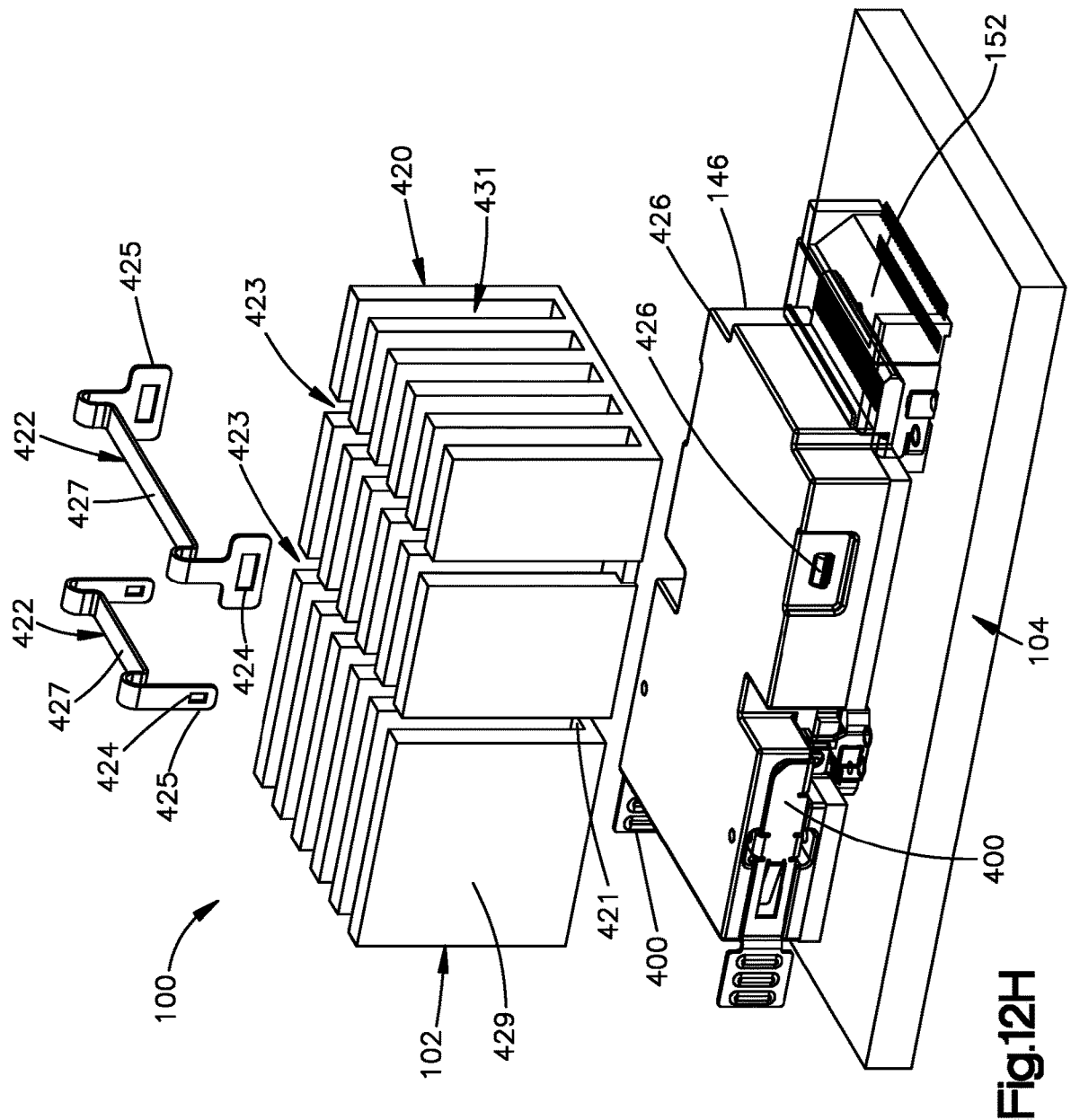
FIG. 12H is an exploded perspective view of the interconnect system illustrated in FIG. 12A, showing the interconnect module including a heat sink.
Figure 12I:
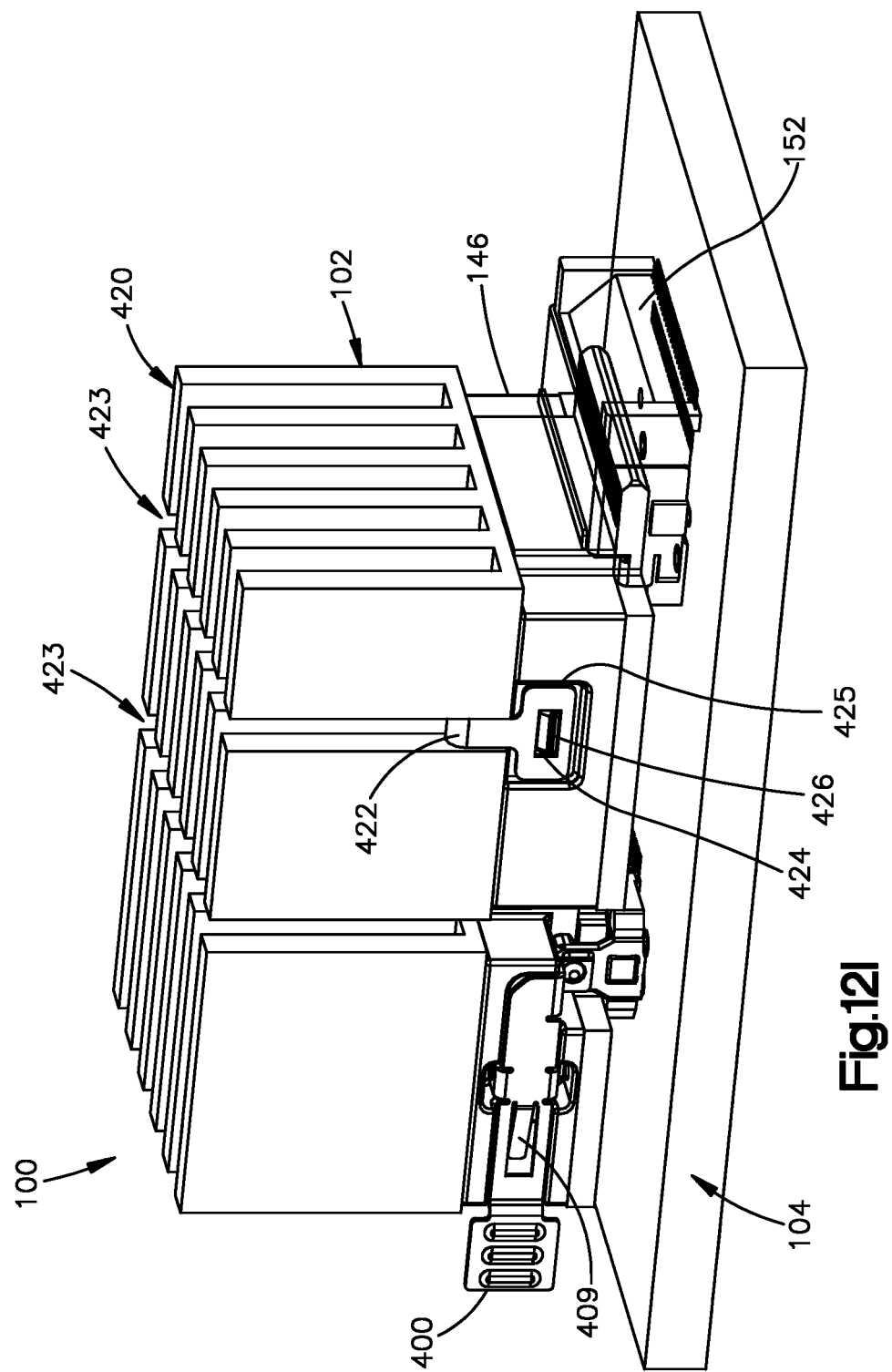
FIG. 12I is a perspective view of the interconnect system illustrated in FIG. 12H, showing the heat sink mounted to a module housing of the interconnect module.

Referring now to FIGS. 12H-12I, the interconnect module 102 can include a heat sink 420 that is configured to be mounted and secured the module housing 146. Thus, the latch 400 can alternatively be pivotally attached to the heat sink 420. The heat sink 420 can include a base 421 and a plurality of upstanding fins 429 that extend from the base 421. The fins 429 can be spaced from each other so as to define a plurality of recesses 431 disposed between respective adjacent ones of the fins 429. In particular, the fins 429 can be spaced from each other along the longitudinal direction L. The heat sink 420 can be secured to the module housing 146 in any manner as desired. For instance, the interconnect module 102 can include one or more securement bands 422 that can be inserted into securement recesses 423 that extend into the heat sink 420, and can be further secured to the module housing 146. The securement recesses 423 can extend into the heat sink 420 along the transverse direction T. For instance, the securement recesses 423 can extend into the fins 429 along the transverse direction T. The securement recesses 423 can terminate with respect to the transverse direction T at the base 421. The securement recesses 423 can be elongate along the lateral direction A. The securement recesses 423 can be spaced from each other along the longitudinal direction L. Alternatively, the securement recesses 423 can be elongate along the longitudinal direction L.

Each of the securement bands 422 can be configured to secure the heat sink 420 to the module housing 146. Each of the securement bands 422 can define respective opposed ends 425 of the securement bands 422, and a middle section 427 that extends between the opposed ends 425. The middle sections 427 are configured to be received in respective ones of the securement recesses 423. The securement bands 422 can define apertures 424 that are configured to receive complimentary projections 426 of the module housing 146 so as to secure securement bands 422 to the module housing 146. The projections 426 can extend out from the module housing 146 along the lateral direction A. The projections 426 can extend out from opposed laterally outer surfaces of the module housing 146. One pair of the projections 426 can be narrower than another pair of projections 426 along the longitudinal direction L. The one of the pair of projections 426 can be spaced from the another of the pair of projections 426 in the rearward direction. Alternatively, the pairs of projections 426 can have the same size and shape as each other.

The apertures 424 can extend through the opposed ends 425. The ends 425 of one of the securement bands 422 can be narrower than the ends 425 of another of the securement bands along the longitudinal direction L. The one of the securement bands 422 can be spaced from the another of the securement bands 422 in the rearward direction. Alternatively, the ends 424 of the securement bands 422 can have the same size and shape as each other. When the securement bands 422 are inserted into the respective securement recesses 423 and secured to the module housing 146, the heat sink 420 can be said to be mounted to the module housing 146. For instance, the heat sink 420 can be mounted to the upper surface of the module housing 146.

Advantageously, it should be appreciated that the heat sink 420 can remain mounted to the module housing 146 both as the interconnect module 102 is attached to the host module 104 and while the interconnect module 102 is removed from the host module 104. Thus, the heat sink 420 can remain mounted to the module housing 146 both as the latch 400 is engaged with the complementary engagement member, and as the latch 400 is disengaged from the complementary engagement member.

It should be appreciated that the interconnect system 100 can include any number of latches 400 as desired, such as first and second ones of the latch 400. The latches 400 can be spaced from each other along the lateral direction A. In particular, the latches 400 can be positioned such that the respective pivot axes are aligned with each other along the lateral direction A. Further, the fingers 404 can be spaced from each other and aligned with each other along the lateral direction A. Accordingly, the fingers 404 can move toward each other as the latches 400 move from the disengaged position to the engaged position. Similarly, the fingers 404 can move away each other and away from the respective projections 193 as the latches 400 move from the engaged position to the disengaged position. Further still, the biasing members 417 can be aligned with each other along the lateral direction A. It should be appreciated that the interconnect system 100 can be said to include a latch system that includes first and second ones of the latch 400, and first and second ones of the securement member 188.

Referring now to FIGS. 2A-12I in general, the present disclosure further contemplates all methods of fabricating and using the components described herein, including the latches and securement members, and all modules and systems incorporating same.

It should be noted that the illustrations and discussions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

What is claimed:

1. An interconnect system comprising:
    an interconnect module configured to mate with first and second electrical connectors of a host module, the second electrical connector spaced from the first electrical connector in a rearward direction, and the first electrical connector configured to operate at higher data transfer speeds than the second electrical connector, the interconnect module including a module substrate and an optical engine supported by the module substrate, and a module housing mounted to the module substrate and at least partially surrounding the optical engine; and
    an anti-backout latch that defines at least one pivot member configured to be pivotally attached to the module housing such that the anti-backout latch is pivotable relative to the module housing about a pivot axis between a disengaged position and an engaged position
    whereby when the anti-backout latch is in the engaged position, 1) a first mechanical interference between the anti-backout latch and the module housing limits movement of the interconnect module in the rearward direction with respect to the anti-backout latch in a rearward direction, 2) a second mechanical interference between the latch and the host module limits movement of the latch in the rearward direction with respect to the first and second electrical connectors, and 3) the limited movements in the rearward direction prevent the interconnect module from moving in the rearward direction with respect to the first and second electrical connectors a distance that would be sufficient to unmate the interconnect module from the first and second electrical connectors, and
    whereby when the anti-backout latch is in the disengaged position, the second mechanical interference is removed, such that the interconnect module is movable in the rearward direction with respect to the first and second electrical connectors a sufficient distance so as to unmate the interconnect module from at least one of the first and second electrical connectors.

2. The interconnect system of claim 1, wherein the pivot axis is spaced from the second electrical connector in the rearward direction when the interconnect module is mated with the first and second electrical connectors.

3. The interconnect system as recited in claim 1, wherein the module substrate comprises a first side and a second side opposite the first side along a transverse direction that is perpendicular to the rearward direction, the second side carries electrically conductive lands that are configured to mate with respective electrical contacts of the second electrical connector, and the pivot axis is oriented along the lateral direction that is perpendicular to each of the rearward direction and the transverse direction.

4. The interconnect system as recited in claim 1, wherein no part of the anti-backout latch extends into a host substrate to which the first and second electrical connectors are mounted both when the anti-backout latch is in the engaged position and when the anti-backout latch is in the disengaged position.

5. The interconnect system of claim 1, wherein the anti-backout latch comprises a support member having a first support wall and a second support wall connected by a cross beam.

6. The interconnect system of claim 5, wherein the support member extends in a forward direction from the pivot axis when the anti-backout latch is in the engaged position, wherein the forward direction is opposite the rearward direction.

7. The interconnect system of claim 5, wherein the first and second support walls include respective first and second protrusions that extend laterally inwardly towards each other so as to resiliently cam over a respective wall of the module housing, thereby resisting motion of the anti-backout latch from the engaged position to the disengaged position.

8. The interconnect system of claim 5, wherein the anti-backout latch further comprises a handle that extends from the cross beam.

9. The interconnect system of claim 5, wherein the first and the second support walls are spaced from each other along a lateral direction that is perpendicular to the rearward direction.

10. The interconnect system of claim 9, wherein the first and second support walls comprise first and second pivot members, respectively, that are pivotally attached to the module housing.

11. The interconnect system of claim 5, wherein the anti-backout latch comprises a first finger that extends out of the first support wall and a second finger that extends out from the second support wall.

12. The interconnect system of claim 11, wherein the first and second fingers are disposed between the pivot axis and the cross beam with respect to a longitudinal direction that includes the rearward direction and a forward direction that is opposite the rearward direction.

13. The interconnect system of claim 11, wherein when the anti-backout latch is in the engaged position the first and second fingers extend to a location adjacent the second electrical connector in a forward direction that is opposite the rearward direction.

14. The interconnect system of claim 13, wherein abutments between the second electrical connector and each of the first and second fingers define the second mechanical interference.

15. A method for securing an interconnect system comprising:
mating an interconnect module with first and second electrical connectors of a host module, the second electrical connector spaced from the first electrical connector in a rearward direction, and the first electrical connector configured to operate at higher data transfer speeds than the second electrical connector, the interconnect module including a module substrate and an optical engine supported by the module substrate, and a module housing mounted to the module substrate and at least partially surrounding the optical engine; and
pivoting an anti-backout latch about the module housing from a disengaged position to an engaged position
whereby when the anti-backout latch is in the engaged position, 1) a first mechanical interference between the anti-backout latch and the module housing limits movement of the interconnect module in the rearward direction with respect to the anti-backout latch in a rearward direction, 2) a second mechanical interference between the latch and the host module limits movement of the latch in the rearward direction with respect to the first and second electrical connectors, and
whereby when the anti-backout latch is in the disengaged position, the second mechanical interference is removed, such that the interconnect module is movable in the rearward direction with respect to the first and second electrical connectors a sufficient distance so as to unmate the interconnect module from at least one of the first and second electrical connectors.

16. The method of claim 15, wherein pivoting the anti-backout latch comprises moving a finger of the anti-backout latch to define the second mechanical interference with the host module when the latch is in the engaged position, and the finger is disposed above the first electrical connector.

17. An interconnect module comprising:
a transceiver that includes a module substrate having first and second sides that each extend in a longitudinal direction and a lateral direction that is perpendicular to the longitudinal direction, the longitudinal direction including a forward direction and a rearward direction that is opposite the forward direction, the transceiver further including an optical engine mounted on the first side of the module substrate, and a transceiver housing that is mounted on the first side of the module substrate and at least partially surrounds the optical engine, wherein the first and second sides are opposite each other along a transverse direction that is perpendicular to the longitudinal and lateral directions, the first side carries electrically conductive lands in a row at a front end of the substrate, and the second side carries electrically conductive lands in a first row at the front end of the substrate and a second row of electrically conductive lands spaced from the first row in the rearward direction; and
an anti-backout latch that is pivotally attached to the transceiver housing so as to be pivotable with respect to the transceiver housing about a pivot axis between an engaged position and a disengaged position, the pivot axis being oriented along the lateral direction, wherein the anti backout latch has a first and second support walls spaced apart in the lateral direction and a cross beam extending in the lateral direction that connects the first and the second support walls, a first finger that extends from the first support wall in the transverse direction when the anti-backout latch is in the engaged position, and a second finger that extends from the second support wall in the transverse direction when the anti-backout latch is in the engaged position, the first and second fingers being disposed between the cross beam and the pivot axis with respect to the longitudinal direction.

18. The interconnect module of claim 17, wherein the second side is opposite the first side in a downward direction that is perpendicular to each of the lateral direction and the longitudinal direction, and the first and second fingers extend from the support wall in the downward direction when the anti-backout latch is in the engaged position.

19. The interconnect module of claim 17 configured to mate with a host module such that the lands of the interconnect module establish an electrical connection with the host module, wherein when the anti-backout latch is in the engaged position, respective abutments between the host module and the first and second fingers prevent the interconnect module from being unmated from the host module in a rearward direction that is opposite the forward direction, and when the anti-backout latch is in the disengaged position the abutments are removed such that the interconnect module is movable with respect to the host module in the rearward direction a sufficient distance so as to unmate the interconnect module from the host module.

20. An interconnect system comprising the interconnect module of claim 19 and the host module of claim 19, wherein the host module includes a host substrate, and a first electrical connector and a second electrical connector each mounted to the host substrate,
wherein the second electrical connector is spaced from the first electrical connector in the rearward direction.

* * * * *